(12) United States Patent
Shin et al.

(10) Patent No.: US 10,962,647 B2
(45) Date of Patent: *Mar. 30, 2021

(54) LIDAR APPARATUS BASED ON TIME OF FLIGHT AND MOVING OBJECT

(71) Applicant: YUJIN ROBOT CO., LTD., Seoul (KR)

(72) Inventors: Kyung Chul Shin, Seoul (KR); Seong Ju Park, Gunpo-si (KR); Jae Young Lee, Gunpo-si (KR); Moo Woong Cheon, Anyang-si (KR); Ji Wook Kwon, Incheon (KR)

(*) Notice: Subject to any disclaimer, the term of this patent is extended or adjusted under 35 U.S.C. 154(b) by 536 days.

This patent is subject to a terminal disclaimer.

(21) Appl. No.: 15/825,122

(22) Filed: Nov. 29, 2017

(65) Prior Publication Data

US 2018/0149753 A1  May 31, 2018

(30) Foreign Application Priority Data

Nov. 30, 2016 (KR) .................. 10-2016-0161693
Dec. 6, 2016 (KR) .................. 10-2016-0165081

(Continued)

(51) Int. Cl.
*G01S 17/89* (2020.01)
*G01S 17/93* (2020.01)
(Continued)

(52) U.S. Cl.
CPC .......... *G01S 17/89* (2013.01); *G01S 7/4808* (2013.01); *G01S 7/4811* (2013.01);
(Continued)

(58) Field of Classification Search
None
See application file for complete search history.

(56) References Cited

U.S. PATENT DOCUMENTS 4,297,030 A * 10/1981 Chaborski ............ G01S 17/32
356/5.13
6,304,517 B1 * 10/2001 Ledfelt ................. G04G 3/022
331/177 R (Continued)

FOREIGN PATENT DOCUMENTS

EP 1503221 A1 2/2005
EP 2790079 A1 10/2014

(Continued)

OTHER PUBLICATIONS

Hoonje Woo, Jaehwan Kim, Sanghoon Lee, Byungwoo Kim, Obstacle Avoidance for Unmanned Ground Vehicle using Multiple Laser Scanners, Apr. 2009, pp. 960-965, The Korean Society of Automotive Engineers, Korea.

(Continued)

*Primary Examiner* — Yuqing Xiao
*Assistant Examiner* — Amir J Askarian
(74) *Attorney, Agent, or Firm* — Jongkook Park

(57) ABSTRACT

Provided are a LIDAR apparatus based on a time of flight and a moving object which output an electrical signal by transmitting and receiving light, generate a control signal by analyzing the electrical signal, measure a pin point distance by calculating a time of flight of the light based on the control signal, and process point cloud data generated based on a measured distance to accurately construct information on a surrounding environment.

18 Claims, 97 Drawing Sheets

(30) Foreign Application Priority Data

| Aug. 21, 2017 | (KR) | 10-2017-0105671 |
| Aug. 21, 2017 | (KR) | 10-2017-0105715 |
| Sep. 20, 2017 | (KR) | 10-2017-0121401 |
| Sep. 21, 2017 | (KR) | 10-2017-0121828 |
| Sep. 29, 2017 | (KR) | 10-2017-0126788 |
| Oct. 23, 2017 | (KR) | 10-2017-0137723 |
| Oct. 23, 2017 | (KR) | 10-2017-0137745 |
| Nov. 2, 2017 | (KR) | 10-2017-0145577 |

(51) Int. Cl.
*G01S 7/4865* (2020.01)
*G01S 7/481* (2006.01)
*G01S 7/48* (2006.01)
*G01S 17/42* (2006.01)
*G01S 17/04* (2020.01)

(52) U.S. Cl.
CPC .......... *G01S 7/4817* (2013.01); *G01S 7/4865* (2013.01); *G01S 17/04* (2020.01); *G01S 17/42* (2013.01); *G01S 17/93* (2013.01)

(56) References Cited

U.S. PATENT DOCUMENTS

| 6,925,679 | B2 | 8/2005 | Wallach et al. | |
| 7,982,776 | B2 * | 7/2011 | Dunki-Jacobs | G06T 5/003 |
| | | | | 250/234 |
| 9,020,637 | B2 | 4/2015 | Schnittman et al. | |
| 9,411,338 | B2 | 8/2016 | Hanaoka et al. | |
| 9,527,212 | B2 | 12/2016 | Artes et al. | |
| 9,836,653 | B2 | 12/2017 | Schnittman | |
| 2004/0135992 | A1 * | 7/2004 | Munro | G01S 17/10 |
| | | | | 356/4.01 |
| 2005/0002481 | A1 * | 1/2005 | Woo | G01S 11/08 |
| | | | | 375/354 |
| 2009/0250616 | A1 * | 10/2009 | Solf | G01T 1/2985 |
| | | | | 250/363.04 |
| 2011/0285910 | A1 | 11/2011 | Bamji et al. | |
| 2012/0092644 | A1 * | 4/2012 | Spruck | G01S 7/4915 |
| | | | | 356/5.01 |
| 2012/0182392 | A1 * | 7/2012 | Kearns | B25J 19/023 |
| | | | | 348/46 |
| 2014/0111812 | A1 | 4/2014 | Baeg et al. | |
| 2014/0125966 | A1 | 5/2014 | Phillips et al. | |
| 2014/0300732 | A1 | 10/2014 | Friend et al. | |
| 2016/0073080 | A1 | 3/2016 | Wagner et al. | |
| 2016/0104829 | A1 | 4/2016 | Chang et al. | |
| 2017/0046548 | A1 | 2/2017 | Kamijo et al. | |

FOREIGN PATENT DOCUMENTS

| EP | 2890125 A1 | 7/2015 |
| EP | 1619469 A1 | 1/2016 |
| EP | 3165942 A1 | 5/2017 |
| EP | 3179272 A1 | 6/2017 |
| EP | 3309584 A1 | 4/2018 |
| JP | 10221448 A * | 8/1998 |
| JP | 2011-145156 A1 | 7/2011 |
| JP | 2013224915 A1 | 10/2013 |
| JP | 2017062398 A1 | 3/2017 |
| KR | 10-0698534 A1 | 3/2007 |
| KR | 10-0773344 A1 | 11/2007 |
| KR | 10-0785784 A1 | 12/2007 |
| KR | 10-2008-0048260 A1 | 6/2008 |
| KR | 2008-0102842 A1 | 11/2008 |
| KR | 10-2010-0031277 A1 | 3/2010 |
| KR | 10-2011-0010380 A1 | 2/2011 |
| KR | 10-1058571 A1 | 8/2011 |
| KR | 10-2011-0122022 A1 | 11/2011 |
| KR | 20120028813 A * | 3/2012 |
| KR | 10-2013-0034573 A1 | 4/2012 |
| KR | 10-2013-0020062 A1 | 2/2013 |
| KR | 10-2013-0034573 A1 | 4/2013 |
| KR | 10-1331790 A1 | 11/2013 |
| KR | 2013-0137536 A1 | 12/2013 |
| KR | 10-2014-0009737 A1 | 1/2014 |
| KR | 10-2014-0030814 A1 | 3/2014 |
| KR | 2014-0073177 A1 | 6/2014 |
| KR | 2014-0109175 A1 | 9/2014 |
| KR | 10-2014-0122553 A1 | 10/2014 |
| KR | 10-2015-0014237 A1 | 2/2015 |
| KR | 10-2015-0050159 A1 | 5/2015 |
| KR | 10-2017-0008614 A1 | 7/2015 |
| KR | 10-2015-0144726 A1 | 12/2015 |
| KR | 10-2015-0144727 A1 | 12/2015 |
| KR | 10-2015-0144730 A1 | 12/2015 |
| KR | 10-2015-0144731 A1 | 12/2015 |
| KR | 10-2016-0088147 A1 | 7/2016 |
| KR | 2016-0111571 A1 | 9/2016 |
| KR | 2016-0113794 A1 | 10/2016 |
| KR | 10-2017-0008614 A1 | 1/2017 |
| KR | 10-2017-0073515 A1 | 6/2017 |
| KR | 10-2017-0088583 A1 | 8/2017 |
| WO | 2007025240 A1 | 3/2007 |
| WO | 2015155812 A1 | 10/2015 |
| WO | 2016/098912 A1 | 6/2016 |
| WO | 2017122529 A1 | 7/2017 |
| WO | 2018130885 A1 | 7/2018 |

OTHER PUBLICATIONS

Feng Li, Jingyi Yu and Jinxiang Chai, A Hybrid Camera for Motion Deblurring and Depth Map Super-Resolution, IEEE computer society conference on computer vision and pattern recognition, Jun. 2008, pp. 1-8.

Jinwook Huh, Woong Sik Chung, Sang Yep Nam and Wan Kyun Chung, International Conference on Intelligent Robots and Systems, ETRI Journal, vol. 29, No. 2, Apr. 2007.

Jun Hwan Jang etc., "Development of a Pulsed Time-of-Flight Based LIDAR for Distance, Shape Measurement and Applications", Spring and Autumn Conference, The Korean Society of Mechanical Engineers, May 2015, pp. 144-145.

* cited by examiner

```
┌─────────────────────────────┐
│    OPTICAL TRANSCEIVER      │
│          (100)              │
│   ┌─────────────────────┐   │
│   │    LIGHT SOURCE     │   │
│   │       (110)         │   │
│   └─────────────────────┘   │
│                             │
│   ┌─────────────────────┐   │
│   │    FIRST MIRROR     │   │
│   │       (120)         │   │
│   └─────────────────────┘   │
│                             │
│   ┌─────────────────────┐   │
│   │    SECOND MIRROR    │   │
│   │       (130)         │   │
│   └─────────────────────┘   │
│                             │
│   ┌─────────────────────┐   │
│   │     PHOTODIODE      │   │
│   │       (140)         │   │
│   └─────────────────────┘   │
└─────────────────────────────┘
```

FIG. 11

| 3n~4n | 2n~3n | n~2n | 0~n | -n~0 | -2n~-n | -3n~-2n | -4n~-3n |

FIG. 78

| $7n/2$ ~$4n$ | $3n$~$7n/2$ | $5n/2$ ~$3n$ | $2n$~ $5n/2$ | $3n/2$ ~$2n$ | $n$~ $3n/2$ | $n/2$ ~$n$ | $0$~$n/2$ | $-n/2$ ~$0$ | $-n$~ $-n/2$ | $-3n/2$ ~$-n$ | $-2n$~ $-3n/2$ | $-5n/2$ ~$-2n$ | $-3n$~ $-5n/2$ | $-7n/2$ ~$-3n$ | $-4n$~ $-n/2$ |

FIG. 79

| $7n\sim$ $8n$ | $6n\sim$ $7n$ | $5n\sim$ $6n$ | $4n\sim$ $5n$ | $3n\sim$ $4n$ | $2n\sim$ $3n$ | $n\sim$ $2n$ | $0\sim n$ | $-n\sim 0$ | $-2n\sim$ $-n$ | $-3n\sim$ $-2n$ | $-4n\sim$ $-3n$ | $-5n\sim$ $-4n$ | $-6n\sim$ $-5n$ | $-7n\sim$ $-6n$ | $-8n\sim$ $-7n$ |
|---|---|---|---|---|---|---|---|---|---|---|---|---|---|---|---|

FIG. 80 side brush brush wheel

LIDAR APPARATUS BASED ON TIME OF FLIGHT AND MOVING OBJECT

CROSS-REFERENCE TO RELATED APPLICATIONS

This application claims priority to and the benefit of Korean Patent Application No. 10-2016-0161693 filed in the Korean Intellectual Property Office on Nov. 30, 2016, Korean Patent Application No. 10-2016-0165081 filed in the Korean Intellectual Property Office on Dec. 6, 2016, Korean Patent Application No. 10-2017-0105715 filed in the Korean Intellectual Property Office on Aug. 21, 2017, Korean Patent Application No. 10-2017-0105671 filed in the Korean Intellectual Property Office on Aug. 21, 2017, Korean Patent Application No. 10-2017-0121401 filed in the Korean Intellectual Property Office on Sep. 20, 2017, Korean Patent Application No. 10-2017-0121828 filed in the Korean Intellectual Property Office on Sep. 21, 2017, Korean Patent Application No. 10-2017-0126788 filed in the Korean Intellectual Property Office on Sep. 29, 2017, Korean Patent Application No. 10-2017-0137745 filed in the Korean Intellectual Property Office on Oct. 23, 2017, Korean Patent Application No. 10-2017-0137723 filed in the Korean Intellectual Property Office on Oct. 23, 2017, and Korean Patent Application No. 10-2017-0145577 filed in the Korean Intellectual Property Office on Nov. 2, 2017, the entire contents of which are incorporated herein by reference.

TECHNICAL FIELD

The present invention relates to a LIDAR apparatus based on time of flight, and a moving object.

BACKGROUND ART

Contents described in this section merely provide background information on the present embodiment and do not constitute the related art.

Time of flight based light detection and ranging (LIDAR) is remote sensing technique that measures the time in which an optical signal is shot, reflected and returned, and uses the speed of light to measures the distance of a reflector. The received optical signal is converted into an electrical signal through a photodiode.

SUMMARY OF THE INVENTION

Embodiments of the present invention have been made in an effort to construct information on the surrounding environment by transmitting and receiving light to output an electrical signal, generating a control signal based on analysis of said electrical signal, measuring a pin point distance by calculating the time of flight of the light based on said control signal, and processing point cloud data generated based on the measured distance.

Embodiments of the present invention have also been made in an effort to measure a pin point with high performance without using an array type, in order to minimize the size and cost of the product, through implementation of i) a first mirror which includes a hole for passing the light emitted from a light source and has a focus on which the rays reflected from a curved reflective surface are collected, and ii) a second mirror moving in a vertical direction which reflects back to the first mirror light received after the light passing through the hole of the first mirror reflects off a target object.

Embodiments of the present invention have also been made in an effort to enhance the speed of the detection system and stabilize operation of the system through uniformization of irregular signal processing times, without the need to stand by until disappearance of the output signal, by receiving the reflected light and converting the received light into an electrical signal, with output of the electrical signal for a detection time during a sampling period.

Embodiments of the present invention have also been made in an effort to convert the electrical signal so that the signal point having the maximum signal magnitude in the electrical signal has a predetermined magnitude, adjust the magnitude of the converted electrical signal, and detect the point of time when the electrical signal has the predetermined magnitude in order to improve work error and allow accurate measurement of a point of time even through use of just a comparator.

Embodiments of the present invention have also been made in an effort to correct the time of flight by using the pulse width of the reflected signal in order to calculate an accurate time of flight.

Embodiments of the present invention have also been made in an effort to enhance the time resolution of a time-digital converter by changing the positions of logic elements included in a plurality of oscillators in order to adjust the clock width of the plurality of oscillators.

Embodiments of the present invention have also been made in an effort to calculate the accurate time of flight by correcting the time of flight using the ratio of the number of reference clock signals received from an external clock generator and the number of internal clock signals generated by an internal oscillator.

Embodiments of the present invention have also been made in an effort to provide an artificial landmark which is not visible to a user's naked eye, but may be recognized by an apparatus which recognizes artificial landmarks, in order to have the LIDAR system analyze the scanned points obtained during the process of scanning a surrounding region and recognize the artificial landmarks, without the need for a separate camera to recognize said artificial landmarks.

Embodiments of the present invention have also been made in an effort to provide a map covering a wide region within a predetermined time under predetermined conditions by generating a key frame relating to a node using scan information, calculating an odometry edge between continuous nodes and updating the key frames to estimate a local map, detecting a loop closure edge between non-continuous nodes relating to a set of updated key frames, and correcting the positions of the nodes based on the odometry edge and the loop closure edge to estimate a global map.

Embodiments of the present invention have also been made in an effort to introduce a cleaning robot equipped with a multi-channel LIDAR for acquiring three-dimensional spatial information on the surrounding environment, and to provide an apparatus and a method for detecting the obstacles of a moving object based on the multi-channel LIDAR which acquires and expresses environmental information using the introduced cleaning robot system, and to provide a moving object equipped with said apparatus.

Embodiments of the present invention have also been made in an effort to provide an apparatus and a method for detecting the obstacles of a moving object based on multi-channel LIDAR, which distinguishes walls, obstacles (including low obstacles), and vertical environments from the acquired three-dimensional environmental information, and to provide a moving object equipped with said apparatus.

Embodiments of the present invention have also been made in an effort to provide an apparatus and a method for detecting the obstacles of a moving object based on multi-channel LIDAR, which has a collision path avoidance algorithm to increase the efficiency of the cleaning robot while avoiding collision based on the previously measured environmental obstacle information, and to provide a moving object equipped with said apparatus.

Embodiments of the present invention have also been made in an effort to provide a cleaning function control device for determining the state of a floor surface by acquiring information on each point in a room as three-dimensional information and controlling the cleaning function for the room based on the state of the floor surface, and to provide a cleaning robot equipped with said function.

Other objectives of the present invention which can easily deduced from the following detailed description and the effects thereof but which are not explicitly described may be additionally considered to fall within the scope of the present invention.

An exemplary embodiment of the present invention provides a moving object including: a LIDAR apparatus which measures the distance from a target object based on the time of flight; a path controller which generates a movement path by processing point cloud data generated based on said measured distance; and a moving apparatus implemented to move said moving object based on said movement path.

Another exemplary embodiment of the present invention provides a LIDAR apparatus which includes an optical transceiver that outputs an electrical signal by transmitting and receiving light, a signal discriminator which analyzes said electrical signal to generate a control signal, and a distance measurer which calculates the time of flight of the light based on said control signal in order to measure the distance.

Yet another exemplary embodiment of the present invention provides an optical transceiver which includes: a light source that emits light; a first mirror which includes a hole for allowing said emitted light to pass; a second mirror which reflects the light passing through said hole of said first mirror, receives the light reflected from a target object, and reflects said received light back to the first mirror; and a photodiode which receives the light reflected from said second mirror and converts the received light into an electrical signal.

Still yet another exemplary embodiment of the present invention provides a LIDAR apparatus including: an optical transceiver which emits light to a target object in response to a start control signal, receives the light reflected from said target object, and converts said received light into an electrical signal; and a distance measurer which converts said electrical signal to generate a stop control signal, and calculates the time of flight based on the time difference between said start control signal and said stop control signal to measure the distance. Said optical transceiver includes: a light source for emitting light; a hole for allowing passage of said emitted light; a first mirror having a focus on which the rays reflected on a curved reflective surface are gathered; a second mirror which reflects the light passing through said hole of said first mirror to a target object, receives the light reflected from said target object, and reflects said received light to the first mirror; a reflector positioned at the focus of said first mirror which receives and reflects the light reflected from said first mirror; a photodiode which receives the light reflected from said reflector and converts said received light into an electrical signal; and a rotation unit which rotates said light source, said first mirror, said second mirror, said reflector, and said photodiode along on a rotational axis.

Yet another exemplary embodiment of the present invention provides a moving object including: a LIDAR apparatus which calculates the time of flight between said moving object and a target object to measure the distance to said target object; and a moving apparatus implemented to move said moving object based on said distance to said target object. Said LIDAR apparatus includes: an optical transceiver which emits light to said target object in response to a start control signal, receives light reflected from said target object, and converts said received light into an electrical signal; and a distance measurer which converts said electrical signal to generate a stop control signal, and calculates the time of flight based on the time difference between said start control signal and said stop control signal in order to measure the distance. Said optical transceiver includes: a light source for emitting light; a hole for passing said emitted light; a first mirror having a focus on which the rays reflected by a curved reflective surface are gathered; a second mirror which reflects the light passing through said hole of said first mirror to a target object, receives the light reflected from said target object, and reflects said received light to the first mirror; a reflector positioned at the focus of said first mirror which receives and reflects the light reflected from said first mirror; a photodiode receiving the light reflected from said reflector and converts said received light into an electrical signal; and a rotation unit which rotates said light source, said first mirror, said second mirror, said reflector, and said photodiode along on a rotational axis.

Still yet another exemplary embodiment of the present invention provides a LIDAR apparatus including: an optical transceiver which emits light to a target object in response to a start control signal, receives the light reflected from said target object, converts said received light into an electrical signal, and outputs said electrical signal for a predetermined detection time; a signal discriminator which converts said electrical signal to generate a stop control signal; and a distance measurer which calculates the time of flight based on the time difference between said start control signal and said stop control signal in order to measure the distance.

Still yet another exemplary embodiment of the present invention provides an optical transceiver including a light source which emits light to a target object based on a predetermined sampling period, a photodiode which receives the light reflected from the target object and converts said received light into an electrical signal, and a signal conversion unit which outputs said electrical signal during a detection time during said sampling period.

Still yet another exemplary embodiment of the present invention provides a moving object including: a LIDAR apparatus which calculates the time of flight between said moving object and a target object in order to measure the distance to said target object; and a moving apparatus implemented to move said moving object based on said distance to the target object. Said LIDAR apparatus includes: an optical transceiver which emits light to said target object in response to a start control signal, receives the light reflected by said target object, converts said received light into an electrical signal, and outputs said electrical signal for a predetermined detection time; a signal discriminator which converts said electrical signal to generate a stop control signal; and a distance measurer which calculates the time of flight based on the time difference between said start control signal and said stop control signal to measure the distance.

Still yet another exemplary embodiment of the present invention provides a LIDAR apparatus including: an optical transceiver which emits light to a target object in response to a start control signal, receives the light reflected from said target object, and converts said received light into an electrical signal; a signal discriminator which converts said electrical signal and detects a time point having a preconfigured reference magnitude in order to generate a stop control signal; and a distance measurer which calculates the time of flight based on the time difference between said start control signal and said stop control signal in order to measure the distance.

Still yet another exemplary embodiment of the present invention provides a signal discriminator including: a first conversion unit which converts an input signal so that the signal point having the maximum signal magnitude has a preconfigured magnitude with respect to the input signal, which rises and falls; a second conversion unit which adjusts the magnitude of said converted input signal; and a signal detection unit which detects at least one time point having a preconfigured reference magnitude from said input signal with adjusted magnitude in order to generate an output signal.

Still yet another exemplary embodiment of the present invention provides a moving object including: a LIDAR apparatus which calculates the time of flight between said moving object and a target object in order to measure the distance to said target object; and a moving apparatus implemented to move said moving object based on said distance to the target object. Said LIDAR apparatus includes: an optical transceiver which emits light to said target object in response to a start control signal, receives the light reflected from said target object, and converts said received light into an electrical signal; a signal discriminator which converts said electrical signal and detects a time point having a preconfigured reference magnitude in order to generate a stop control signal; and a distance measurer which calculates the time of flight based on the time difference between said start control signal and said stop control signal in order to measure the distance.

Still yet another exemplary embodiment of the present invention provides a LIDAR apparatus including: an optical transceiver which emits light to a target object in response to a start control signal, receives the light reflected by said target object, and converts said received light into an electrical signal; a signal discriminator which converts said electrical signal to generate a stop control signal; and a distance measurer which calculates the time of flight by using a time to digital converter that adjusts the location of logic elements included in an oscillator, based on the time difference between said start control signal and said stop control signal, in order to measure the distance.

Still yet another exemplary embodiment of the present invention provides a time to digital converter including a slow oscillator which generates a first clock signal, a fast oscillator which generates a second clock signal that is smaller than said first clock signal, a coarse counter which counts said first clock signals generated by said slow oscillator, a fine counter which counts said second clock signals generated by said fast oscillator, and a phase detector which detects the point of time when said first and second clocks become synchronized.

Still yet another exemplary embodiment of the present invention provides a moving object including a LIDAR apparatus which calculates the time of flight between said moving object and a target object in order to measure the distance to said target object, and a moving apparatus implemented to move said moving object based on said distance to the target object. Said LIDAR apparatus includes: an optical transceiver which emits light to said target object in response to a start control signal, receives light reflected by said target object, and converts said received light into an electrical signal; a signal discriminator which converts said electrical signal to generate a stop control signal; and a distance measurer which calculates the time of flight by using a time to digital converter that adjusts the location of logic elements included in an oscillator, based on the time difference between said start control signal and said stop control signal, in order to measure the distance.

Still yet another exemplary embodiment of the present invention provides a LIDAR apparatus including: an optical transceiver which emits light to a target object, receives light reflected by said target object, and converts said received light into an electrical signal; a distance measurer which measures the distances of points of said target object by using the time difference between said emission and reception of light; a light intensity measurer which measures the intensity of light reflected by the points of said target object; and an artificial landmark detector which analyzes the changes in said distance and said light intensity to determine whether said target object is an artificial landmark, and analyzes an invisible barcode included in said artificial landmark to generate a digital code.

According to another aspect of the exemplary embodiment, the artificial landmark may include a base and an invisible barcode connected to said base, having a code sequence made of a material which reflects, absorbs, or emits light in a first wavelength band, while said code sequence may be hidden to be invisible by a material that reflects, absorbs, or emits light in a second wavelength band.

Still yet another exemplary embodiment of the present invention provides a computer program recorded on a non-transitory computer readable medium and including computer program commands executable by a processor in order to recognize artificial landmarks. When said computer program commands are executed by the processor of a computing device, the following steps are taken: measurement of the distances of points of a target object by using the time difference between the time of emission of light toward said target object and the time of reception of light reflected by said target object; measurement of the intensity of the light reflected by the points of said target object; and determination of whether said target object is said artificial landmark through analysis of the change of said distance and said light intensity and generation of a digital code through analysis of an invisible barcode included in said artificial landmark.

Still yet another exemplary embodiment of the present invention provides a moving object including a LIDAR apparatus which emits and receives light to and from a target object and recognizes artificial landmarks, and a moving apparatus implemented to move said moving object based on the distance to said target object. Said LIDAR apparatus includes: an optical transceiver which emits light toward said target object and receives light reflected by said target object, and converts said received light into an electrical signal; a distance measurer which measures the distances of points of said target object by using the time difference between said emission and reception of light; a light intensity detector which measures the intensity of the light reflected by said points of said target object; and an artificial detector which determines whether said target object is said artificial landmark by analyzing the change of said distance and said light intensity, and which generates a digital code through analysis of an invisible barcode included in said artificial landmark.

Still yet another exemplary embodiment of the present invention provides a localization and mapping method of a moving robot, which includes the following steps: acquisition of scan information of a space where said moving robot is positioned; estimation of a local map through use of said scan information to generate a key frame relating to a node, followed by calculation of an odometry edge between consecutive nodes and updating of said key frame; and estimation of a global map through detection of a loop closure edge between nodes which are not consecutive with respect to a set of the updated key frames and correction of the location of said node based on said odometry edge and said loop closure edge.

Still yet another exemplary embodiment of the present invention provides a map creator of a moving robot, including: a scanner which acquires scan information of a space where said moving robot is positioned; a local map estimating unit which estimates a local map by using said scan information to generate a key frame relating to a node, calculating an odometry edge between consecutive nodes, and updating said key frame; and a global map estimating unit which estimates a global map by detecting a loop closure edge between nodes which are not consecutive with respect to a set of said updated key frames and correcting the location of said node based on said odometry edge and said loop closure edge.

Still yet another exemplary embodiment of the present invention provides a computer program for localization and mapping, which is recorded on a non-transitory computer readable medium and which includes computer program commands executable by a processor. When said computer program commands are executed by at least one processor of a moving robot, the following steps are taken: acquisition of scan information of a space where said moving robot is positioned; estimation of a local map through use of said scan information to generate a key frame relating to a node, calculation of an odometry edge between consecutive nodes and update of said key frame; and estimation of a global map by detecting a loop closure edge between nodes which are not consecutive with respect to a set of said updated key frames and correcting the location of said node based on said odometry edge and said loop closure edge.

Still yet another exemplary embodiment of the present invention provides an apparatus for detecting obstacles of a moving object based on a multi-channel LIDAR, which includes: a multi-channel LIDAR unit containing at least two optical transceivers having different angles of emission of the transmission signal for detection of 3D environmental information including information on obstacles of a moving object; a projective map creating unit which generates said 3D environmental information for defining said obstacles in 3D based on the reception information from said two or more optical transceivers and creates a projective map in which said 3D environmental information is included in a 2D space map; and a traveling path generating unit which determines the spatial location of said obstacle based on the projective map and generates a traveling path for avoiding said obstacle.

Still yet another exemplary embodiment of the present invention provides a method for detecting obstacles of a moving object based on a multi-channel LIDAR, which includes the following steps: acquisition of 3D environmental information around the moving object by using at least two optical transceivers having different angles of emission of the transmission signal; generation of a projective map which projects said 3D information in a 2D space, achieved through use of said reception information of said optical transceivers to generate said 3D environmental information for defining said obstacle in 3D; and generation of a traveling path through extraction of wall information using a 2D-information-based wall extraction algorithm on said projective map, and through detection of low obstacle information using the 3D environmental information acquired by said two or more optical transceivers.

Still yet another exemplary embodiment of the present invention provides a cleaning function controlling device including: a room information acquiring unit which acquires 3D information on each point in a room; a floor surface state determining unit which determining the state of said floor based on information on a first set of points related to said floor surface in said room; and a cleaning function adjusting unit which adjusts the cleaning function relating to said room based on said state of said floor surface.

Still yet another exemplary embodiment of the present invention provides a cleaning robot including: a room information acquiring unit which acquires 3D information on each point in a room; a floor surface state determining unit which determines the state of said floor based on information on a first set of points relating to said floor surface in said room; a cleaning function adjusting unit which adjusting the cleaning function relating to said room based on said state of said floor surface; and a cleaning function executing unit which executes the cleaning function for said room.

As described above, according to embodiments of the present invention, an electrical signal is output through transmission and reception of light, a control signal is generated through analysis of said electrical signal, a pin point distance is measured by calculating the time of flight of said light based on said control signal, and point cloud data generated based on the measured distance is processed to enable accurate construction of information on a surrounding environment at low cost.

According to embodiments of the present invention, i) a first mirror including a hole for allowing passage of light emitted from a light source and having a focus on which rays reflected by a curved reflective surface are collected, and ii) a second mirror which moves vertically and reflects the light passing through said hole of said first mirror to a target object and receives the light reflected from said target object and subsequently reflects said received light to the first mirror are included in order to minimize the size and cost of a product without needing to use an array type, and to measure a pin point with high performance.

According to embodiments of the present invention, the reflected light is received and converted into an electrical signal, and the electrical signal is output for a detection time during a sampling period in order to avoid needing to stand by until disappearance of the output signal, and in order to make an irregular signal processing time uniform to stabilize the operation of a system as well as enhance the processing speed of the system.

According to embodiments of the present invention, the electrical signal is converted so that the signal point having the maximum signal magnitude in said electrical signal has a preconfigured magnitude, the magnitude of the converted electrical signal is adjusted, and the point of time when said signal point has said preconfigured magnitude is detected in order to improve work error and allow accurate measurement of a point of time using only a comparator.

According to embodiments of the present invention, an accurate time of flight is able to be calculated through correction of the time of flight using the pulse width of a reflected signal.

According to embodiments of the present invention, it is possible to enhance the time resolution of a time-to-digital converter by adjusting the positions of logic elements included in a plurality of oscillators to adjust the clock width of the plurality of oscillators.

According to embodiments of the present invention, it is possible to calculate the accurate time of flight by correcting said time of flight using the ratio of the number of reference clock signals received from an external clock generator to the number of internal clock signals generated by an internal oscillator.

According to embodiments of the present invention, an artificial landmark which is not visible to a user's naked eye, but which may be recognized by an apparatus for recognizing artificial landmarks is provided, and a LIDAR system analyzes points scanned during scanning of a surrounding region in order to recognize said artificial landmark, without the need for a separate camera for recognizing artificial landmarks.

According to embodiments of the present invention, it is possible to prepare a map covering a wide region within a preset time under preconfigured conditions by using the scan information to generate a key frame relating to a node, calculating an odometry edge between continuous nodes and updating said key frame to estimate a local map, detecting a loop closure edge between non-continuous nodes with respect to a set of updated key frames, and correcting the positions of the nodes based on said odometry edge and said loop closure edge to estimate a global map.

According to embodiments of the present invention, since it is possible to acquire three-dimensional obstacle information for the environment surrounding a moving object by equipping a multi-channel LIDAR which is rotatable and which is capable of transmitting/receiving signals at various angles, front obstacles and low-height obstacles at the front lower end of said moving object can also be detected.

According to embodiments of the present invention, since it is possible to generate a projective map including three-dimensional information on the surrounding environment acquired through the multi-channel LIDAR in a grid map, information on the surrounding environmental of the moving object as well as information on the low-height obstacles at the front lower end of the moving object can sufficiently be acquired even with low storage capacity and low computing power.

According to embodiments of the present invention, it is possible to apply existing techniques applied to two-dimensional environmental information as they are for generating the projective map, even when three-dimensional information on the surrounding environment of the moving object is acquired through the multi-channel LIDAR.

According to embodiments of the present invention, it is possible to secure the safety of the moving object as well as maximize the cleaning area by generating a projective map even when acquiring three-dimensional information on the surrounding environment of the moving object through the multi-channel LIDAR.

According to embodiments of the present invention, it is possible to accurately detect the state of a floor surface, to detect even low obstacles scattered on the floor surface, to accurately detect a slip of the cleaning robot, and to enhance both the cleaning and coverage performance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 6 through 15 are diagrams illustrating optical transceivers of a LIDAR apparatus according to exemplary embodiments of the present invention.

FIGS. 76 to 83 are diagrams illustrating projective map creators of the LIDAR apparatus according to the exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter, in describing the present invention, a detailed explanation of known technologies associated with the present invention, which is apparent to those skilled in the art, may be omitted to avoid unnecessarily obscuring the subject matter of the present invention, and some exemplary embodiments of the present invention will be described in detail through illustrative drawings.

<Moving Object>

Figure 1:
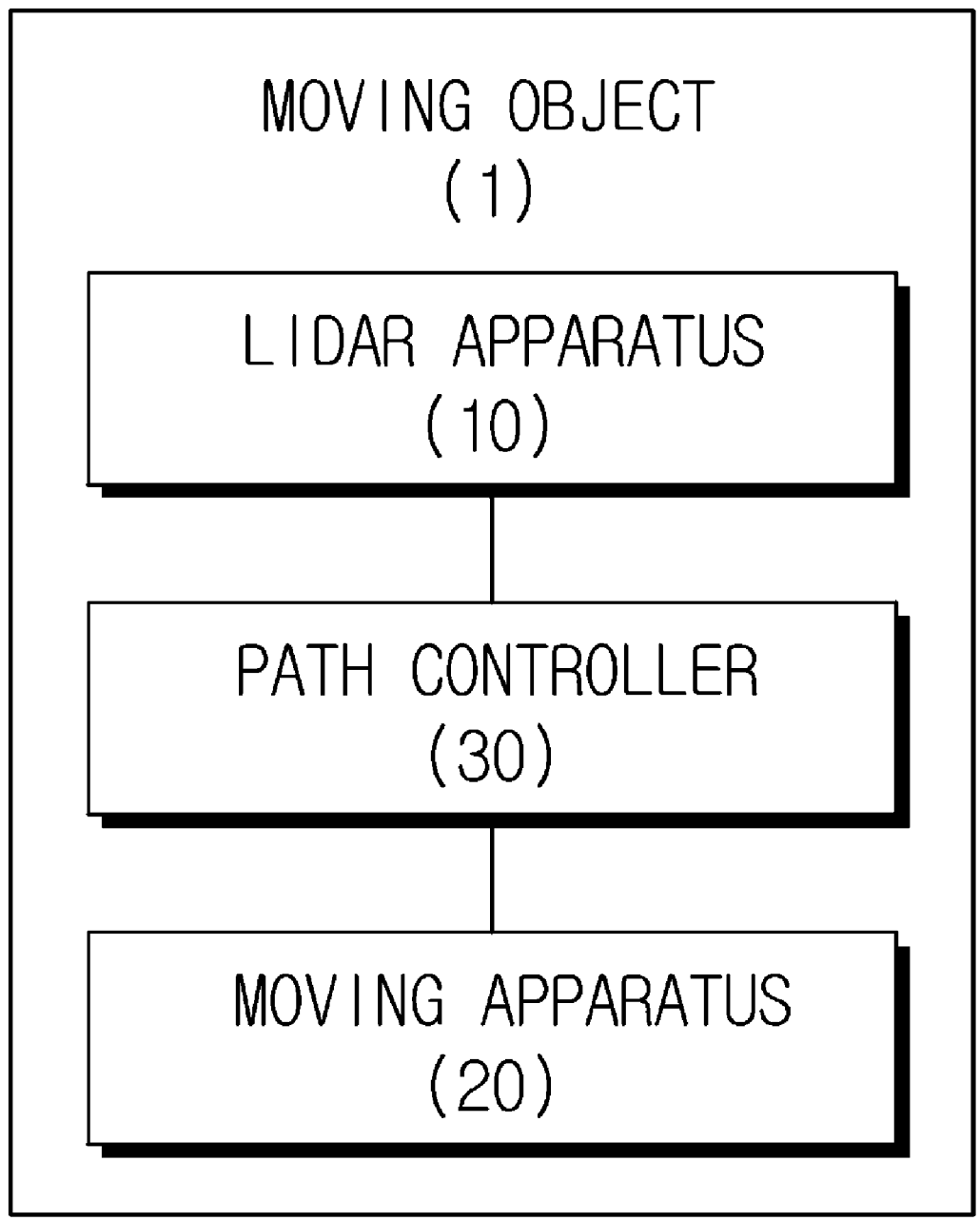
FIGS. 1 to 3 are diagrams of moving objects according to exemplary embodiments of the present invention.
Figure 2:
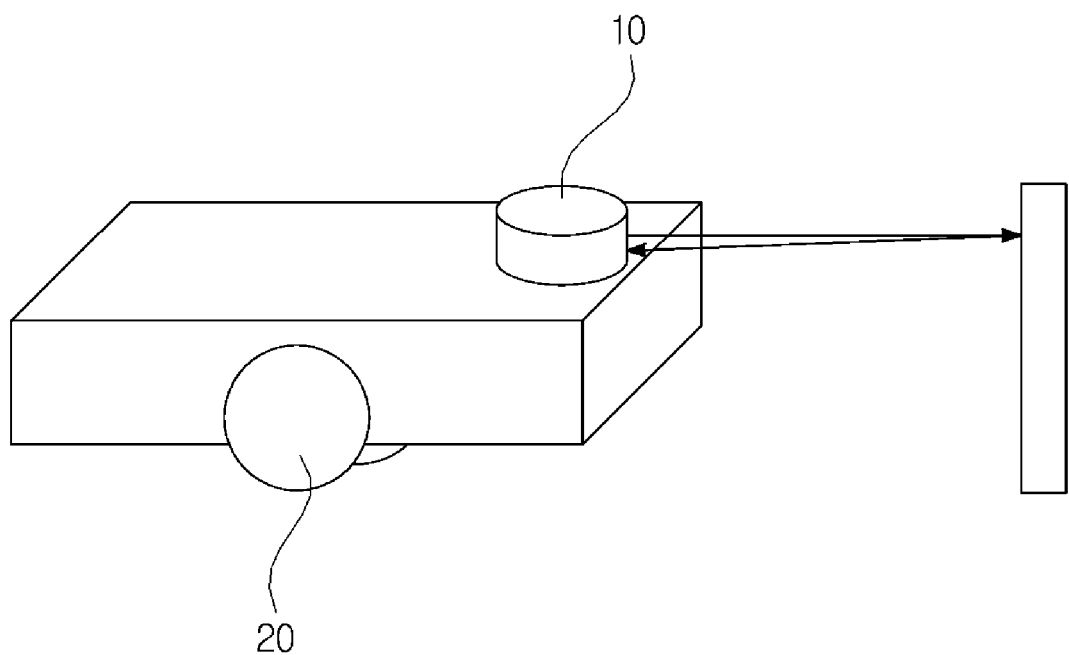
Figure 3:
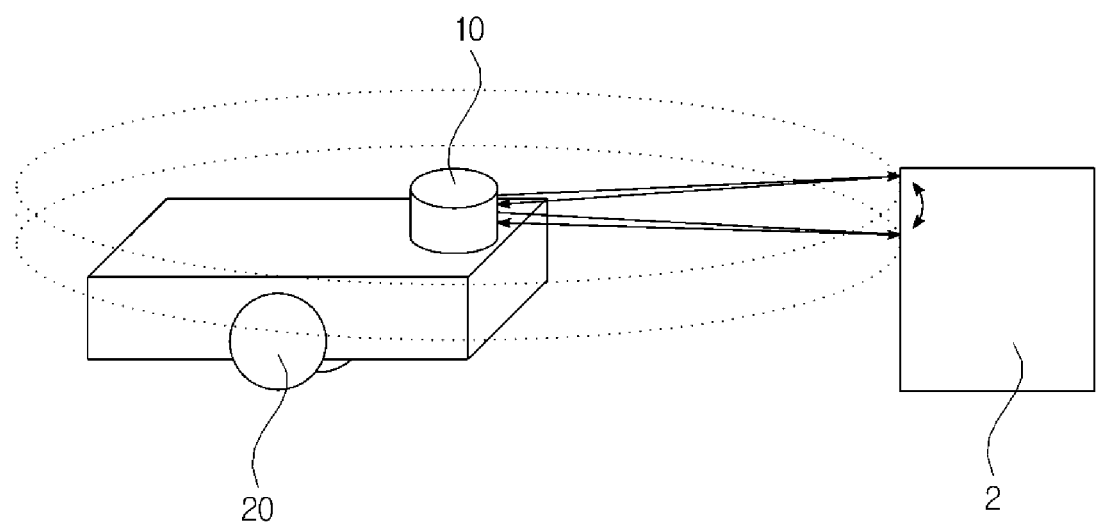

FIGS. 1 to 3 are diagrams of moving objects according to exemplary embodiments of the present invention.

As illustrated in FIG. 1, moving object 1 includes a LIDAR apparatus 10, a moving apparatus 20, and a path controller 30. Moving object 1 may omit some of the various constituent elements exemplarily illustrated in FIG. 1, or may additionally include other constituent elements. For example, the moving object may additionally include a cleaning unit.

Moving object 1 may mean an apparatus designed to be movable from a specific position to another position according to a predefined manner, and it may move from a specific position to another position by using a means of movement such as a wheel, a rail, walking legs, or other means. Moving object 1 may move according to collected information after the collection of external information using a sensor or other method, or may be moved by a user through a separate means of operation.

Examples of moving object 1 may include things such as a robot cleaner, a toy car, a moving robot that may be used for industrial purposes or military purposes and the like, and may be driven by wheels, walked using one or more legs, or implemented by combinations thereof, and the like.

A robot cleaner is an apparatus that automatically cleans a cleaning space by suctioning foreign substances such as dust accumulated on a floor while traveling in the cleaning space. Unlike a general cleaner which moves by external force implemented by a user, robot cleaners clean the cleaning space while moving according to external information or a predefined movement pattern.

The robot cleaner may automatically move using a predefined pattern, may detect external obstacles through a detection sensor and then move according to the detection results, or may be moved according to a signal transmitted from a remote control device operated by the user.

The detection sensor may be implemented as LIDAR. LIDAR is an apparatus that measures the time it takes for a laser signal to be shot, reflected and returned, and then uses the speed of light to measure the distance of a reflector. The laser signal is converted into an electrical signal through a photodiode. The laser signal may have a predetermined wavelength band.

Referring to FIGS. 2 and 3, the LIDAR apparatus 10, which calculates the time of flight between the moving object and a target object to measure the distance to the target object, is positioned on an upper end of a main body; however, this is just an example and is not limited thereto, and one or more LIDAR apparatuses may be implemented at appropriate locations according to an implemented design.

The LIDAR apparatus 10 transmits and receives light using a pair of light sources and photodiodes, and scans the surroundings in three dimensions using a movable mirror and a rotating object.

The LIDAR apparatus 10 may operate by a time of flight (TOF) scheme. In the time of flight scheme, a laser emits a pulse or a square wave signal and measures the time at which a reflection pulse or square wave signals from objects within the measurement range reach a receiver in order to measure the distance between objects to be measured and the LIDAR apparatus.

The moving apparatus 20 calculates a traveling path based on the distance to the target object, or moves the moving object through detection of obstacles. The moving apparatus 20 may move the moving object based on the relative position of an artificial landmark. The moving apparatus 20 may be implemented as the means of movement, such as the wheel, the rail, the walking leg, or the like.

<LIDAR Apparatus>

Figure 4:
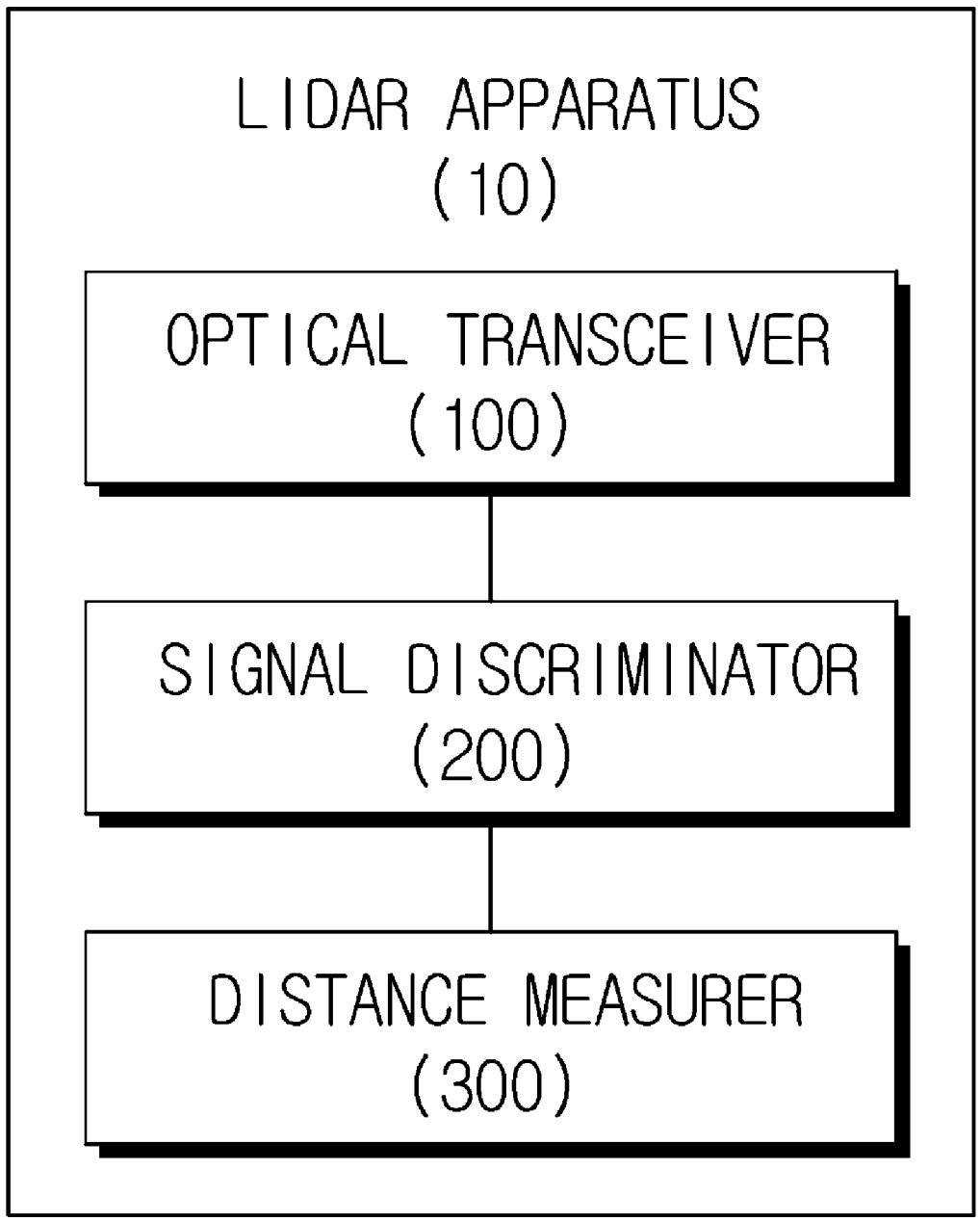
FIGS. 4 and 5 are diagrams illustrating LIDAR apparatus according to exemplary embodiments of the present invention.
Figure 5:
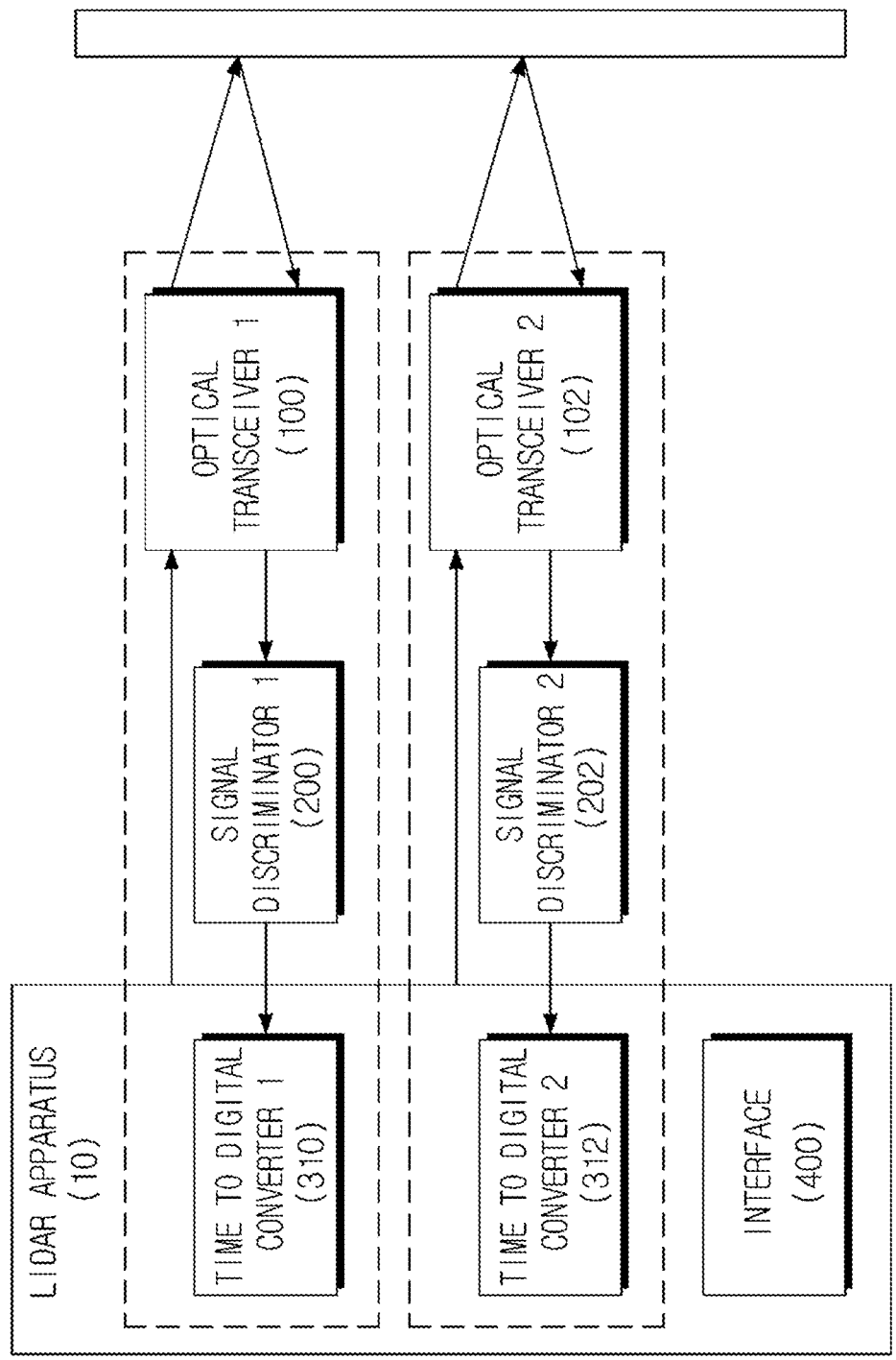
Figure 6:
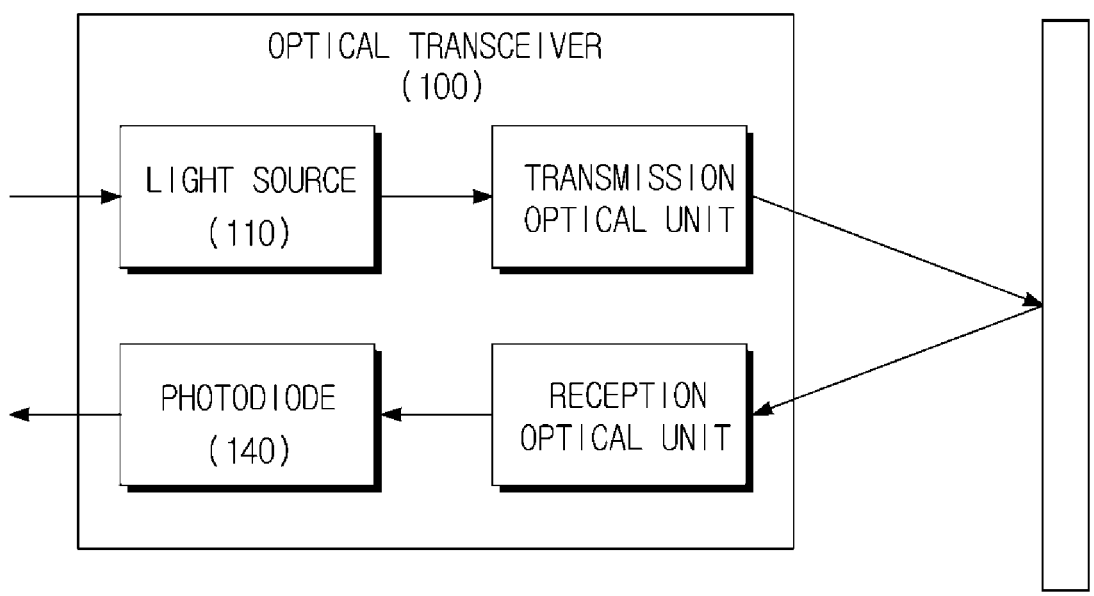

FIGS. 4 and 5 are diagrams illustrating LIDAR apparatuses according to exemplary embodiments of the present invention. The LIDAR apparatus may be implemented in the moving object or operate independently. As illustrated in FIG. 4, the LIDAR apparatus 10 includes an optical transceiver 100, a signal discriminator 200, and a distance measurer 300. The LIDAR apparatus 10 may omit some of the various constituent elements exemplarily illustrated in FIG. 4, or may additionally include other constituent elements. For example, the LIDAR apparatus 10 may additionally include an interface 400.

The optical transceiver 100 transmits the laser signal and receives the reflected signal. The optical transceiver 100 emits light to a target object in response to a start control signal, receives the light reflected by the target object, and converts the light into an electrical signal. The optical transceiver 100 outputs the electric signal for a preconfigured detection time.

The optical transceiver 100 converts the light into current or voltage and requires a circuit for buffering and scaling the output of the photodiode. For example, a transimpedance amplifier (TIA) may be connected to the photodiode. The transimpedance amplifier amplifies the current of the photodiode, converts the amplified current into a voltage, and outputs the voltage. The transimpedance amplifier may be classified as a resistive feedback TIA (R-TIA) or a capacitive feedback TIA (C-TIA).

The optical transceiver 100 may include a signal conversion unit. The signal conversion unit may be connected to the photodiode of the optical transceiver 100, and the transimpedance amplifier may be connected to the signal conversion unit.

The light source emits light toward a target object based on a preconfigured sampling period. The sampling period may be set by the control unit of the LIDAR apparatus 10. The sampling period is the time until the optical transceiver 100 converts the light into the electrical signal after the emission of light in response to the start control signal and reception of the reflected light. The optical transceiver 100 may repeat the performance of these operations in the next sampling periods.

The photodiode receives the light reflected by a target object and converts the received light into an electrical signal. The photodiode may be implemented as a PN junction photodiode, a PIN photodiode, an avalanche photodiode (APD), or the like. The photodiode outputs the electrical signal until the optical carrier disappears. In addition, as the magnitude of the output signal increases, the time it takes for the signal to disappear increases.

The signal discriminator 200 converts the electrical signal to measure an accurate point of time and outputs a stop control signal. The signal discriminator 200 converts the electrical signal so that the signal point having the maximum signal size has a preconfigured magnitude, adjusts the magnitude of the converted electrical signal, and detects a time point when the signal point has the preconfigured magnitude. The signal discriminator converts the electrical signal to generate the stop control signal.

The signal discriminator 200 receives an electrical signal from the photodiode or the transimpedance amplifier. The received electric signal, that is, the input signal, has a form in which the input signal is raised and lowered by the reflected light. The signal discriminator accurately measures a desired point of time of the input signal and outputs the electrical signal.

The signal discriminator 200 differentiates the input signal or converts the input signal using a constant fraction discriminator (CFD). The constant fraction discriminator (CFD) is a method for finding a point of time at which the point of time that a signal acquired by delaying an original signal is equal to a signal adjusted to be as large as a predetermined magnitude ratio becomes a predetermined ratio of the maximum magnitude.

The signal discriminator 200 converts the slope of the input signal so that the signal point having the maximum signal magnitude has a preconfigured magnitude. The signal discriminator 200 adjusts the magnitude of the converted input signal. The signal discriminator amplifies the magnitude of the converted input signal by an N (where N is a natural number)-th order. The signal discriminator converts the slope of the signal to be close to vertical through a plurality of amplification processes. Because the slope is large, an accurate point of time may be obtained even though the circuit is simply implemented with just a comparator.

The distance measurer 300 measures the time and distance by the time of flight scheme. The distance measurer 300 measures the distance by calculating the time of flight based on the time difference between the start control signal and the stop control signal. The distance measurer 300 calculates the distance from the time using the speed of the light.

The distance measurer 300 may include one or more time to digital converters 310 and 312 for converting the difference between two times to a digital value. The input signal of the time to digital converter may be in the form of a pulse of the same signal source, or may be an edge of a different signal source. For example, the LIDAR apparatus 10 may calculate the time difference based on the rising or falling edge of the start control signal and the rising or falling edge of the stop control signal.

The interface 400 is a communication path for transmitting/receiving information to/from other apparatuses (or hosts). Another apparatus may access the LIDAR apparatus 10 via the interface to set parameters. The LIDAR apparatus 10 may transmit the measured time and distance through the interface to another apparatus.

<Structure of Optical Transceiver>

FIGS. 6 to 15 are diagrams illustrating optical transceivers of a LIDAR apparatus according to exemplary embodiments of the present invention.

3D distance measurement systems measure the distance of a space using various sensors, including sensors such as a charge coupled device (CCD) image sensor, a complementary metal oxide semiconductor (CMOS) image sensor, an ultrasonic sensor, a laser sensor, and the like.

A normal 3D distance measurement system scans a space by rotating a 2D distance sensor which scans a plane including the center of the sensor. Since there is no limit to the cost, size, and sampling rate of an apparatus using such a 2D distance sensor, there are limits in producing such apparatus as commercial products rather than just for research purposes.

An apparatus to which a 2D photodiode array is applied measures the distance using structured light or the time of flight. Structured light is a scheme that projects a unique pattern and calculates the depth by detecting a corresponding point, while time of flight is a scheme that measures the time difference or phase difference and converts the measured time or phase difference into a distance. Apparatuses in which 2D photodiode arrays are applied have problems in that it is difficult to widen the viewing angle, and it is difficult to measure pin points due to the many pieces of three-dimensional information associated with each pixel.

A LIDAR apparatus to which a 1D photodiode array is applied includes a photodiode array and a laser diode array (or a laser diode and a diffuser). The photodiode array has a structure in which hundreds to thousands of photodiodes are arranged linearly on a silicon crystal. Since it is difficult to widen the viewing angle of LIDAR apparatuses to which 1D photodiode arrays are applied, and the modules required for implementation, such as a high efficiency diffuser, sensor array, MEMS mirror, and the like, are expensive, it is difficult to produce such LIDAR apparatuses as commercial products.

In order to solve such problems, the optical transceiver 100 is formed in a structure capable of 3D scanning.

The optical transceiver 100 may simultaneously detect obstacles in a horizontal direction and a ground direction by setting the angles of a plurality of mirrors differently. The optical transceiver 100 connects mirrors to a transmission optical unit 120 and a reception optical unit 130, respectively, and rotates the transmission optical unit 120 and the reception optical unit 130 to detect the obstacles in all directions. For example, scan lines may be set to 45 degrees and 60 degrees, respectively, and two or more may be configured.

The optical transceiver 100 may be positioned at an upper front part in the movement direction of the moving object 200, and the two or more optical transceivers 101 and 102 may be mounted to have different transmission signal emission angles from each other in a horizontal downward direction. In the exemplary embodiment, the multi-channel LIDAR means one LIDAR including an optical transceiver that emits or receives multiple lasers.

Figure 9:
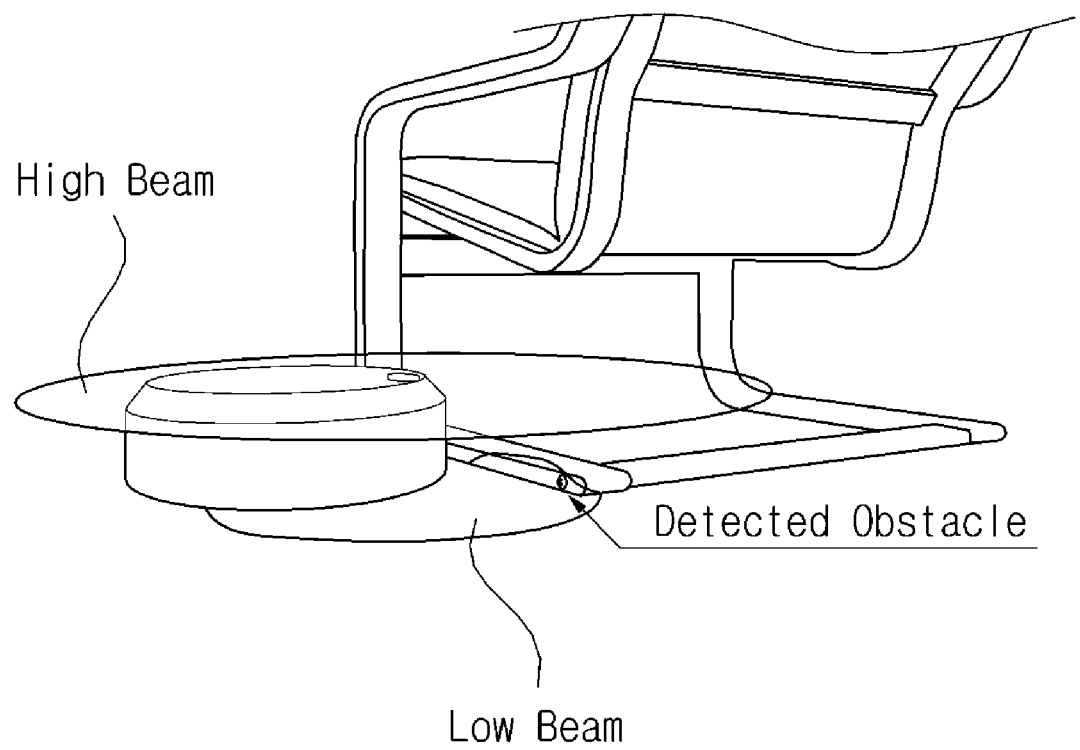
Figure 10:
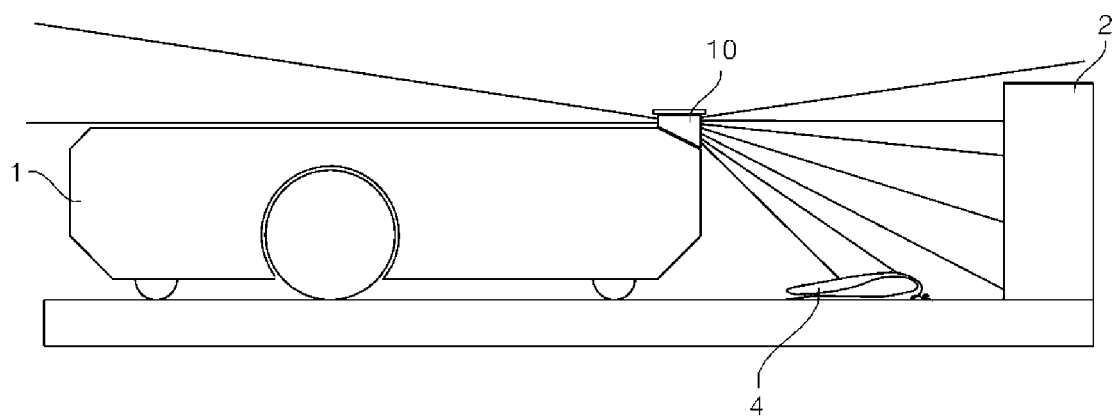

FIG. 9 is an operational example of a moving object 1 equipped with a two-channel distance measurer using a high beam and a low beam, and FIG. 10 is an operational example of a moving object 1 equipped with a multi-channel LIDAR apparatus 10 capable of sensing both a high obstacle 2 and a low obstacle 4. When the moving object 1 uses the two-channel distance measurer, the moving object 1 may use any one channel (e.g., low beam) in a horizontal direction to the ground, and the other channel (e.g., high beam) in a diagonal direction to the ground.

Figure 12:
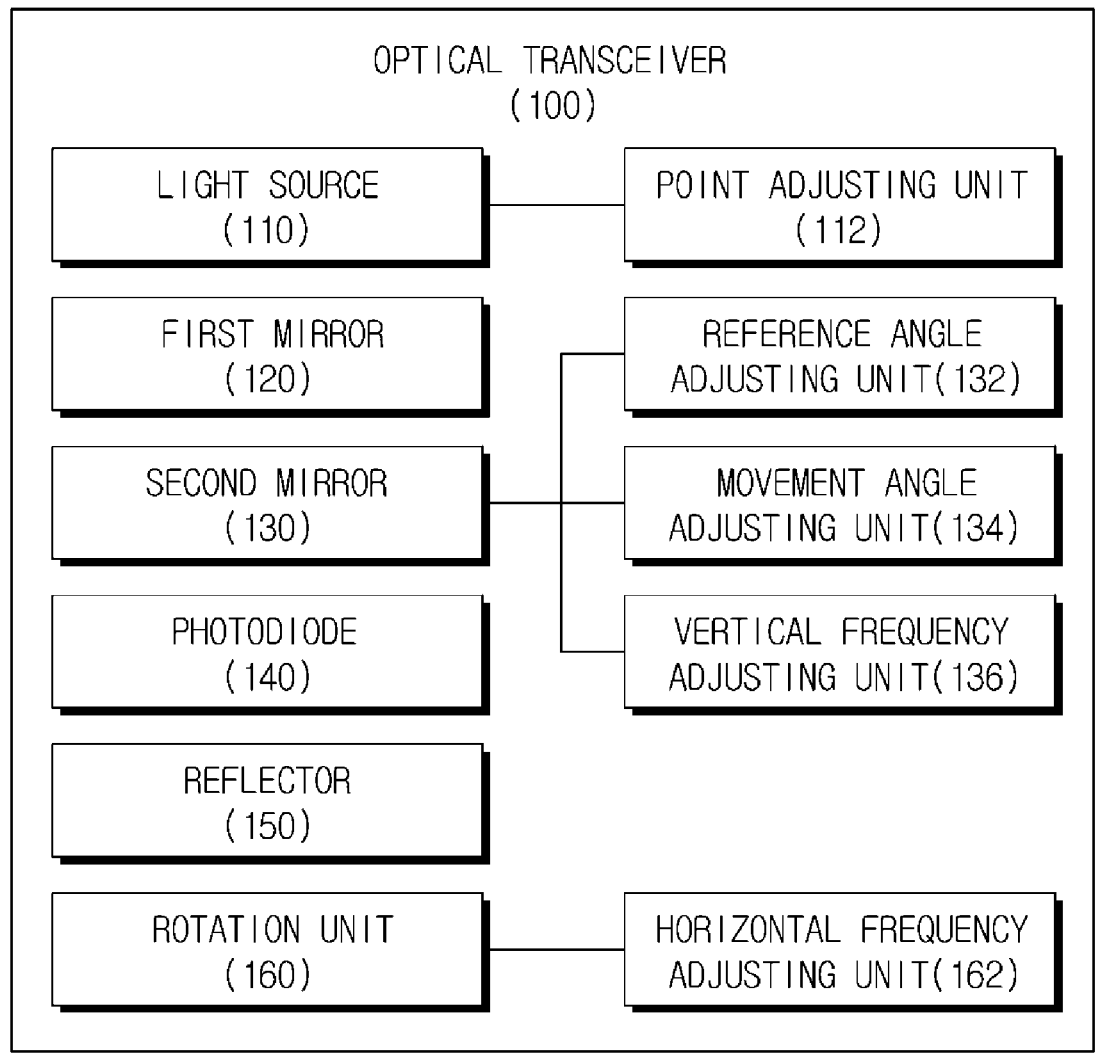

Referring to FIG. 11, an optical transceiver 100 includes a light source 110, a first mirror 120, a second mirror 130, and a photodiode 140. The optical transceiver 100 may omit some of the various constituent elements exemplarily illustrated in FIG. 11, or may additionally include other constituent elements. Referring to FIG. 12, the optical transceiver 100 may additionally include a reflector 150, a rotation unit 160, a point adjusting unit 112, a reference angle adjusting unit 132, a movement angle adjusting unit 134, a vertical frequency adjusting unit 136, a horizontal frequency adjusting unit 162, or a combination thereof.

The light source 110 is a device that emits light and may be implemented as a laser diode (LD), or the like. The light source may generate nanosecond laser pulse signals. The laser signals may have a preconfigured wavelength band. The light source 110 may be connected to the point adjusting unit 112 which controls the number of point cloud data points acquired per unit of time by controlling the speed at which the light source emits light based on a preconfigured sampling period. For example, the point adjusting unit 112 may set the emission speed of the light source 110 to obtain 10K points per second.

The first mirror 120 includes a hole through which the emitted light passes. That is, the hole is designed to penetrate the reflective surface. By forming a movement path of the light so as to pass through the first mirror 120, the optical transceiver 100 may minimize the size of the optical transceiver 100 while maintaining a straight path of light from the light source 110 to the second mirror 130. The reflective surface of the first mirror 120 does not adopt optical components such as a two way mirror or a half mirror that transmits some of the light because such optical components generally lower sensitivity. The hole is punched at the center of the mirror and allows several millimeters of light to pass through the hole to form the movement path of light to the second mirror 130.

The first mirror 120 is formed as a curved surface and has a focus at which the rays reflected by the reflective surface of the first mirror 120 converge. The size of the reflective surface of the first mirror 120 is of an appropriate size based on the distribution of the reflected light according to the angle of the moving second mirror 130. The first mirror 120 performs condensing and reflecting functions using a parabolic reflecting mirror (a form in which a lens and a mirror are integrated). That is, the light reflected again through the second mirror 130 is collected and sent to the reflector 150.

The reflector 150 is positioned at the focus of the curved surface of the first mirror 120. The reflector 150 receives the light reflected from the first mirror 120 and reflects the light to the photodiode 140. The rays reflected by the curved surface of the first mirror 120 may be directly received by the photodiode 140, but the rays reflected by the curved surface of the first mirror 120 after passing through the reflector 150 may move in a vertical direction to the photodiode 140. That is, the reflected rays may form a parallel straight path or one straight path before entering the photodiode 140. The photodiode 140 is positioned on a virtual straight path passing through the focus of the first mirror 120.

The second mirror 130 reflects the light passing through the hole of the first mirror to a target object, and then receives the light reflected from the target object and reflects it back to the first mirror. The second mirror 130 moves in a preconfigured cycle to change the slope of the normal of the second mirror. The second mirror 130 is a movable mirror and may move by bending, tremor, reciprocating, seesaw, or rotating motions, or a combination thereof. For example, the second mirror 130 may be implemented as a swing mirror.

A reference angle adjusting unit 132 may be connected to the second mirror 130 for adjusting the installation angle of the second mirror 130. For example, the reference angle adjusting unit 132 may set the normal of the second mirror 130 to −55 degrees with respect to the horizontal plane of the ground to set the second mirror 130 to be inclined at 45 degrees.

A movement angle adjusting unit 134 may be connected to the second mirror 130 for changing the movement angle of the second mirror 130. For example, the movement angle adjusting unit 134 may set the second mirror 130 to swing at +/−10 degrees.

A vertical frequency adjusting unit 136 may be connected to the second mirror 130 for changing the vertical movement period of the second mirror 130. For example, the vertical frequency adjusting unit 136 may set the second mirror 130 to vibrate at 200 Hz.

The photodiode 140 is a device that receives the light reflected from the second mirror 130 or the reflector and converts it into an electrical signal. The principle that when light with photon energy strikes a diode, movable electrons and positive charge holes are generated, resulting in the activity of electrons, may be applied to the photodiode 140. The photodiode 140 may be implemented as a PN junction photodiode, a PIN photodiode, an avalanche photodiode (APD), or the like.

The optical transceiver 100 adjusts the movement path and the angle of the light by using the moving second mirror 130 to secure a vertical field of view, thereby enabling pin point measurement, unlike existing devices implemented as a single lens and photodiode arrays in the related art.

The optical transceiver 100 may include a transmission optical unit and a reception optical unit. The transmission optical unit and reception optical unit may be paths of the laser signal and may be formed in a barrel structure. The optical transceiver 100 may simultaneously detect obstacles in a horizontal direction and a ground direction by setting the angles of a plurality of mirrors differently. Mirrors are connected to the transmission optical unit and the reception optical unit, respectively, and the transmission optical unit and reception optical unit are rotated to detect the obstacles in all directions. For example, the scan lines may be set to 45 degrees and 60 degrees, respectively, and two or more scan lines may be configured.

The optical transceiver 100 may include a rotation unit 160. The optical transceiver 100 performs horizontal scanning through use of the rotation unit 160. The rotation unit 160 rotates the light source 110, the first mirror 120, the second mirror 130, and the photodiode 140 based on a rotational axis. The light source 110 and the photodiode 140 are installed on a support and operate a driving device such as a motor connected to the support.

The rotation unit 160 may be connected to a horizontal frequency adjusting unit 162 for adjusting the rotational speed of the rotation unit 160. For example, the horizontal frequency adjusting unit 162 may set the rotation unit 160 to rotate at 5 Hz.

Figure 13:
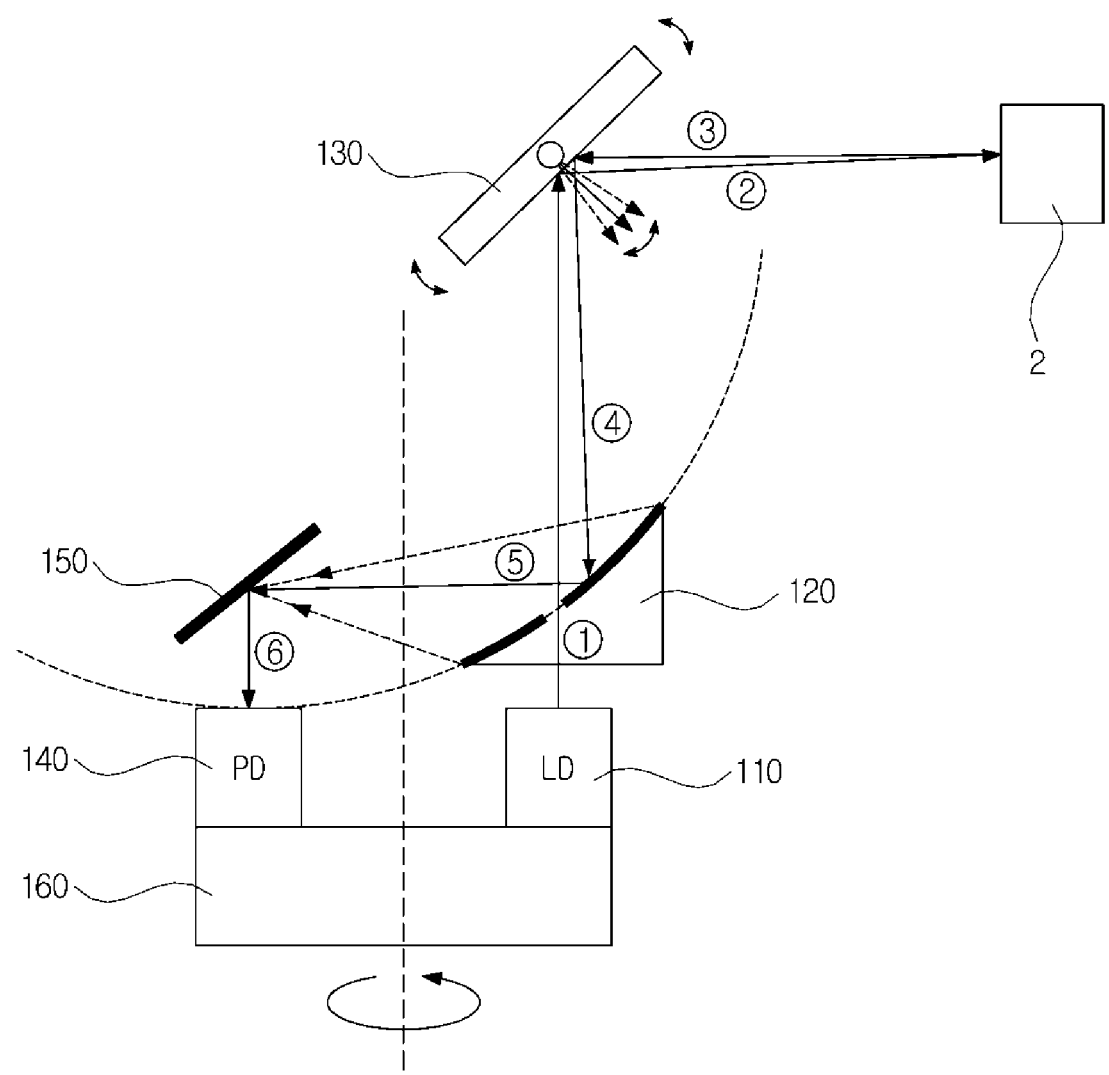

Referring to FIG. 13, the light emitted from the light source 110 may form movement paths from 1) to 6).

1) The light emitted from the light source 110 moves to the second mirror 130 in a linear path through the hole of the first mirror 120. The light emitted from the light source 110 may be collimated through a collimator. The collimator makes the incident rays parallel.

2) The light reflected from the moving second mirror 130 moves to the target object 2 according to the angle of the second mirror 130.

3) The light reflected from the target object 2 moves to the second mirror 130 in a linear path.

4) The light reflected from the moving second mirror 130 moves to the first mirror 120.

5) The light collected at the first mirror 120 moves to the reflector 150.

6) The light reflected from the reflector 150 moves to the photodiode 140 in a linear path.

As illustrated in FIG. 13, the movement path of the light may be adjusted according to the deployment of the hole of the first mirror, the second mirror, the reflector, and the photodiode, and thereby, by locating the light source and the photodiode adjacent to each other, the sizes of the optical transceiver 100 and the rotating object may be minimized, and the rotational radius of the rotating object 160 may also be minimized.

Figure 14:
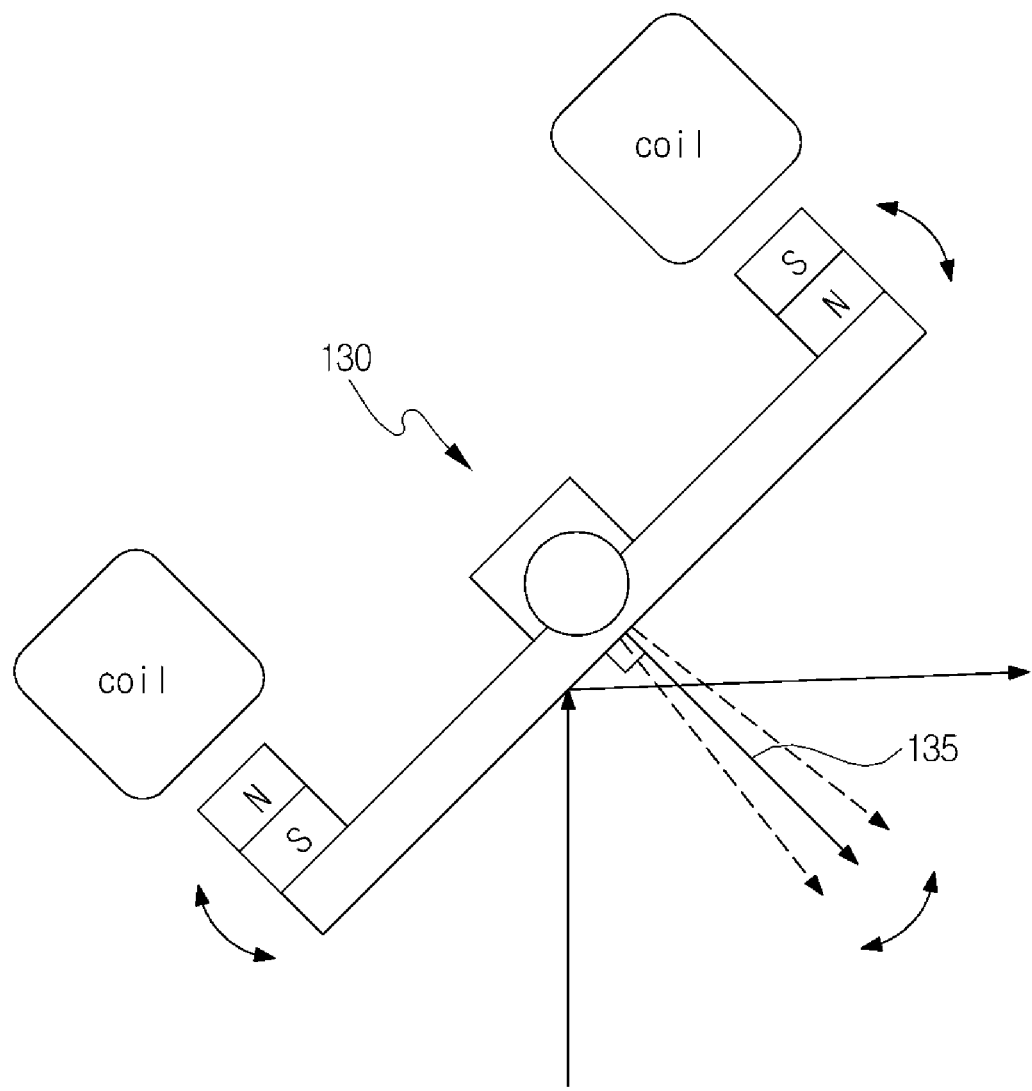
Figure 15:
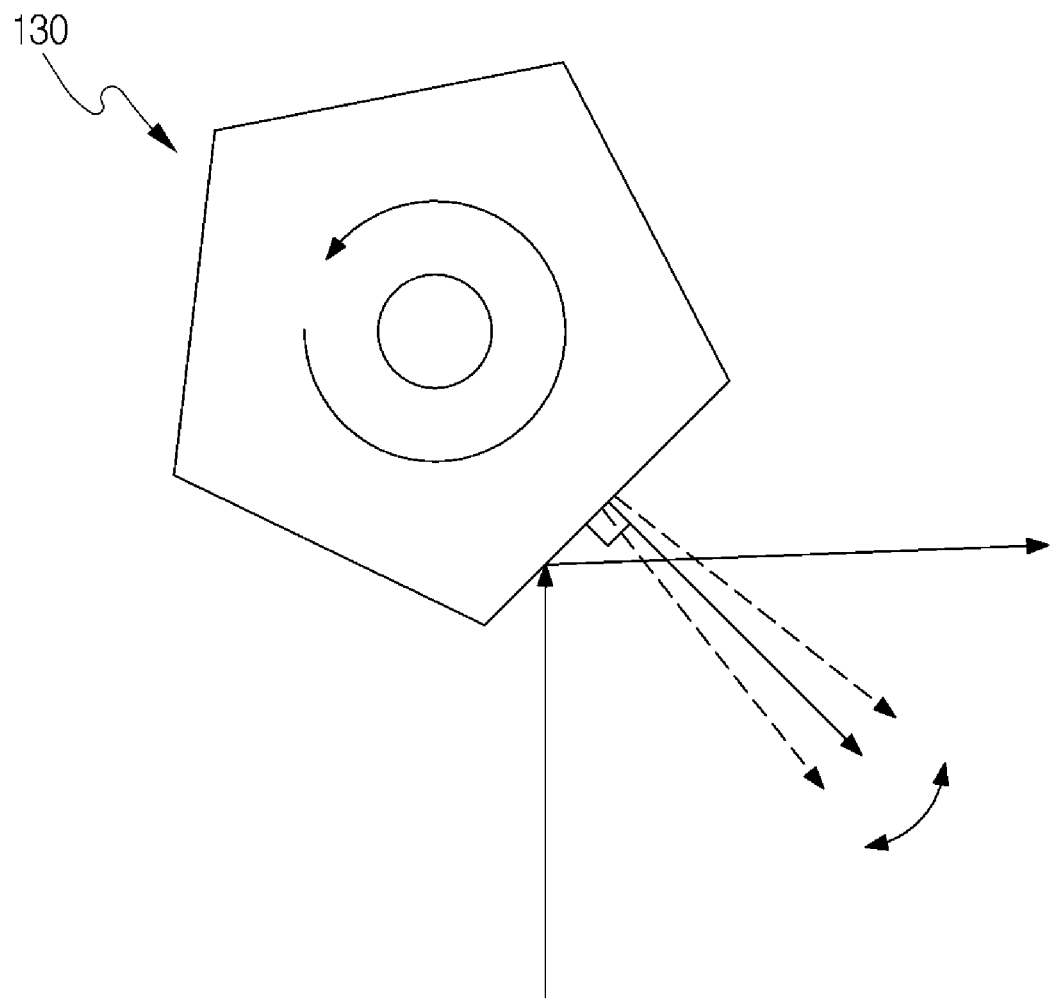

FIGS. 14 and 15 are diagrams illustrating movement schemes of a movable mirror of the optical transceiver.

Referring to FIG. 14, the second mirror 130, which is the movable mirror, may be moved using electromagnetic force generated by a magnet and a coil. A soft hinge is located in the center of the mirror, and permanent magnets are positioned at both ends of the mirror. The coil is located at the end (or at a point close to the end) of the rear surface of the reflective surface. When current flows through the coil periodically changing direction, the second mirror is shaken. Here, since force generated by the magnet and the coil is small, in order to move the second mirror 130 or a normal 135 of the second mirror 130 at a high frequency, it is necessary to use a hinge material capable of moving the hinge smoothly. As the tension of the hinge becomes stronger, the second mirror 130 may be moved with less force, but it is difficult to make high-frequency movement.

Figure 7:
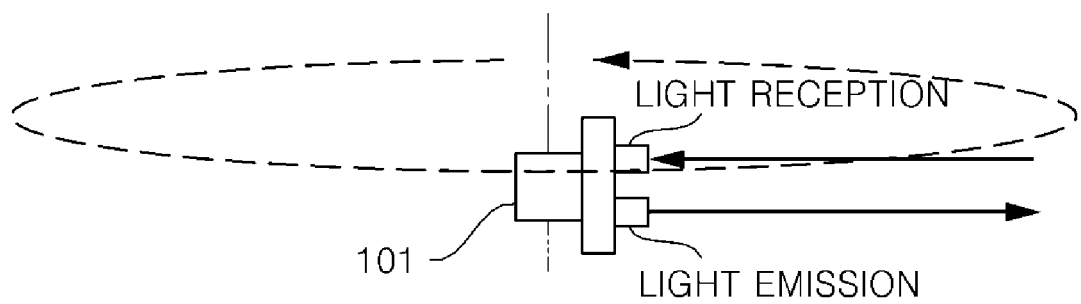

The movable mirror may adopt MEMS technology or an ultrasonic motor (Piezo Motor), and it is preferable that the movable mirror operate in a structure like that illustrated in FIG. 7 in consideration of cost effectiveness.

Structures like that illustrated in FIG. 14 may adopt a scheme in which a polyhedron is rotated in connection with the motor, since the vertical scanning speed may be low. FIG. 15 illustrates a structure in which the second mirror 130, which is the movable mirror, is formed as a polygonal column which may move by rotating the rotational axis. The optical transceiver may adjust the slope of the normal of the reflective surface differently at every periodic point of time by controlling the relationship between the rotational speed of the second mirror 130 and the emission speed of the light source.

The LIDAR apparatus 10 controls the vertical scanning movement of the second mirror through a control unit implemented as an FPGA, or the like. The control unit periodically transmits +/− signals to swing the second mirror. When the signal is a periodic waveform, the angle of the mirror is fixed according to the periodic timing. As necessary, the angle may be measured by mounting a PSD sensor on the rear surface of the mirror.

The LIDAR apparatus 10 adjusts the horizontal rotation movement through the control unit implemented as an FPGA, or the like. The control unit controls the rotational speed of the rotation unit and measures the angle of rotation through an encoder located inside or outside of the rotating object.

The control units for controlling the vertical scanning movement of the second mirror and for controlling the horizontal rotation movement may be implemented as independent modules from each other.

The distance measurer 300 receives the vertical angle from the control unit which controls the vertical scanning movement of the second mirror and receives the horizontal angle from the control unit which controls the horizontal rotation movement, and stores said vertical and horizontal angles.

The photodiode of the LIDAR apparatus 10 receives the light emitted from the light source, and the LIDAR apparatus 10 calculates the time of flight (ToF). The LIDAR apparatus 10 transmits the vertical angle, horizontal angle, and time of flight to a host via an interface. The time of flight may be corrected or calibrated. The LIDAR apparatus 10 may perform filtering to remove the noise for at least one of the vertical angle, horizontal angle, and flight time before transmitting data to the host.

<Point Cloud Data>

Figure 16:
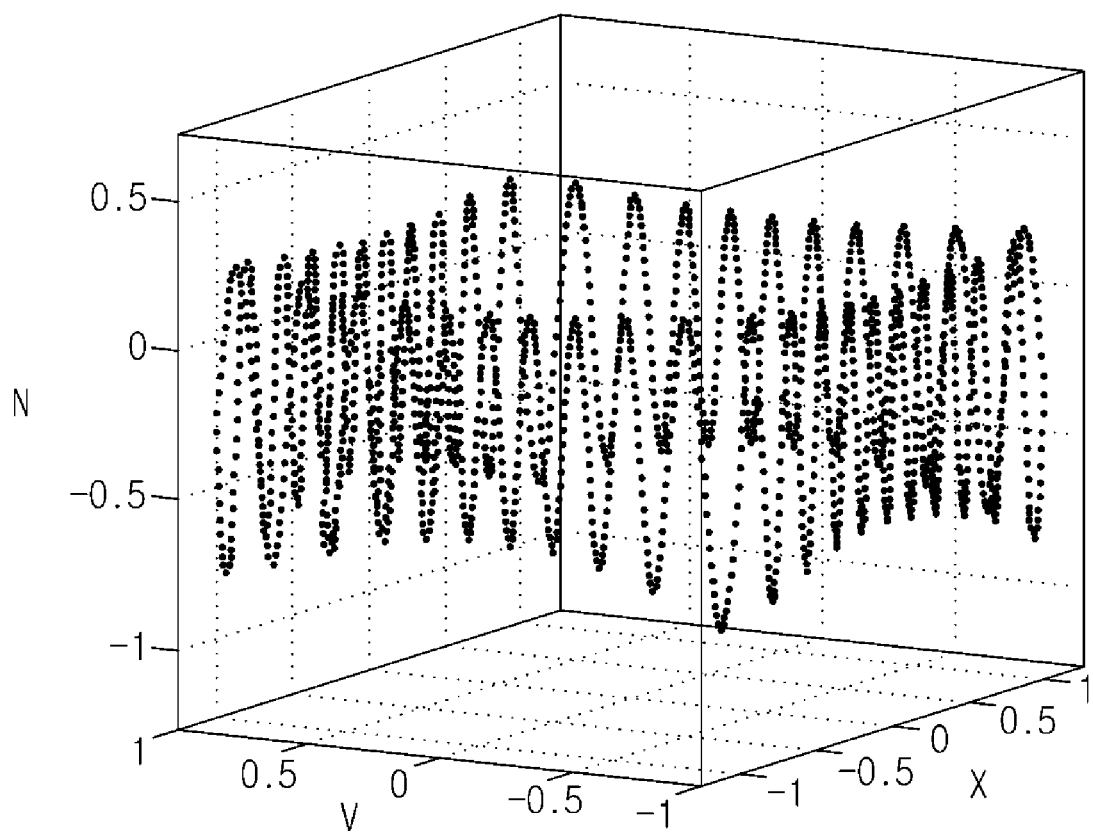
FIGS. 16 and 17 are diagrams illustrating point cloud data generated by a moving object according to exemplary embodiments of the present invention.
Figure 17:
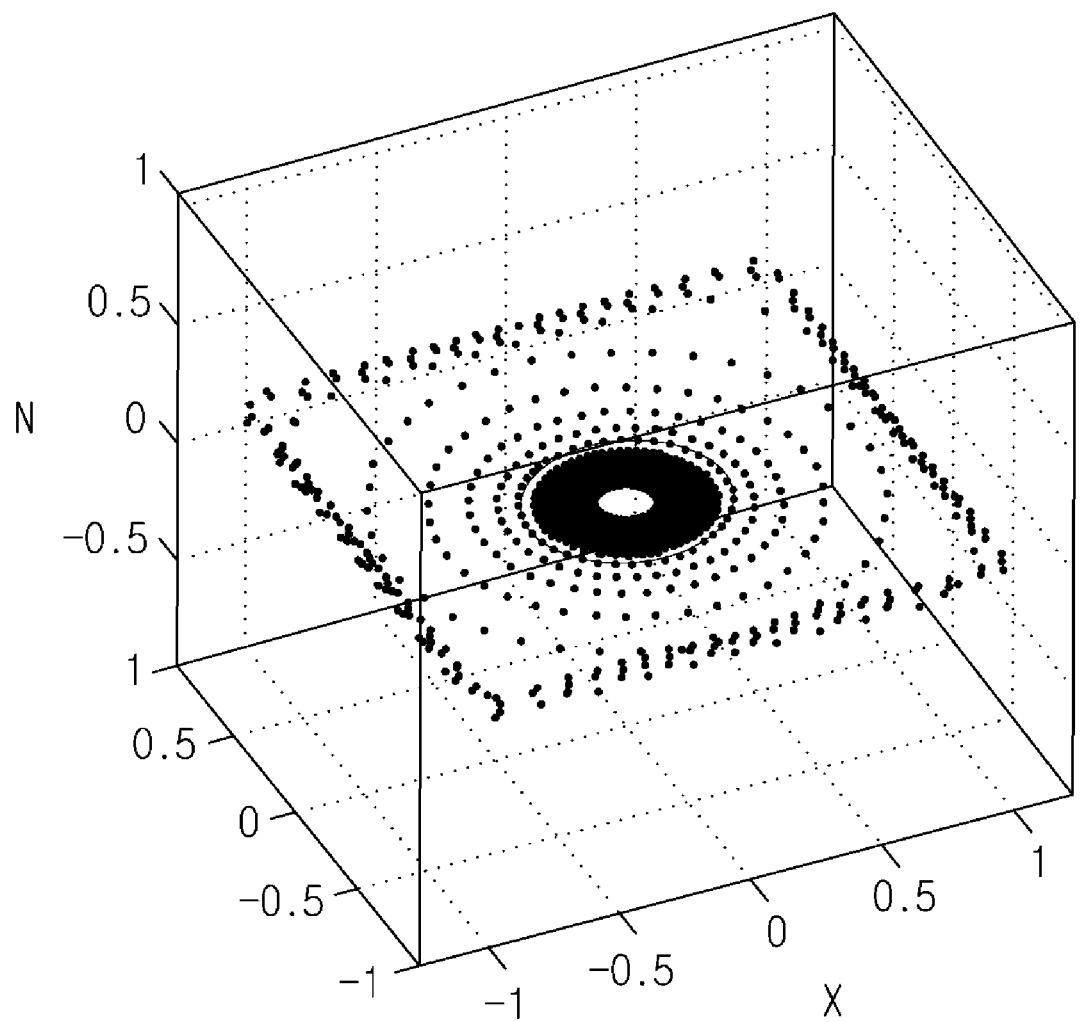

FIGS. 16 to 17 are diagrams illustrating point cloud data generated by a moving object, according to exemplary embodiments of the present invention. The point cloud data is displayed in units of meters.

FIG. 16 illustrates the point cloud data acquired using an optical transceiver having the structure illustrated in FIG. 13. When (i) setting the normal of the movable mirror to −55 degrees relative to the horizontal plane of the ground to set the movable mirror to be inclined at 45 degrees, (ii) setting the rotation unit to rotate at 5 Hz, (iii) setting the movable mirror to swing at an angle of +/−10 degrees and to vibrate at 200 Hz, and iv) setting the emission speed of the light source or the sampling rate of the LIDAR apparatus so as to obtain 10K points per second, the LIDAR apparatus may obtain the 3D point cloud data illustrated in FIG. 16.

An application which needs to measure a bottom surface together may obtain point cloud data like that illustrated in FIG. 17. When (i) setting the normal of the movable mirror to −55 degrees relative to the horizontal plane of the ground, (ii) setting the rotation unit to rotate at 10 Hz, (iii) setting the movable mirror to swing at an angle of +/−10 degrees and to vibrate at 800 Hz, iv) setting the emission speed of the light source and the sampling rate of the LIDAR apparatus so as to obtain 10K points per second, and (v) setting the height of the optical transceiver to 0.1 meters, the LIDAR apparatus may obtain the 3D point cloud data illustrated in FIG. 17.

Numerical values set by the point adjusting unit 112, the reference angle adjusting unit 132, the moving angle adjusting unit 134, the vertical frequency adjusting unit 136, and the horizontal frequency adjusting unit 162 may adopt appropriate numerical values according to each implemented design.

<Signal Conversion Unit of the Optical Transceiver>

FIGS. 18 to 21 are diagrams illustrating signal conversion units of an optical transceiver of a LIDAR apparatus, according to exemplary embodiments of the present invention.

Not only does the electrical signal output from the photodiode contain noise according to the circuit characteristic of the photodiode, but the signal output time is also non-uniform due to the various signal sizes.

Figure 18:
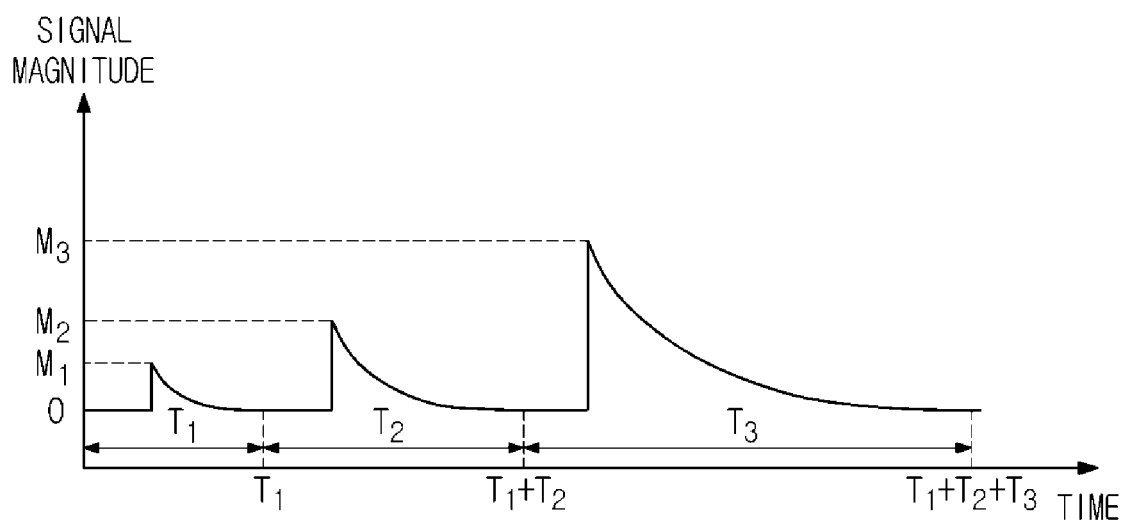
FIGS. 18 to 21 are diagrams illustrating signal conversion units of optical transceivers of a LIDAR apparatus according to exemplary embodiments of the present invention.

There is a problem in that the LIDAR needs to wait until the optical carrier of the photodiode disappears, even after the reflected laser signal passes through the photodiode. In FIG. 18, the electrical signal output from the photodiode is illustrated. As illustrated in FIG. 18, the electric signal output from the photodiode requires a considerable amount of time for the signal to disappear. In particular, there is a problem in that the time required for the signal to disappear increases as the magnitude of the output signal increases.

The optical transceiver 100 is implemented in the moving object or the LIDAR apparatus, or operates independently.

Figure 19:
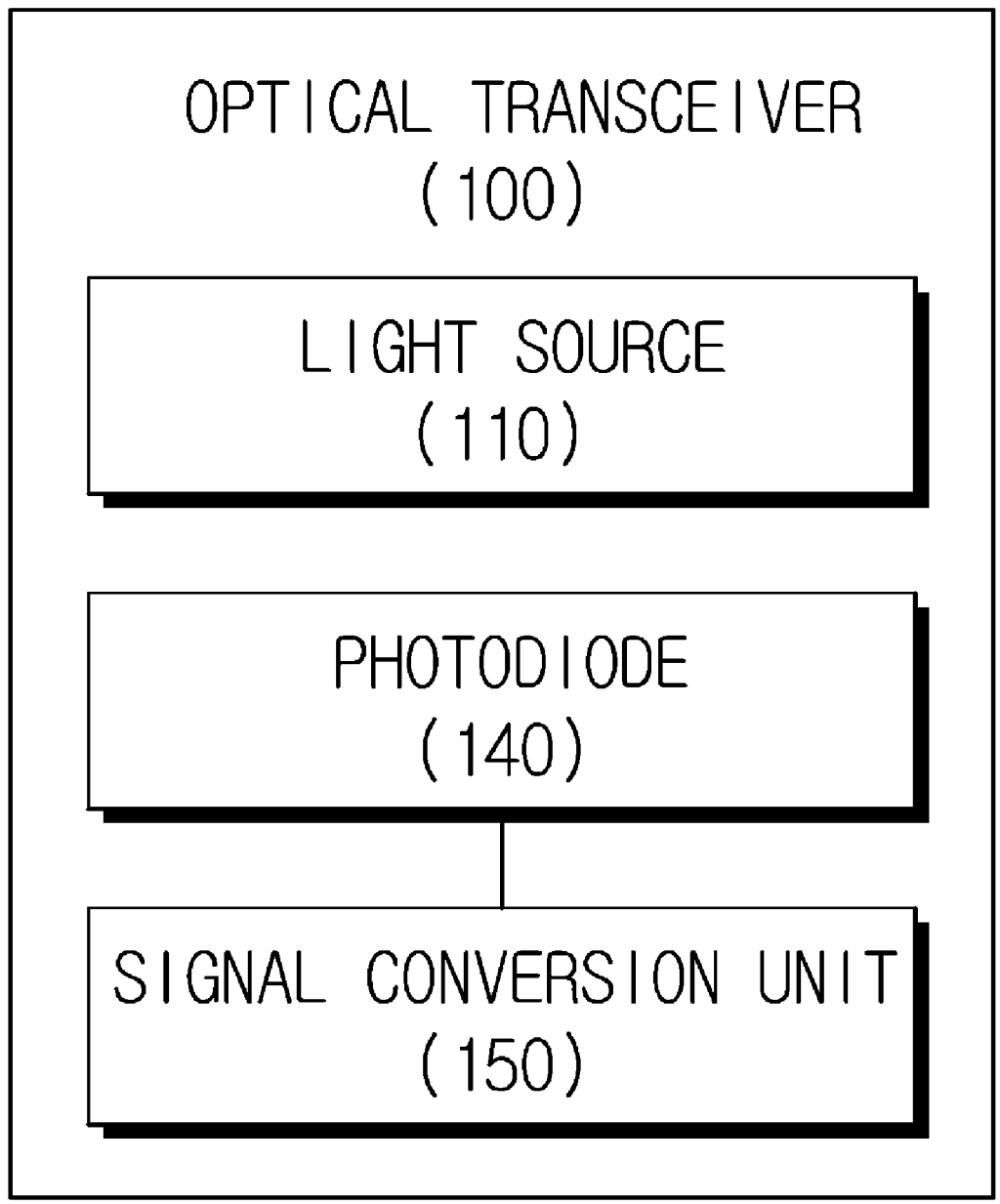
Figure 20:
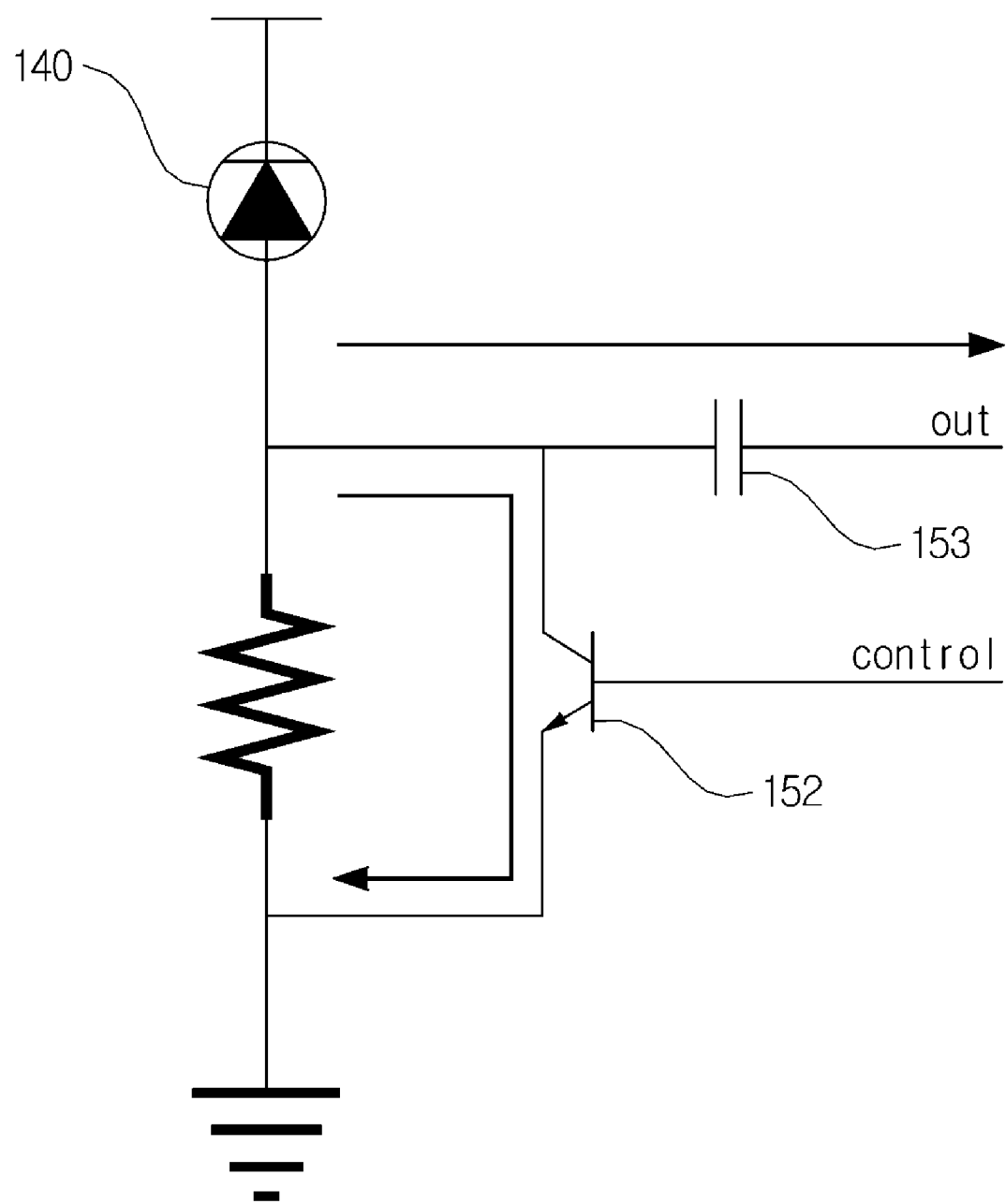
Figure 21:
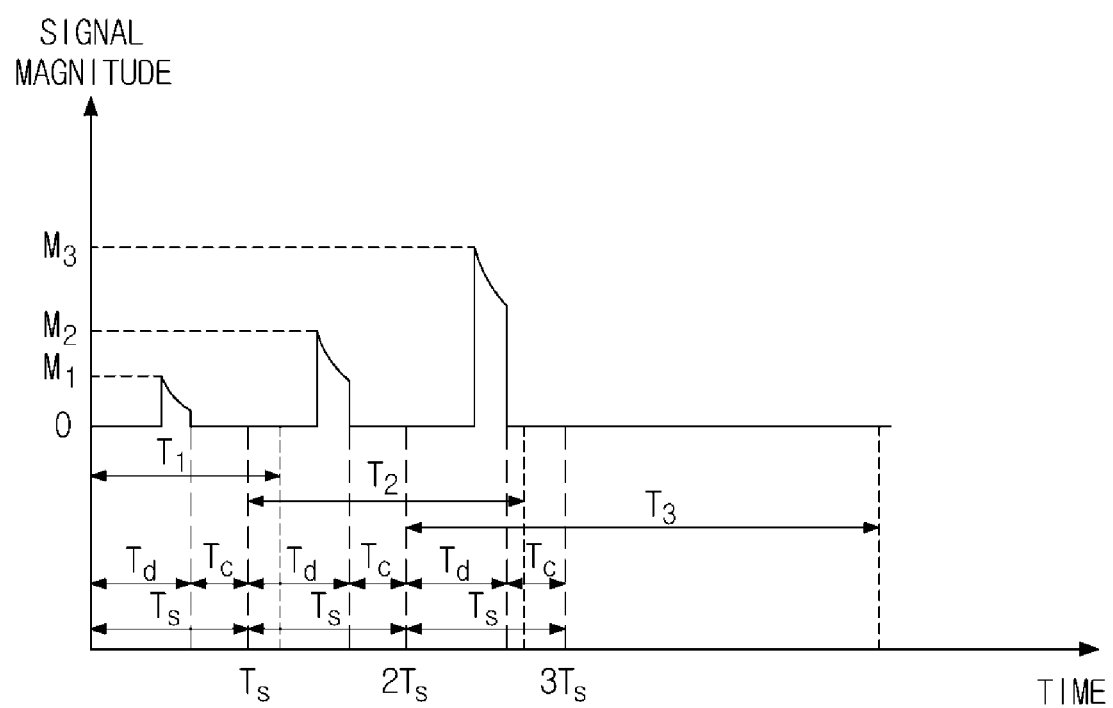

FIG. 19 is a block diagram illustrating the optical transceiver, FIG. 20 is a circuit diagram illustrating the optical transceiver, and FIG. 21 is a diagram illustrating the signal output from the optical transceiver.

As illustrated in FIG. 19, the optical transceiver 100 includes a light source 110, a photodiode 140, and a signal conversion unit 150. The optical transceiver 100 may omit some of the various constituent elements exemplarily illustrated in FIG. 19, or may additionally include other constituent elements. For example, a transimpedance amplifier may be connected to the signal conversion unit 150.

The light source 110 emits light to the target object based on a preconfigured sampling period. The sampling period may be set by the control unit of the LIDAR apparatus 10. The sampling period is the time until which the optical transceiver 100 emits the light, receives the reflected light, and converts the light into an electrical signal in response to the start control signal. The optical transceiver 100 may repeat such operations in the next sampling periods.

The photodiode 140 receives the light reflected by the target object and converts it into an electrical signal. The photodiode 140 may be implemented as a PN junction photodiode, a PIN photodiode, an avalanche photodiode (APD), or the like. As illustrated in FIG. 1, the photodiode 140 outputs the electrical signal until the optical carrier disappears. Moreover, as the magnitude of the output signal increases, the time required until the signal disappears increases.

Figure 8:
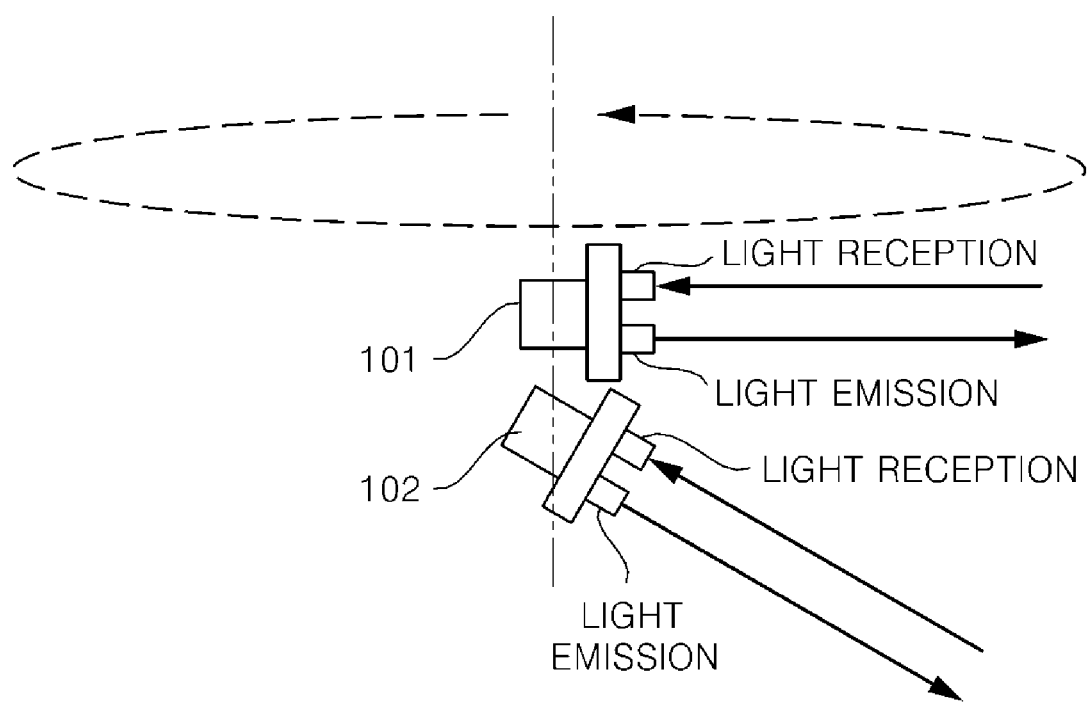

The signal conversion unit 150 outputs an electric signal during the detection time within the sampling period so as not to be limited by the time required for the output signal to disappear. Referring to FIG. 8, the signal conversion unit 150 may include a resistor 151, a switch 152, and a capacitor 153.

The resistor 151 is connected to the photodiode 140. One end of the resistor 151 is connected to the photodiode 140 and the other end of the resistor 151 is grounded. The resistor 151 may be connected to an anode or a cathode of the photodiode 140.

When a resistance value is small, a waveform has a value other than 0 for a time similar to the time when light passes through the photodiode 140, but there is a problem in that the magnitude of the output signal is small. Therefore, it is necessary to amplify the magnitude of the electrical signal using a resistor having a value larger than the preconfigured value relating to the resistor 151. In this case, as illustrated in FIG. 1, a trailing phenomenon of the signal occurs.

In order to solve the trailing phenomenon of the signal, the transfer path of the electrical signal is changed using the switch 152. The optical transceiver 100 may output a signal in which a part of an area where the magnitude of the electrical signal decreases is removed. Even if the rear end of the electric signal is removed, the LIDAR apparatus 10 may measure the distance. This is because the signal discriminator 200 detects not the end timing of the electrical signal, but the start time point and the time point of maximum magnitude of the electrical signal, to output the rising and falling edge.

The switch 152 is connected in parallel to the resistor 151 to change the transfer path of the electrical signal. For example, the switch 152 may be implemented as a transistor, or the like.

Referring to FIG. 21, the switch 152 (i) transfers the electrical signal to a first path during a detection time $T_d$ within a sampling period $T_s$ and (ii) transfers the electrical signal to a second path during a blocking time $T_c$ within the sampling period $T_s$. The first path is a path in which the signal is transferred through the capacitor 153, and the second path is a path in which the signal is transferred through the switch 152 to be grounded.

Even if signal disappearance times T1, T2, and T3 are incurred due to the trailing phenomenon of the electrical signal output from the photodiode 140 in the exemplary embodiments, the signal may be processed according to the sampling period without the need to wait until the signal disappears.

The LIDAR apparatus 10 adjusts the sampling period, calculates and sets an appropriate detection time according to the sampling period, and controls the on/off operation of the switch 152. The control unit of the LIDAR apparatus 10 may control the on/off operation of the switch by referring to the sampling period, detection time, cutoff time, waveform of the emitted light, on/off time interval of the light source, pulse width of the start control signal, pulse width of the stop control signal, rotational speed of the optical transceiver, and signal processing and waiting time of the signal discriminator and time calculator, and the like.

The capacitor 153 is connected to a point where the photodiode 140 and the resistor 151 are connected to output the electrical signal. The capacitor 153 serves to remove the DC component of the electrical signal. A non-inverting amplifier circuit may be connected to the rear end of the capacitor 153.

<Signal Discriminator>

FIGS. 22 to 27 are diagrams illustrating signal discriminators of the LIDAR apparatus, according to the exemplary embodiments of the present invention.

There is a scheme that detects a zero by converting the signal using a method that calculates the peak timing of a reflected signal in the LIDAR apparatus. In reality, reflected signals contain noise, so the timing at which the signal magnitude becomes zero may not be used as a target. A zero crossing detector needs to be additionally implemented.

Figure 22:
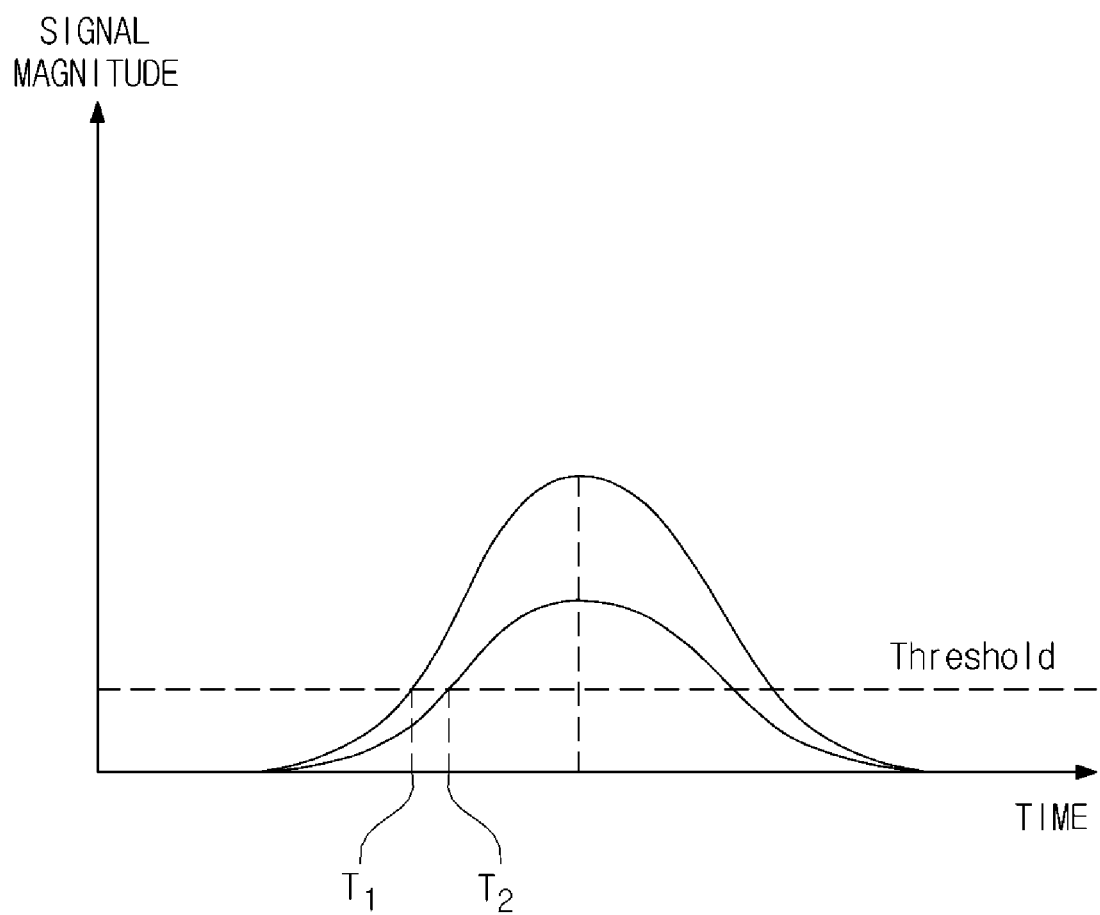
FIGS. 22 to 27 are diagrams illustrating signal discriminators of the LIDAR apparatus according to the exemplary embodiments of the present invention.

There is a scheme that uses one threshold value as a method for calculating the timing of the reflected signal in the LIDAR. Such a scheme has a problem in that it is difficult to calculate an accurate point of time because the form of the signal varies depending on the amount of reflected light. That is, walk error occurs. Referring to FIG. 22, it can be easily understood that different timings $T_1$ and $T_2$ are calculated depending on the signal form.

There is a scheme that uses a plurality of threshold values as the method for calculating the timing of the reflected signal in the LIDAR, but such a scheme has a problem in that circuit complexity increases due to feedback of the output signal and delay of the signal.

Figure 23:
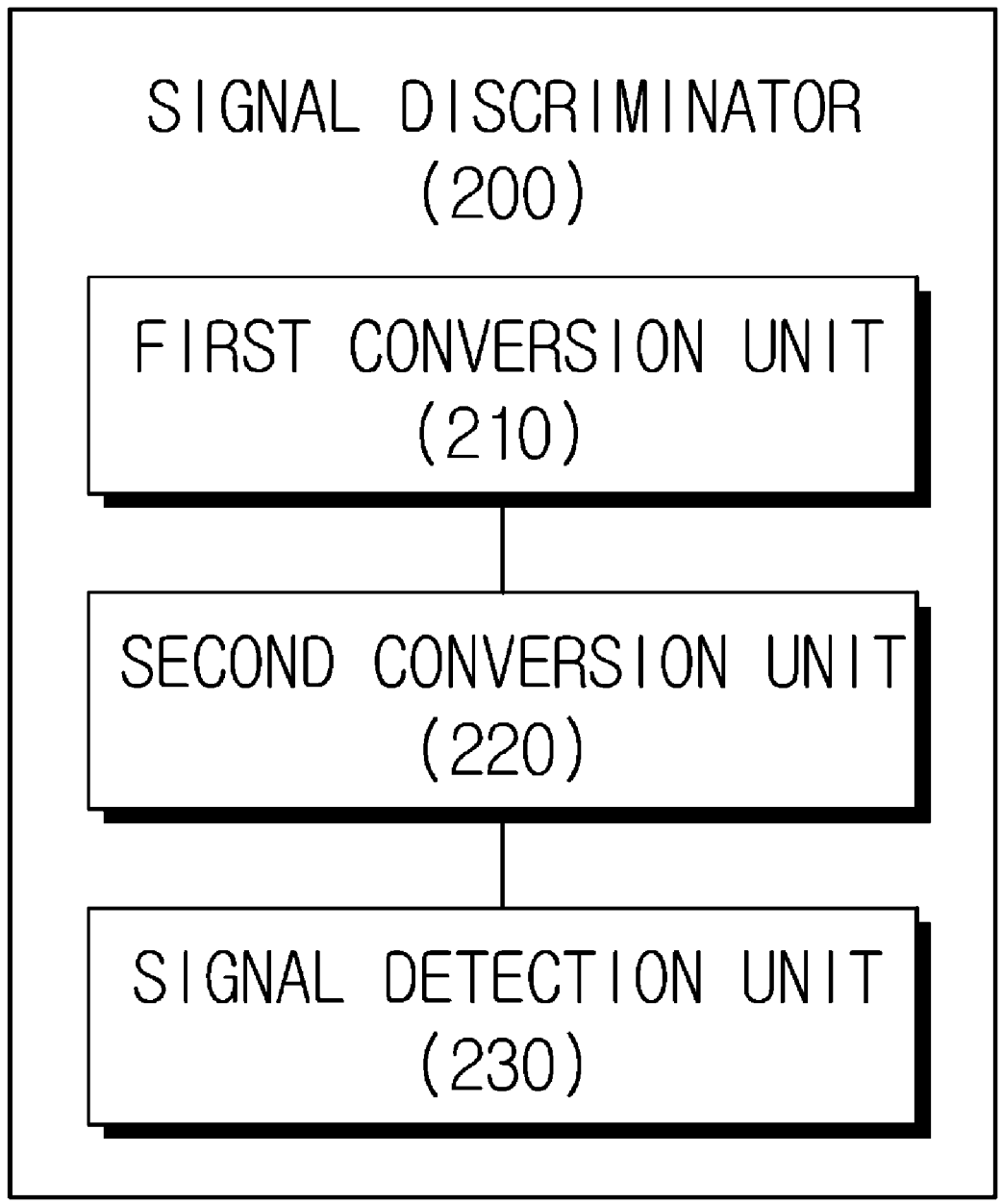

FIG. 23 is a block diagram illustrating the signal discriminator.

As illustrated in FIG. 23, the signal discriminator 200 includes a first conversion unit 210, a second conversion unit 220, and a signal detection unit 230. The signal discriminator 200 may omit some of the various constituent elements exemplarily illustrated in FIG. 7, or may additionally include other constituent elements.

The signal discriminator 200 receives the electrical signal from the photodiode 140 or the transimpedance amplifier. The received electric signal, that is, the input signal, has a form in which the input signal is raised and lowered by the reflected light. The signal discriminator 200 accurately measures a desired time point of the input signal and outputs an electrical signal.

Figure 24:
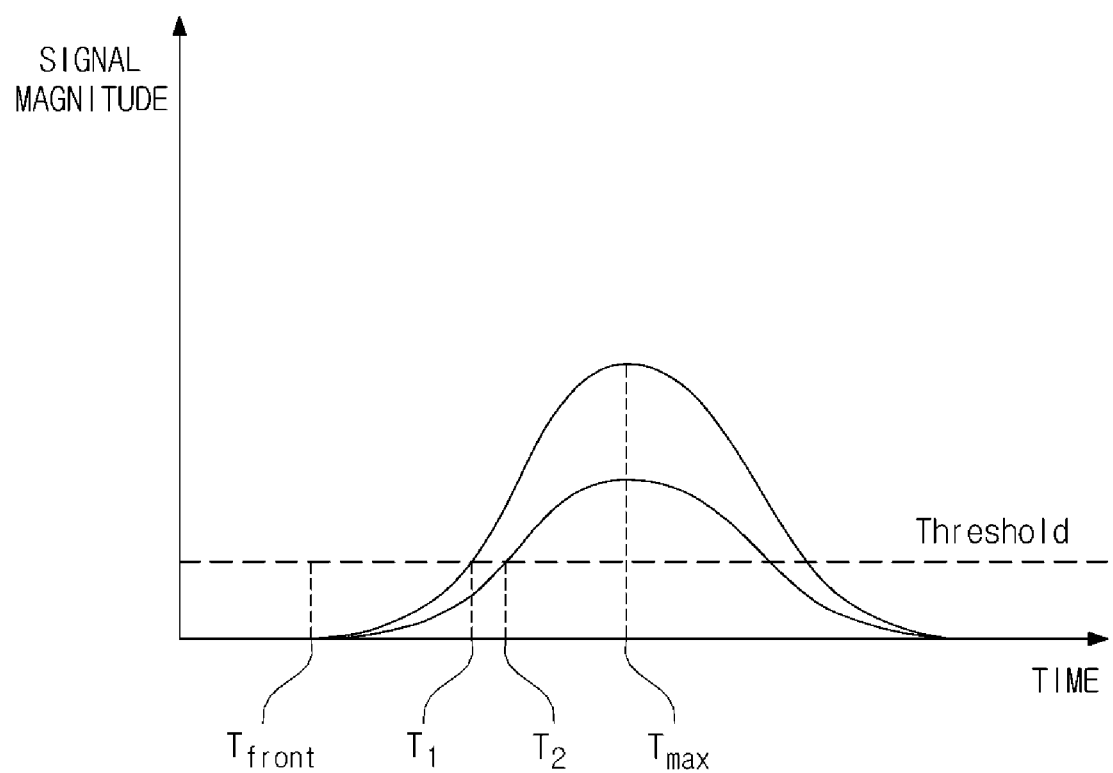

Referring to FIG. 24, according to the form of the input signal, the input signal has a front timing $T_{front}$, target timings $T_1$ and $T_2$ which meet a set threshold value, and a peak timing $T_{max}$. The signal discriminator 200 performs a two-stage conversion process to detect the timings that are closest to the front timing $T_{front}$ and peak timing $T_{max}$.

The first conversion unit 210 converts the input signal so that the signal point having the maximum signal magnitude has a preconfigured magnitude. The first conversion unit 210 converts the input signal so that the magnitude of the signal point having the maximum signal magnitude becomes zero. For example, the first conversion unit 210 differentiates the input signal or converts it using the constant fraction discriminator (CFD). The constant fraction discriminator (CFD) is a scheme for finding a point of time at which the point of time that a signal acquired by delaying an original signal is equal to a signal adjusted to be as large as a preconfigured magnitude ratio becomes a preconfigured ratio of the maximum magnitude.

Figure 25:
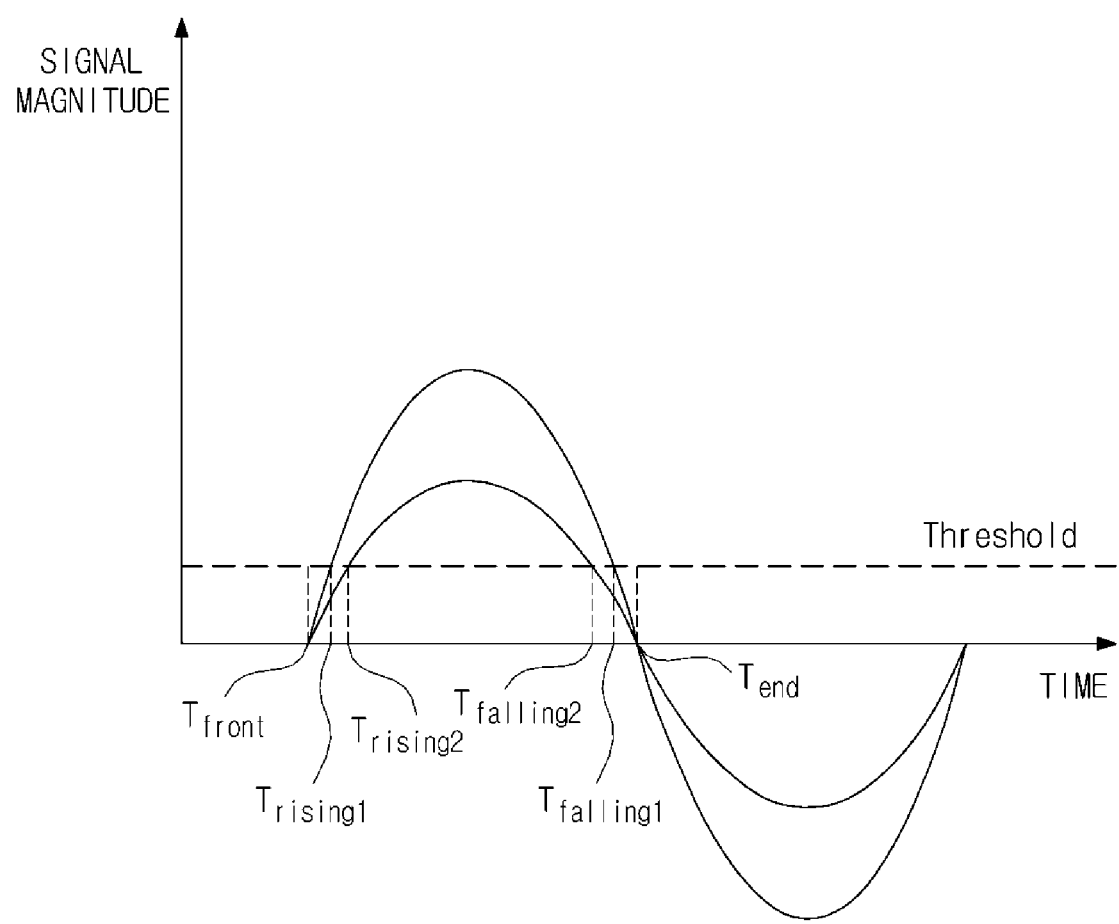

FIG. 25 illustrates a signal obtained by differentiating the input signal with respect to time. Referring to FIG. 25, the converted signal has the front timing $T_{front}$, rising timings $T_{rising1}$ and $T_{rising2}$ that meet the set threshold value, falling timings $T_{falling1}$ and $T_{falling2}$ which meet the set threshold value, and an end timing $T_{end}$. The end timing $T_{end}$ is equal to the peak timing $T_{max}$ of the signal before conversion. As illustrated in FIG. 25, when the first conversion unit 210 converts the slope of the input signal so that the signal point having the maximum signal magnitude has the preconfigured magnitude, the rising timings $T_{rising1}$ and $T_{rising2}$ become closer to the front timing $T_{front}$ and the falling timings $T_{falling1}$ and $T_{falling2}$ become closer to the end timing $T_{end}$.

When the signal is differentiated or the constant fraction discrimination method is applied to the signal, the jitter may become severe, and the dynamic range, which is the ratio of the maximum signal amplitude and minimum signal amplitude, may become narrow. Since the differentiation method is implemented as an RC circuit, the frequency characteristic of the signal changes according to changes in the distance, resulting in occurrence of a time error. In the CFD method, since the slope of the signal varies, the charging time of the capacitor of the comparator varies causing variation in the response time of the comparator, which results in the occurrence of a time error. Therefore, it is necessary to convert the converted signal again.

The second conversion unit 220 adjusts the magnitude of the converted input signal. The second conversion unit amplifies the magnitude of the converted input signal by an N (where the N is a natural number)-th order.

Figure 26:
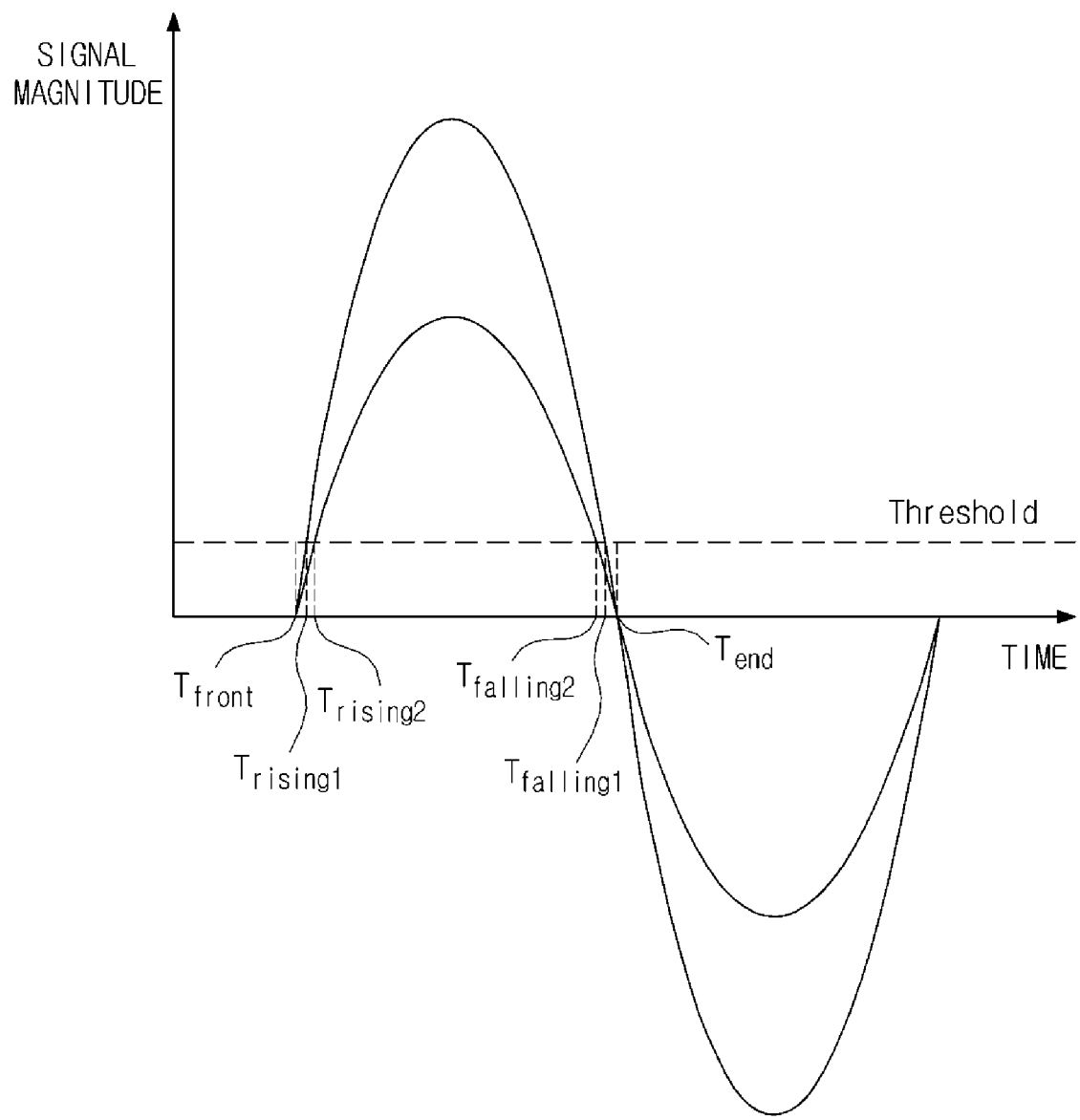

FIG. 26 illustrates a signal obtained by amplifying the magnitude of the input signal for which the slope has been converted. As illustrated in FIG. 26, when the second conversion unit 220 amplifies the magnitude of the signal with the converted slope, the slope becomes close to the vertical, and as a result, the rising timings $T_{rising1}$ and $T_{rising2}$ become much closer to the front timing $T_{front}$ and the falling timings $T_{falling1}$ and $T_{falling2}$ become much closer to the end timing $T_{end}$.

In the exemplary embodiment, due to the 2-stage conversion process, the front timing $T_{front}$ and the end timing $T_{end}$ may be accurately obtained even when only a circuit for simply comparing the signal containing the noise with a threshold value is implemented.

The signal detection unit 230 detects at least one timing from the input signal with the adjusted magnitude having a preconfigured reference magnitude and generates the output signal. The signal detection unit 230 outputs the rising and falling edges based on one threshold value from the input signal with the adjusted magnitude. The stop control signal may be a pulse that matches the rising edge, a pulse that matches the falling edge, or a pulse that matches both the rising edge and the falling edge.

The LIDAR apparatus 10 corrects the time of flight using the pulse width depending on the rising edge and the falling edge.

<Time to Digital Converter>

FIGS. 27 to 34 are diagrams illustrating time to digital converters of the LIDAR apparatus, according to the exemplary embodiments of the present invention.

As a scheme for measuring the time of flight, there are various schemes such as a phase shifting scheme, an equivalent time sampling scheme, a direct measurement scheme using a high-resolution clock, and a time measurement scheme using a plurality of delay elements.

In the phase shifting scheme, a transmission unit continuously transmits a sine wave and a reception unit measures the time of flight using phase shifting. Such a scheme has problems in that the sampling rate is limited according to the period of the sine wave, and that the wrong time of flight may be calculated due to crosstalk.

As a scheme applied to an oscilloscope, the equivalent time sampling scheme is a scheme that reconfigures an entire signal by repeatedly reading the signal at time intervals. Since the sampling rate is low, such a scheme has limits in detecting obstacles which move at high speeds, or in being used for moving objects.

In the direct measurement scheme using a high-resolution clock, the time of flight is measured by using a clock which operates at several GHz. Since the clock speed may not be sufficiently increased physically in such a scheme, it has limits in enhancing time resolution.

Figure 27:
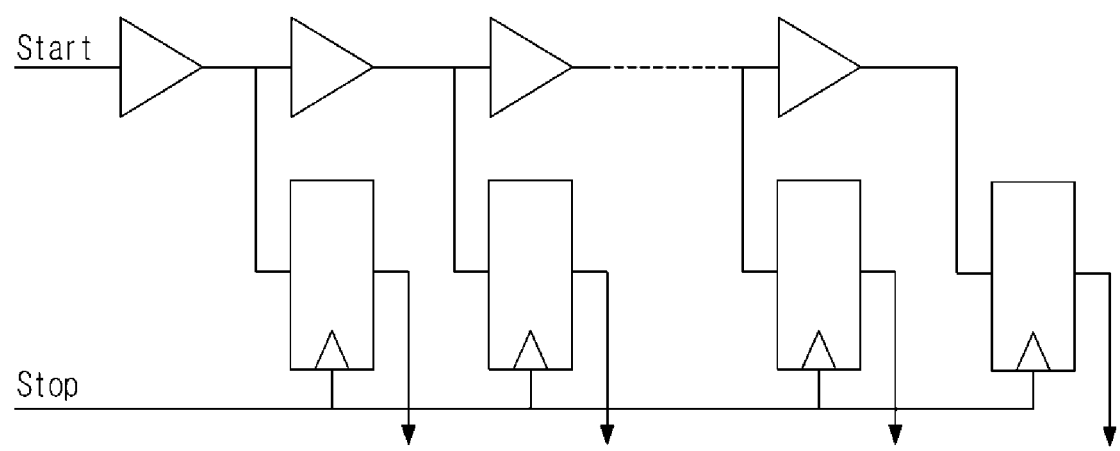
Figure 28:
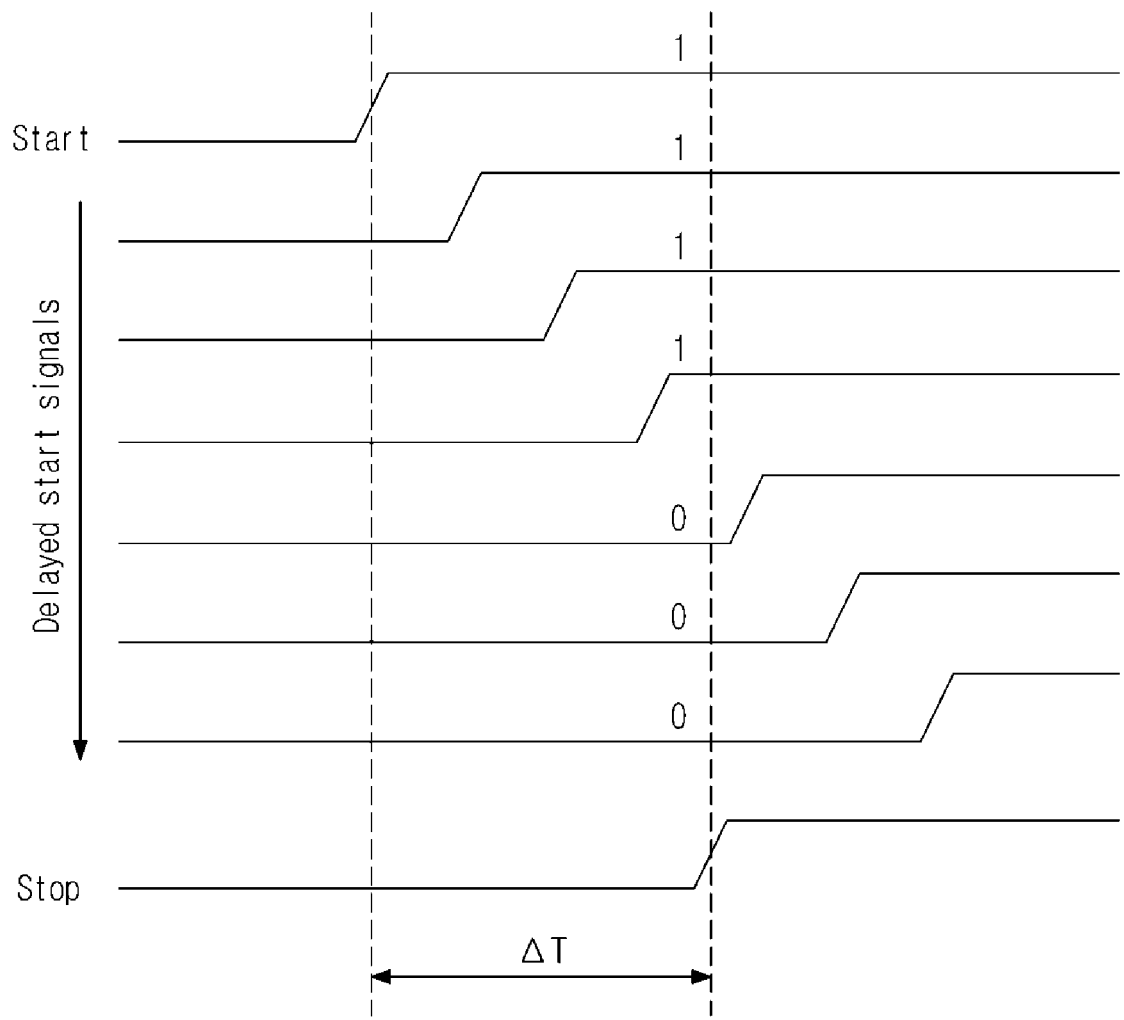
FIGS. 28 to 34 are diagrams illustrating time to digital converters of the LIDAR apparatus according to the exemplary embodiments of the present invention.

In the time measurement scheme using a plurality of delay elements, the time difference is calculated using a time to digital converter (TDC). FIG. 27 illustrates an existing time to digital converter of the related art, and FIG. 28 illustrates the signal of an existing time to digital converter of the related art.

In FIG. 27, the buffer has a time delay of several tens to several hundreds of picoseconds (ps). When a flip-flop is operated using a stop signal, the time delay becomes equal to the number of flip-flops having a value of 1 in FIG. 28. That is, the sum of the delay time has the same value as the time of flight. Such a scheme is dependent on the time delay through the buffer, and there is a problem in that such a scheme may not be able to have linear time resolution as a characteristic of the FPGA. Moreover, since a large number of delay lines need to be sequentially positioned in the FPGA, the space and the number of elements to be implemented in the FPGA are limited.

Figure 29:
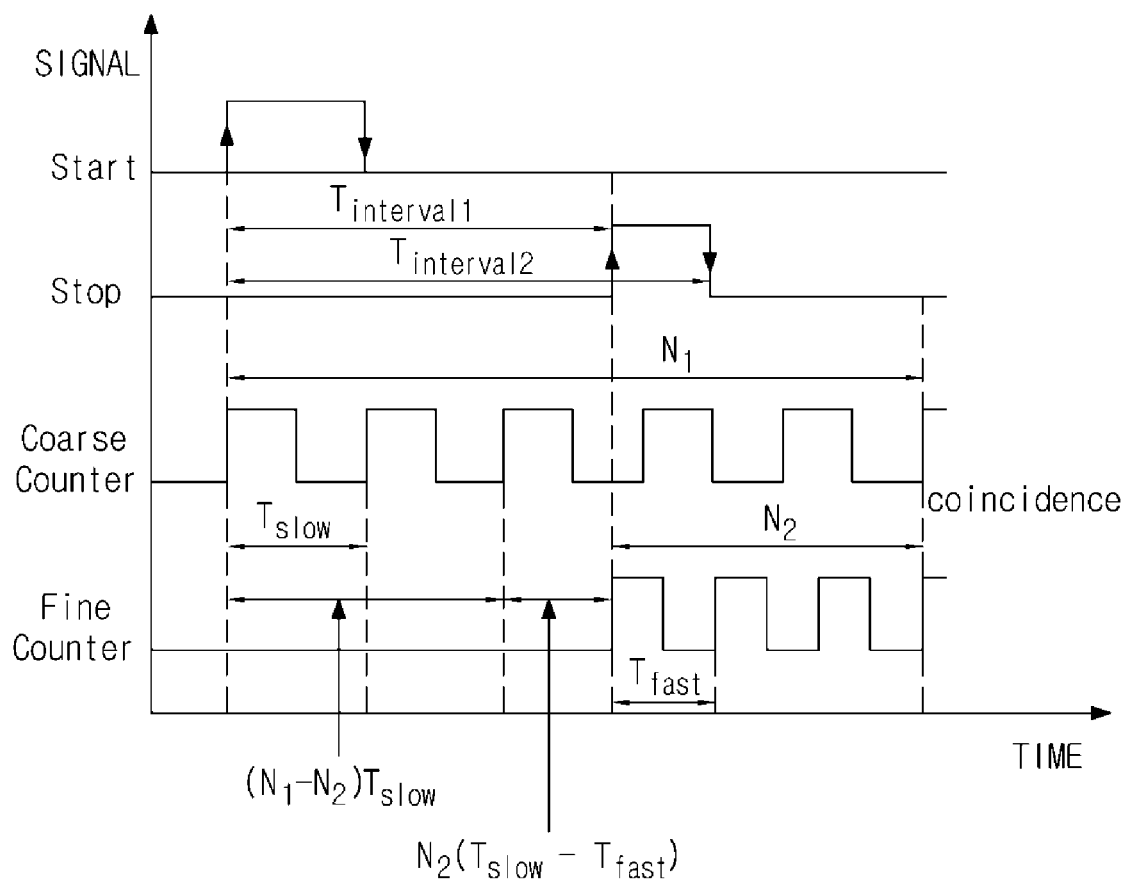
Figure 30:
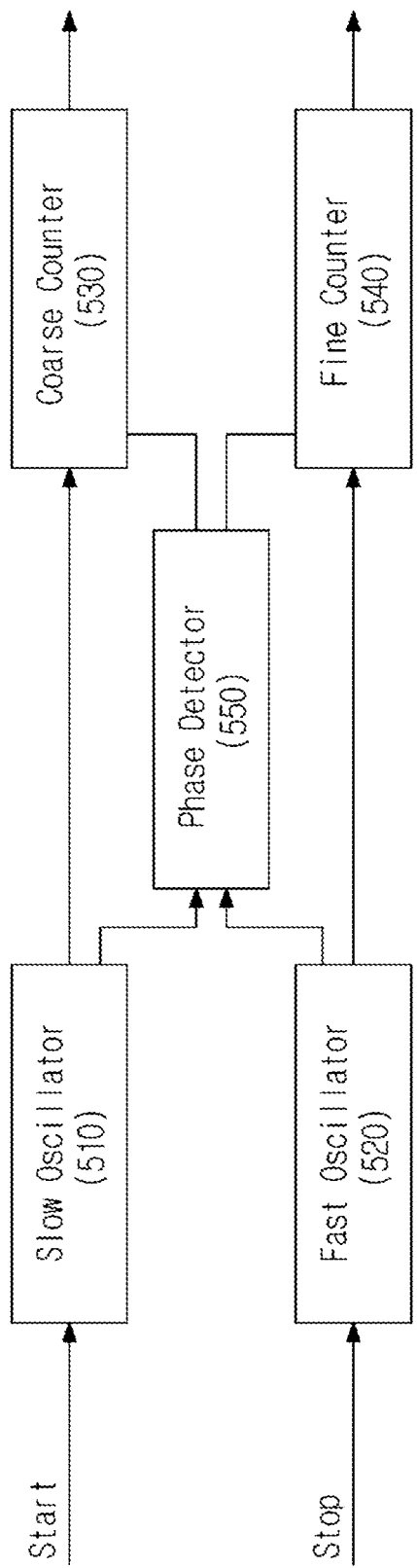
Figure 31:
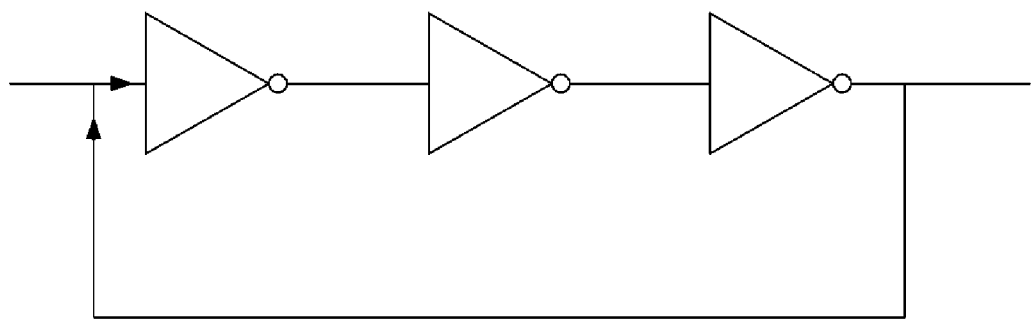

FIG. 29 is a diagram for describing an operation in which a time to digital converter measures a time, FIG. 30 is a block diagram illustrating the time to digital converter, and FIG. 31 is a block diagram illustrating a ring oscillator of the time to digital converter.

The distance measurer 300 converts the difference between two times into a digital value using the time to digital converter.

The time to digital converter is a device that converts time information into a digital code. The time to digital converter generates said digital code to correspond to the time difference between two input signals.

The input signal of the time to digital converter may be in the form of a pulse from the same signal source, or may be an edge of another signal source. For example, the LIDAR apparatus 10 may calculate the time difference based on the rising or falling edge of the start control signal and the rising or falling edge of the stop control signal.

Referring to FIG. 29, the time to digital converter measures the time using (i) numbers $N_1$ and $N_2$ counted by a coarse counter and a fine counter, and (ii) the large clock value of the coarse counter and the small clock value of the fine counter. The time resolution of the time to digital converter is determined by the time difference between the large clock value of the coarse counter and the small clock value of the fine counter.

Referring to FIG. 30, the time-to-digital converter includes a slow oscillator 510, a fast oscillator 520, a coarse counter 530, a fine counter 540, and a phase detector 550.

The slow oscillator 510 generates the first clock in response to the start control signal. The fast oscillator 520 generates the second clock with smaller value than the first clock in response to the stop control signal. That is, the slow oscillator 510 generates the large clock and the fast oscillator 520 generates the small clock.

The coarse counter 530 is connected to the slow oscillator 510 to count the first clock signal of the slow oscillator 510. The fine counter 540 is connected to the fast oscillator 520 to count the second clock signal of the fast oscillator 520.

The phase detector 550 is connected to the slow oscillator 510 and the fast oscillator 520, and is connected to the coarse counter 530 and the fine counter 540 to detect a time at which the first clock signal and the second clock signal are synchronized.

The slow oscillator 510 and the fast oscillator 520 may be implemented as ring oscillators. The ring oscillator is an oscillator in which an inverter and/or buffer are connected in series in a loop circulation form. The slow oscillator 510 and the fast oscillator 520 may be constituted of a time delay element and a buffer. The time delay element may be implemented as a digital element using an inverter, or as an analog element using a current source.

In FIG. 31, a ring oscillator in which three inverters are connected in sequence is exemplified, but this is merely an example, and the ring oscillator is not limited thereto. A combination of suitable logic elements may be used according to the design to be implemented.

The existing slow and fast oscillators in the related art adjust the clock width by adjusting the number of buffers. The existing time to digital converters in the related art have a resolution of approximately 80 picoseconds (ps) due to the signal delay time of the buffer itself.

In the exemplary embodiments, the clock width of the slow oscillator 510 may be adjusted by changing the locations and signal paths of the logic elements of the slow oscillator 510 on the circuit. The clock width of the fast oscillator 520 may be adjusted by changing the locations and signal paths of the logic elements of the fast oscillator 520. That is, it is possible to adjust the slow oscillator 510 to operate more quickly and the fast oscillator 520 to operate more slowly. The location and routing path of each gate may be directly adjusted using the manual gate location adjustment function of an FPGA tool. The slow oscillator 510 and the fast oscillator 520 may be combined into the same logic elements.

In the exemplary embodiment, the difference between the clock width of the slow oscillator and the clock width of the fast oscillator, that is, the time resolution, may be enhanced by changing the locations of the gates and the routing path of the signal on the circuit for the slow oscillator and the fast oscillator. The time to digital converter according to the exemplary embodiment has a resolution of approximately 10 picoseconds (ps).

Figure 32:
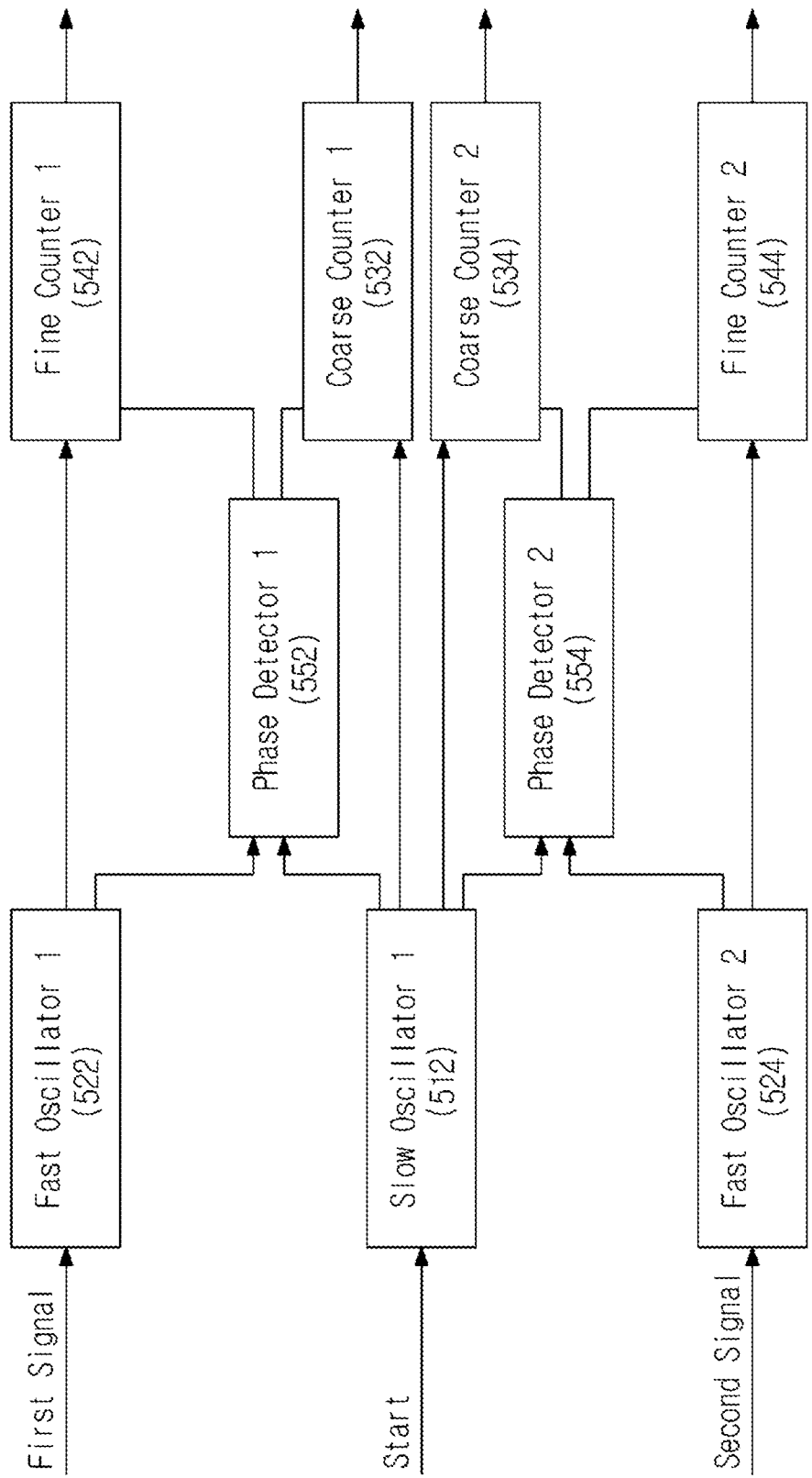
Figure 33:
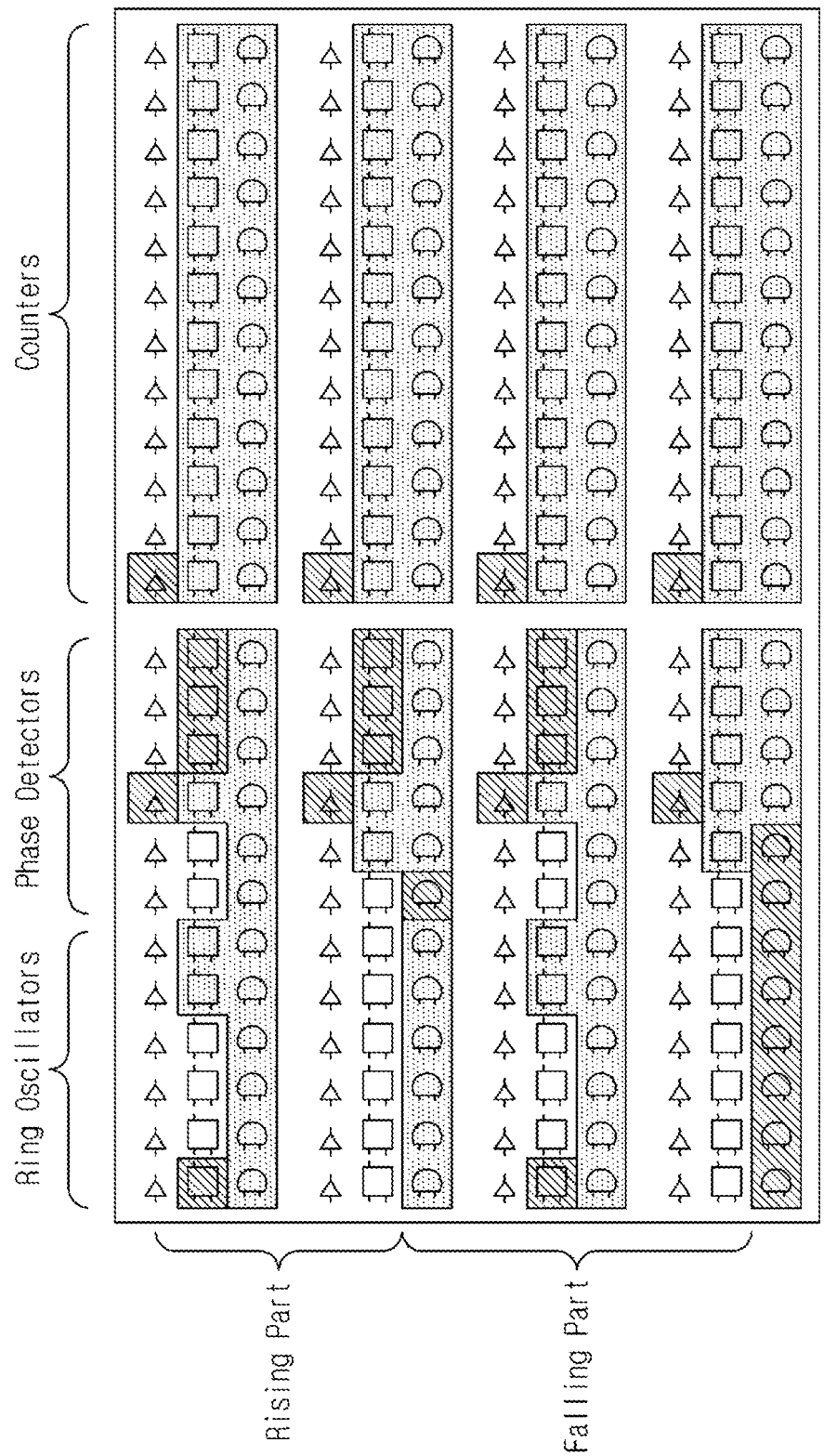

FIG. 32 is a block diagram illustrating a time to digital converter based on two stop control signals, and FIG. 33 is a diagram illustrating the exemplary implementation of the time to digital converter in an FPGA.

The signal discriminator 200 may output a first signal and a second signal. For example, the first signal may be the stop control signal corresponding to the rising edge, and the second signal may be the stop control signal corresponding to the falling edge.

Referring to FIG. 32, the time to digital converter calculates a first time difference based on the start control signal and the first signal. The time to digital converter calculates a second time difference based on the start control signal and the second signal. In the exemplary embodiment, since the rising edge and the falling edge are processed together, the exemplary embodiment may be designed to share the slow oscillator or the fast oscillator. That is, the first time difference and the second time difference may be calculated by sharing the slow oscillator or the fast oscillator on the circuit. The phase detectors 552 and 554 may be positioned closer than a preconfigured distance from the shared slow oscillator or shared fast oscillator, thereby enhancing the time resolution.

In FIG. 33, the time to digital converter sharing the slow oscillator is illustrated, and an example is illustrated in which gates constituted of three ring oscillators, two phase detectors, and four counters are connected and deployed in an FPGA block in order to process the rising edge and the falling edge.

<Correction of Time of Flight>

Figure 34:
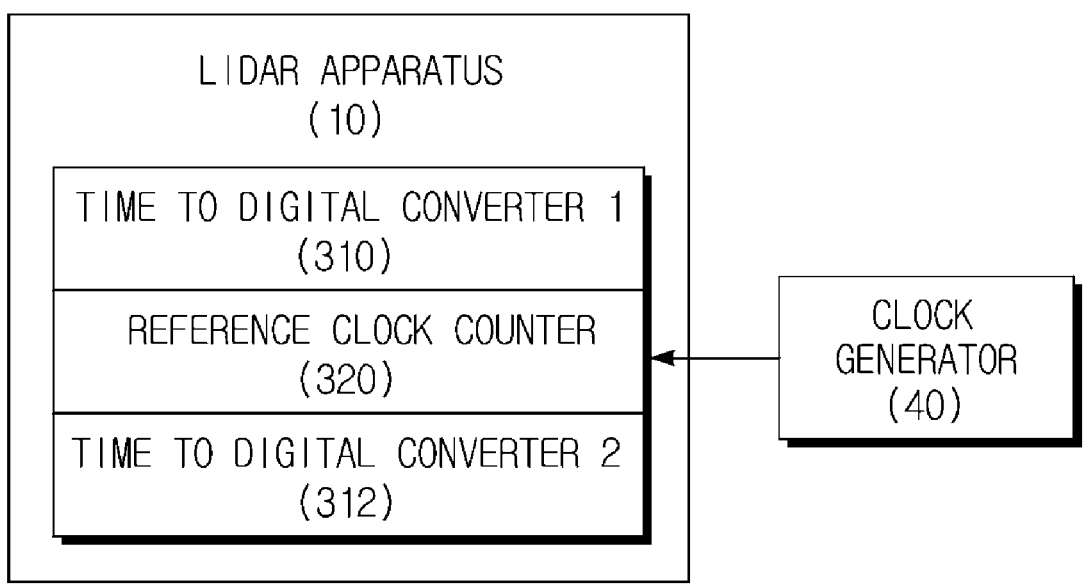

FIG. 34 is a block diagram illustrating a LIDAR apparatus according to another exemplary embodiment of the present invention.

The time delay of each gate varies depending on the temperature and applied voltage of the FPGA. The frequency of the ring oscillator is changed due to the temperature and applied voltage, causing a slight deviation of the resolution to occur. Such deviation leads to error in the time of flight.

In order to monitor and correct the error of the time of flight, the distance measurer includes a reference clock counter 320 which counts the reference clock signals received from the external clock generator 30 as well as the internal clock signals generated in the internal oscillator.

The clock generator 30 may be implemented as a high-precision crystal oscillator. The high-precision crystal oscillator transfers the generated clock signals to the reference clock counter 320. The reference clock counter 320 stores the number of clock signals calculated through the ring oscillator in an internal buffer every x times a clock input is received. The LIDAR apparatus 10 periodically reads the number of stored clock signals and corrects the time of flight. An algorithm for correcting the time of flight is described below.

```
00: [ ticks_per_x_crystal_clock] = ReferenceClockCounterModule (clock_from_external_crystal)
01: cnt = 0
02: while (positive edge of external clock)
03:    cnt = cnt + 1
```

```
04:    if( cnt == x )
05:        ticks_per_x_crystal_clock = cnt
06:        cnt = 0
07:    endif
08: endwhile
```

The distance measurer corrects the time of flight by using the ratio of the number of reference clock signals and the number of internal clock signals. The "ticks_per_x_crystal_clock" is calculated in real time and stored during a calibration step performed immediately before shipment of an implemented product. The correction of the time of flight using the ratio of the number of stored reference clock signals and the number of internal clock signals is expressed by Equation 1.

$$t_{tof}^{compensated} = \alpha t_{tof} \quad \text{[Equation 1]}$$

The correction factor α is a value obtained by dividing ticks_per_x_crystal_clock_runtime by ticks_per_x_crystal_clock_stored_during_calibration_process.

Referring to FIG. 13, the LIDAR apparatus 10 includes a plurality of time to digital converters 310 and 312, and the reference clock counter 320 is positioned between the plurality of time to digital converters 310 and 312. The clock generator 30 for generating the reference clock signal may be included in the moving object 1. Since the reference clock counter 320 is in contact with the time to digital converter or positioned within a predetermined distance, the reference clock counter 320 has substantially the same temperature and voltage characteristics as the oscillator used in the time to digital converter. The internal clock also varies with temperature and voltage. In the exemplary embodiment, since the internal clock is not divided for use, it allows high accuracy to be maintained.

Figure 35:
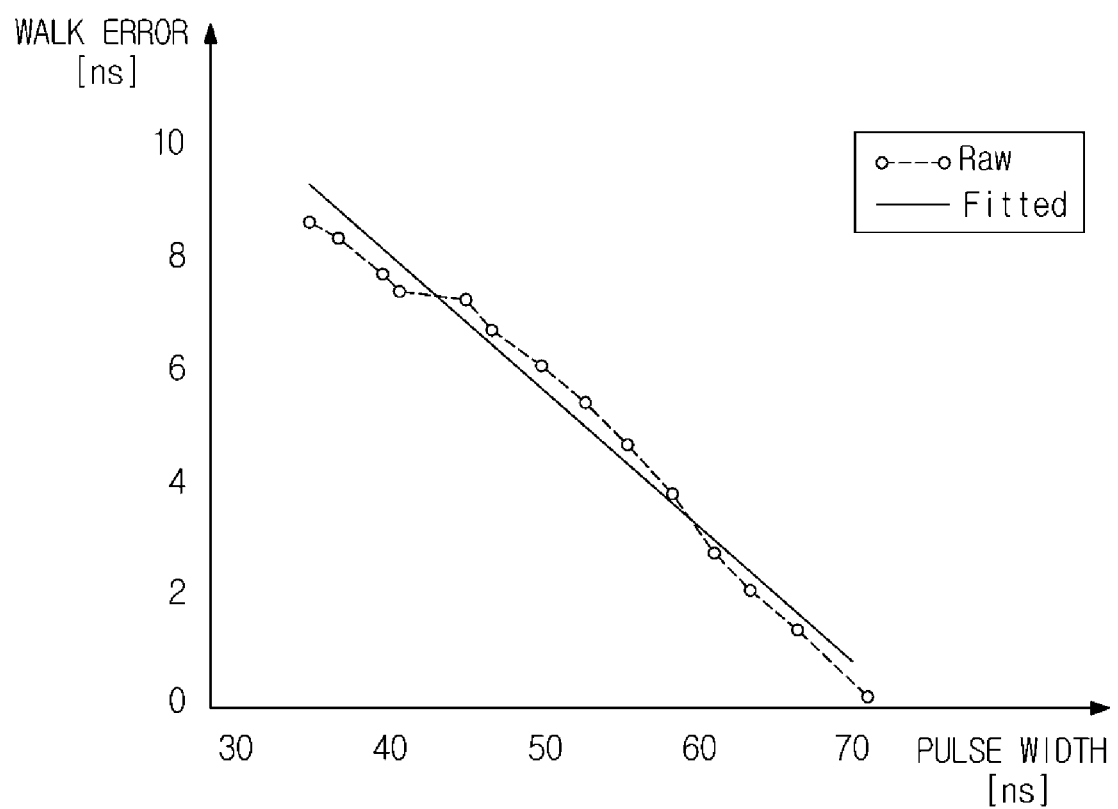
FIG. 35 is a diagram for describing an operation by which the LIDAR apparatus corrects the time of flight according to the exemplary embodiments of the present invention.
Figure 36:
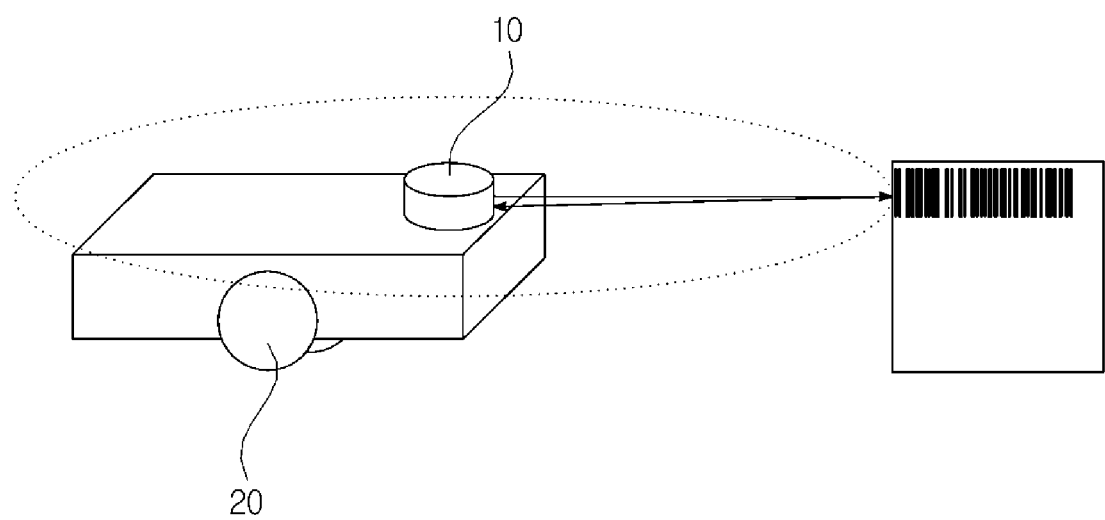
FIGS. 36 to 51 are diagrams for describing an operation by which the LIDAR apparatus recognizes an artificial landmark according to the exemplary embodiments of the present invention.
Figure 37:
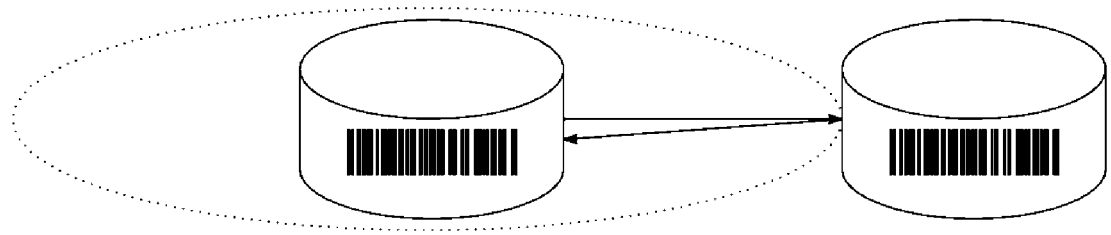

FIG. 35 is a diagram for describing an operation in which the LIDAR apparatus corrects the time, according to another exemplary embodiment of the present invention.

When the LIDAR apparatus 10 applies a differentiation scheme implemented by an RC circuit in the process of converting the slope of the signal, the frequency characteristic of the signal varies according to the change of the distance, resulting in the occurrence of a time error. When the CFD scheme is applied in the process of converting the slope of the signal, the charging time of the capacitor varies due to the difference of the slope, which causes variation in the response time of the comparator and a resulting occurrence of a time error. Therefore, the LIDAR apparatus 10 performs a process for correcting the time error.

The distance measurer 300 corrects the time of flight using the pulse width of the stop control signal. Since the output signal of a general photodiode has a large variation in the pulse width, it is difficult to use in regions which are not close unless the pulse width and the walk error match each other 1 to N. In the exemplary embodiment, since a process of converting the signal is performed, the relationship between the pulse width and walk error may be simply modeled.

The distance measurer 300 models a function between the walk error and the pulse width, and measures a correction factor in advance. The correction factor according to the pulse width is illustrated in FIG. 14. As illustrated in FIG. 14, the distance measurer 300 applies a correction factor inversely proportional to the pulse width to correct the time of flight. When the pulse width decreases due to weak intensity of the reflected signal, the walk error increases, and as a result, the distance measurer 300 sets the correction factor to be large. When the pulse width increases due to strong intensity of the reflected signal, the walk error decreases, and as a result, the distance measurer 300 sets the correction factor to be small.

A relational equation concerning the time of flight is expressed by Equation 2.

$$t_{tof} = t_{falling} + f_{comp}(t_{pulse}) \quad \text{[Equation 2]}$$

In Equation 2, $t_{tof}$ represents the corrected time of flight and $t_{falling}$ represents the time of flight before the correction. The time of flight is the time difference between the stop control signal and the start control signal. The LIDAR apparatus may calculate the time difference based on the rising or falling edge of the start control signal, and the rising or falling edge of the stop control signal. $f_{comp}$ represents the function of pulse width to work error, and $t_{pulse}$ represents the pulse width of the signal. The LIDAR apparatus may calculate the pulse width based on the rising edge or the falling edge of the stop control signal.

<Recognition of Artificial Landmark>

FIGS. 36 to 51 are diagrams for describing operations in which the LIDAR apparatus recognizes an artificial landmark, according to the exemplary embodiments of the present invention.

A moving object that moves in a space uses landmarks in order to determine its own location or the location of other objects, or in order to recognize other objects. Landmarks may be divided into natural landmarks and artificial landmarks. Methods which use natural landmarks are methods which extract specific components from structures, ceilings, boundary surfaces of walls, and the like, which are positioned in the space, while methods using artificial landmarks are schemes which recognize artificial landmarks with a camera, and the like, after attaching a pattern or tag having a specific meaning to the space or other object.

Unlike natural landmarks, there are various problems associated with artificial landmarks. Artificial landmarks cause general users to be aesthetically repulsed. Since the error is large in the case of direct reflection of light, dark environments, or long-range distances, artificial landmarks need to be made in excess of a predetermined size in order to increase the recognition rate of said artificial landmarks. Due to having a shape which does not suit the space, the attachable location is limited for spaces where appearance is emphasized. Therefore, from producers' perspectives, there is a need to use a separate camera for the recognition of artificial landmarks.

Figure 38:
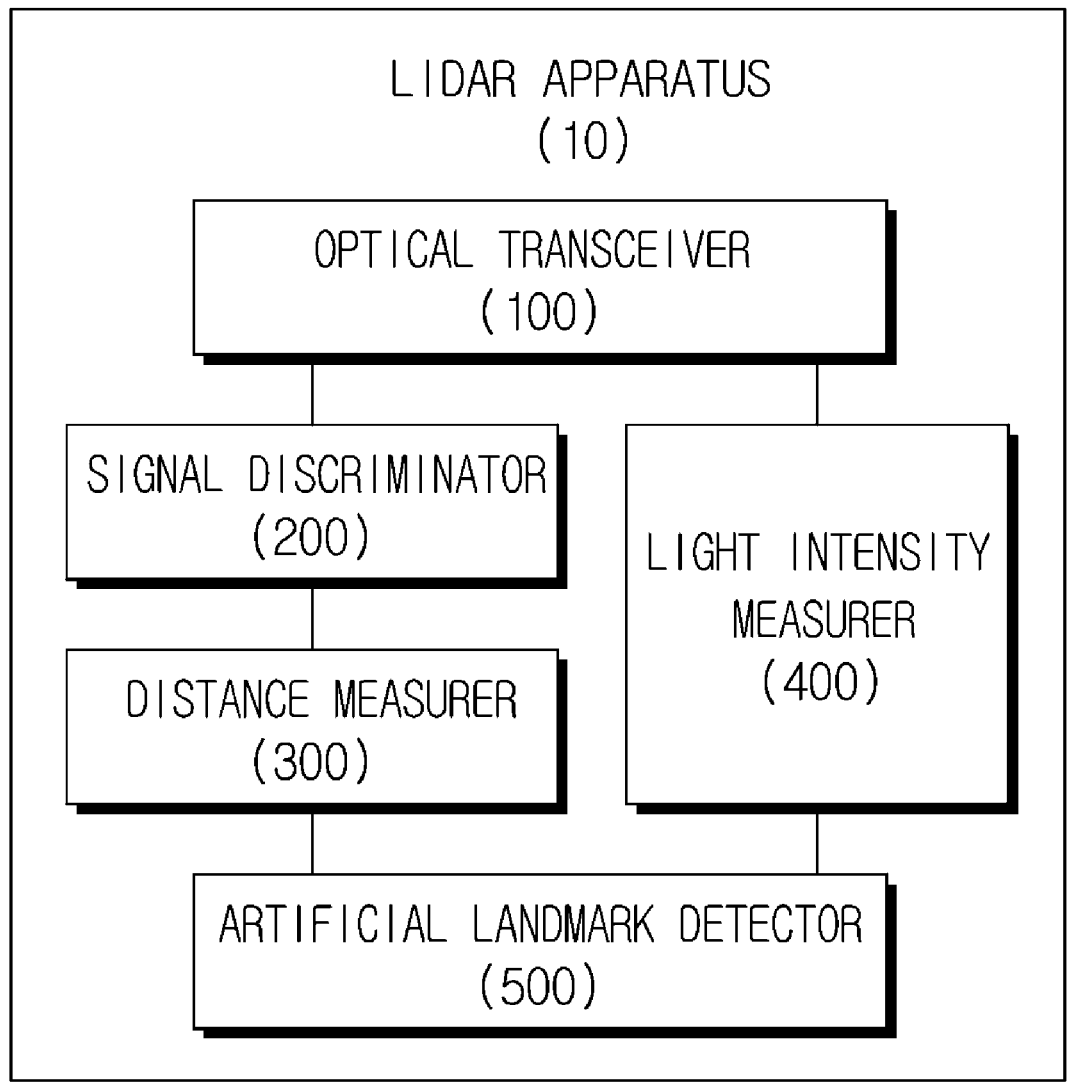

FIG. 38 is a block diagram illustrating an artificial landmark detector.

As illustrated in FIG. 38, the LIDAR apparatus 10 includes an optical transceiver 100, a signal discriminator 200, a distance measurer 300, a light intensity measurer 400, and an artificial landmark detector 500. The LIDAR apparatus 10 may omit some of the various constituent elements exemplarily illustrated in FIG. 38, or may additionally include other constituent elements. For example, the LIDAR apparatus 10 may additionally include a location calculator.

The LIDAR apparatus 10 does not have a separate camera for recognizing artificial landmarks, but instead analyzes points of the scanned target object to recognize artificial landmarks which are not visible to the user's naked eye.

The optical transceiver 100 emits light toward the target object, receives the light reflected by said target object, and converts it into an electrical signal. The optical transceiver may include the light source, the transmission optical unit, the reception optical unit, and the photodiode. The principle that when light with photon energy strikes a diode, movable electrons and positive charge holes are generated, resulting in the activity of electrons, may be applied to the photodiode. The photodiode may be implemented as a PN junction photodiode, a PIN photodiode, an avalanche photodiode (APD), or the like.

The signal discriminator 200 accurately measures a desired time point of the input signal and outputs an electrical signal. The signal discriminator 200 detects at least one time point having a predetermined reference magnitude from the input signal with adjusted magnitude and generates an output signal.

The distance measurer 300 measures the distances of the points of the target object using the time difference between the emission and reception of light. The distance measurer 300 may include the time to digital converter. The time to digital converter generates a digital code corresponding to the time difference between the two input signals.

The distance measurer 300 may operate by the time of flight (TOF) scheme. In the time of flight scheme, the distance of an object to be measured is determined by measuring the time when a laser emits a pulse or a square wave signal until a reflection pulse or square wave signals from objects within a measurement range reach a receiver.

The light intensity measurer 400 measures the intensity of the light reflected by points of the target object. The light intensity measurer 400 may measure the intensity of the electric signal received from the optical transceiver 100 or the signal discriminator 200.

The artificial landmark detector 500 analyzes the change of (i) the distances of points of the target object, and (ii) the light intensity of the points of the target object to determine whether the target object is an artificial landmark, and generates a digital code by analyzing an invisible barcode included in the artificial landmark.

The artificial landmark recognized by the artificial landmark detector 500 includes a base and an invisible barcode. The invisible barcode includes a code sequence made of a material that reflects, absorbs, or emits light in a first wavelength band. The code sequence is hidden by a material that reflects, absorbs, or emits light in a second wavelength band to become invisible.

The location calculator calculates the relative location between the LIDAR apparatus and the artificial landmark.

Figure 39:

FIG. 39 illustrates an artificial landmark 51 appearing to be white in color as a result of visual observation, an artificial landmark 52 appearing to be black in color as a result of visual observation, and an artificial landmark 53 having discontinuous stripes identified by the artificial landmark detector 500. When the artificial landmark 51 appearing in white color is attached to a structure or space having a white background, or when the artificial landmark 52 appearing in black color is attached to a structure or space having a black background, the user may not recognize the artificial landmarks 51 and 52. In contrast, the artificial landmark detector 500, receiving light of a specific wavelength band, may identify the stripes of the artificial landmark 53.

Referring to FIGS. 40 to 43, the artificial landmarks 51, 52, and 53 include bases 610a, 610b, 610c, and 610d, and invisible barcodes 620a, 620b, 620c, and 620d. The artificial marks 51, 52, and 53 may additionally include covers 630c and 630d, adhesive portions, or a combination thereof.

The invisible barcode is connected to the base and has a code sequence made of a material that reflects, absorbs, or emits light in a first wavelength band. The code sequence is hidden by a material that reflects, absorbs, or emits the light in a second wavelength band to become invisible. The first wavelength band may be a wavelength band of infrared rays while the second wavelength band may be a wavelength band of visible light rays, but this is merely an example. The first and second wavelength bands are not limited thereto, and appropriate wavelength bands may be used according to the design to be implemented.

The code sequence has bright regions 622a, 622b, 622c, and 622d and dark regions 624a, 624b, 624c, and 624d, based on the differences in reflectance, absorptance, or emission rate for the light in the first wavelength band.

The code sequence may be a 1D sequence expressed with a start pattern, an information pattern, a stop pattern, an error correction pattern, or a combination thereof, by using (i) the numbers or widths of the bright regions, (ii) the numbers or widths of the dark regions, or (iii) a combination of (i) and (ii).

The bright regions and dark regions of the code sequence may be distinguished by the reflection wavelength, absorption wavelength, emission wavelength, reflectance, absorptance, emission rate, reflection angle, color, or surface property of the light in the first wavelength band, or by a combination thereof.

The code sequence becomes invisible due to the reflection wavelength, absorption wavelength, emission wavelength, reflectance, absorptance, emission rate, reflection angle, color, or surface property of the light in the second wavelength band, or through a combination thereof.

Figure 40:
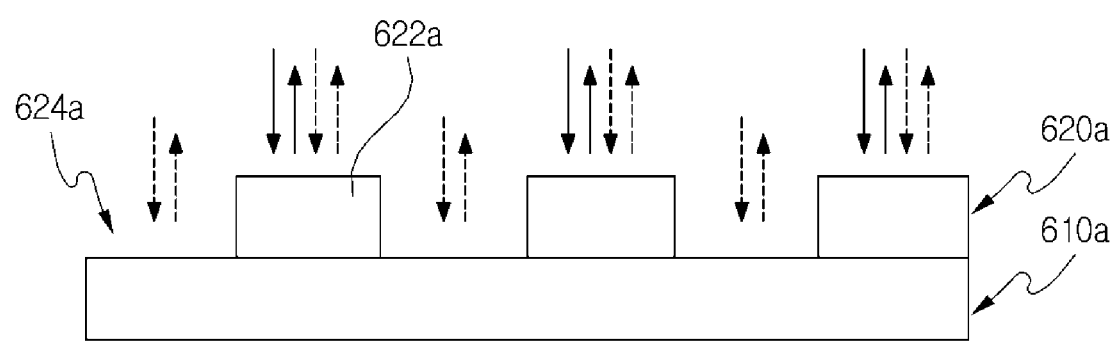

Referring to FIG. 40, the base may include a material that reflects, absorbs, or emits light of a second wavelength band. For example, an omnidirectional reflective material or paint may be patterned on a white paper to form the code sequence.

Figure 41:
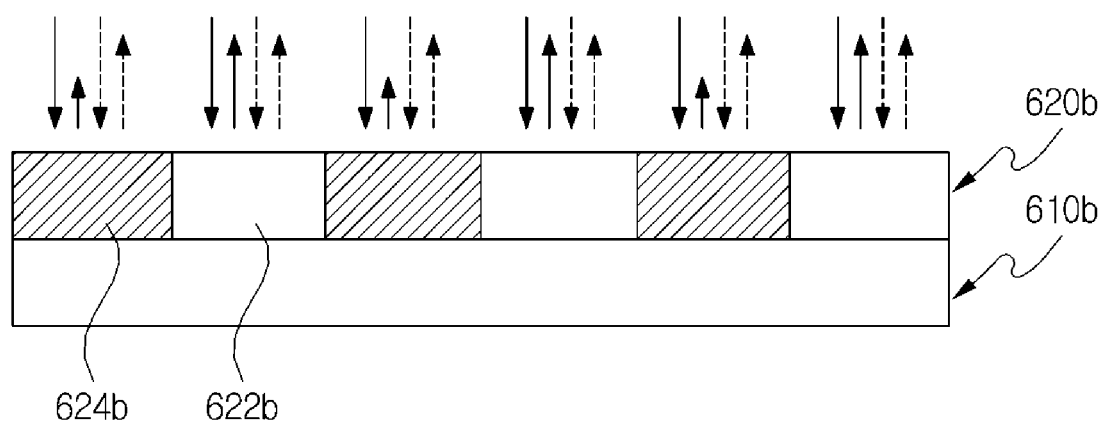

Referring to FIG. 41, the code sequence may include a material that reflects, absorbs, or emits light of a second wavelength band. For example, materials or paints having different reflectance may be patterned to form the code sequence.

Figure 42:
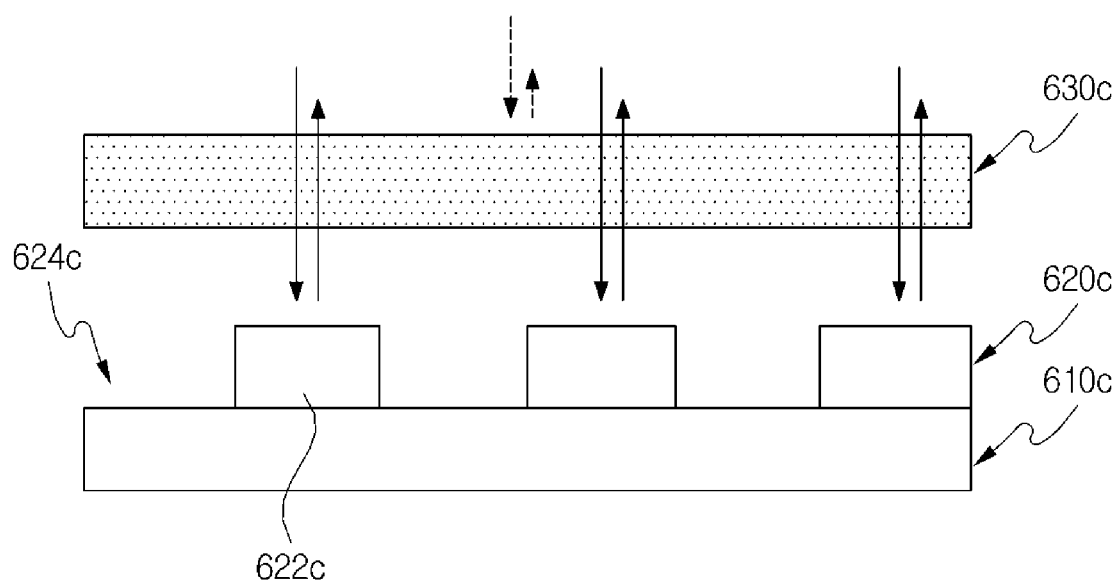
Figure 43:
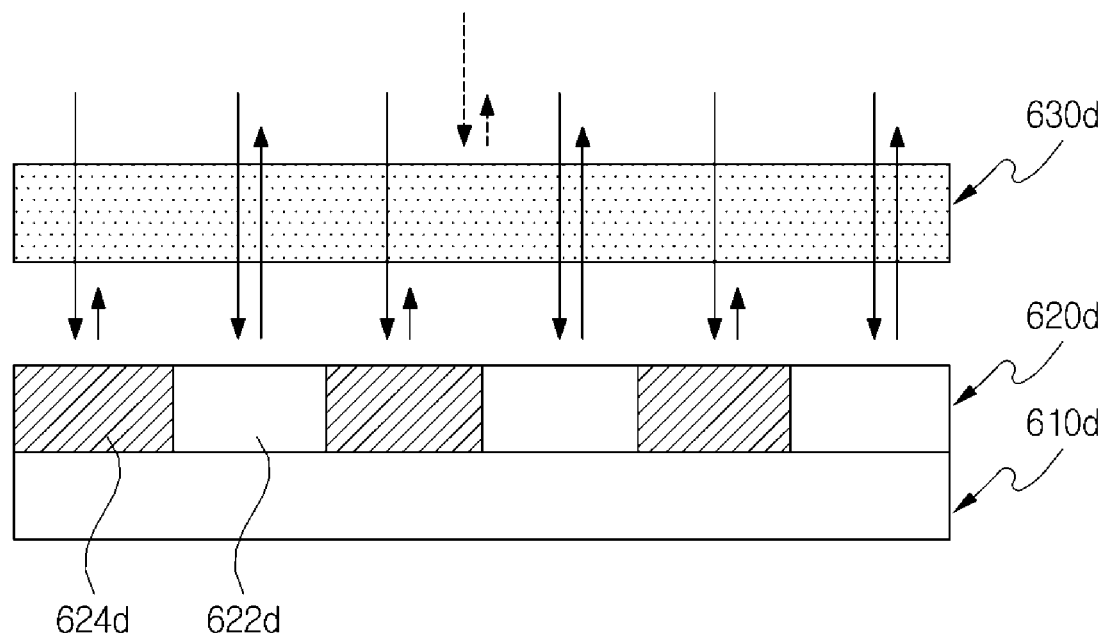

Referring to FIGS. 42 and 43, the covers 630c and 630d are positioned in the transmission path of the light in the first wavelength band. The covers 630c and 630d include a material that reflects, absorbs, or emits light of a second wavelength band. The covers 630c and 630d may filter a specific wavelength band. For example, an infrared filter may be used. Since infrared filters appear dark red in color, the user recognizes the infrared filter as a device having just a black color rather than a striped pattern.

The artificial landmark may additionally include an adhesive portion (not illustrated) having an adhesive layer formed on the rear surface of the base.

Figure 44:
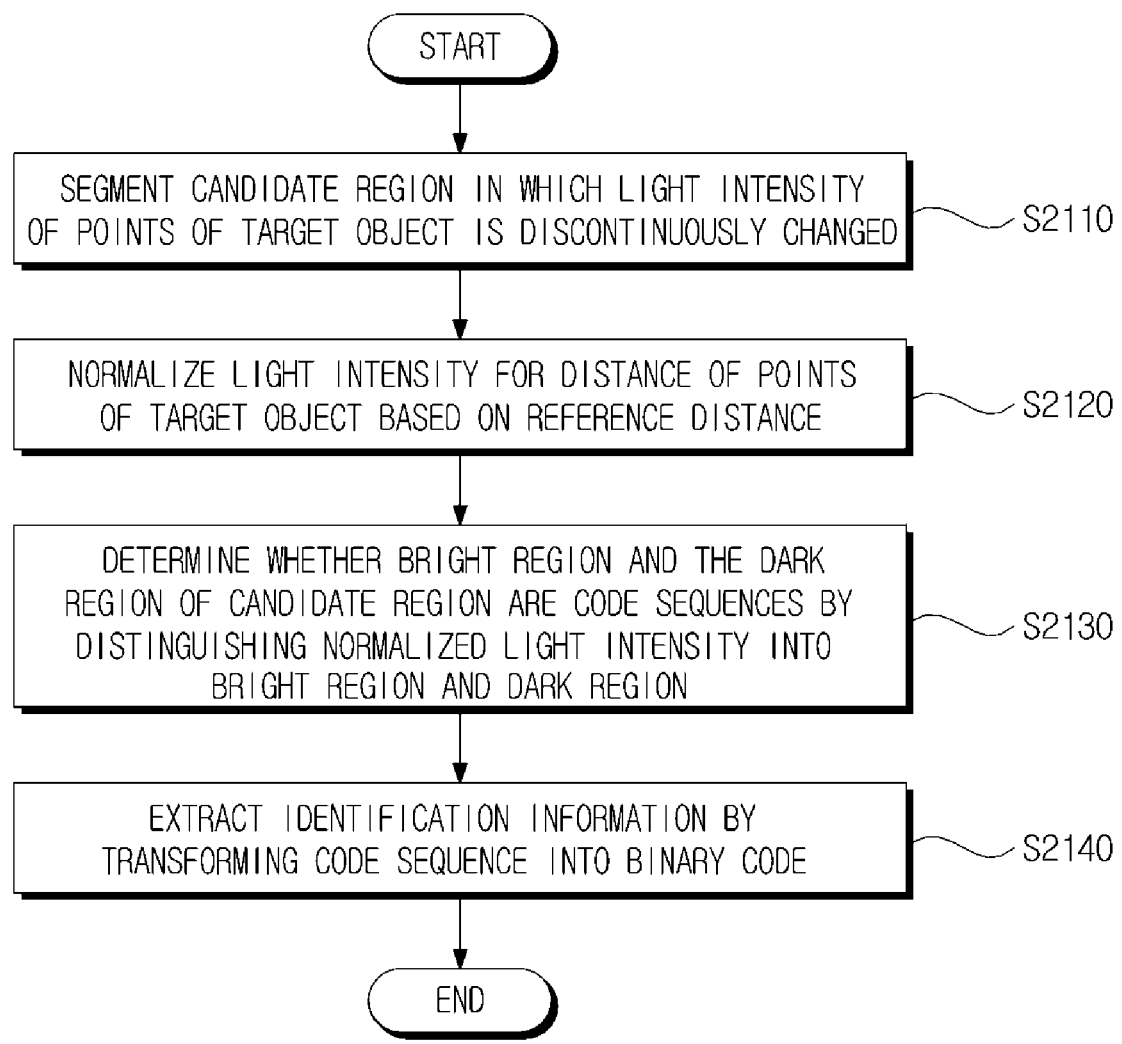
Figure 45:
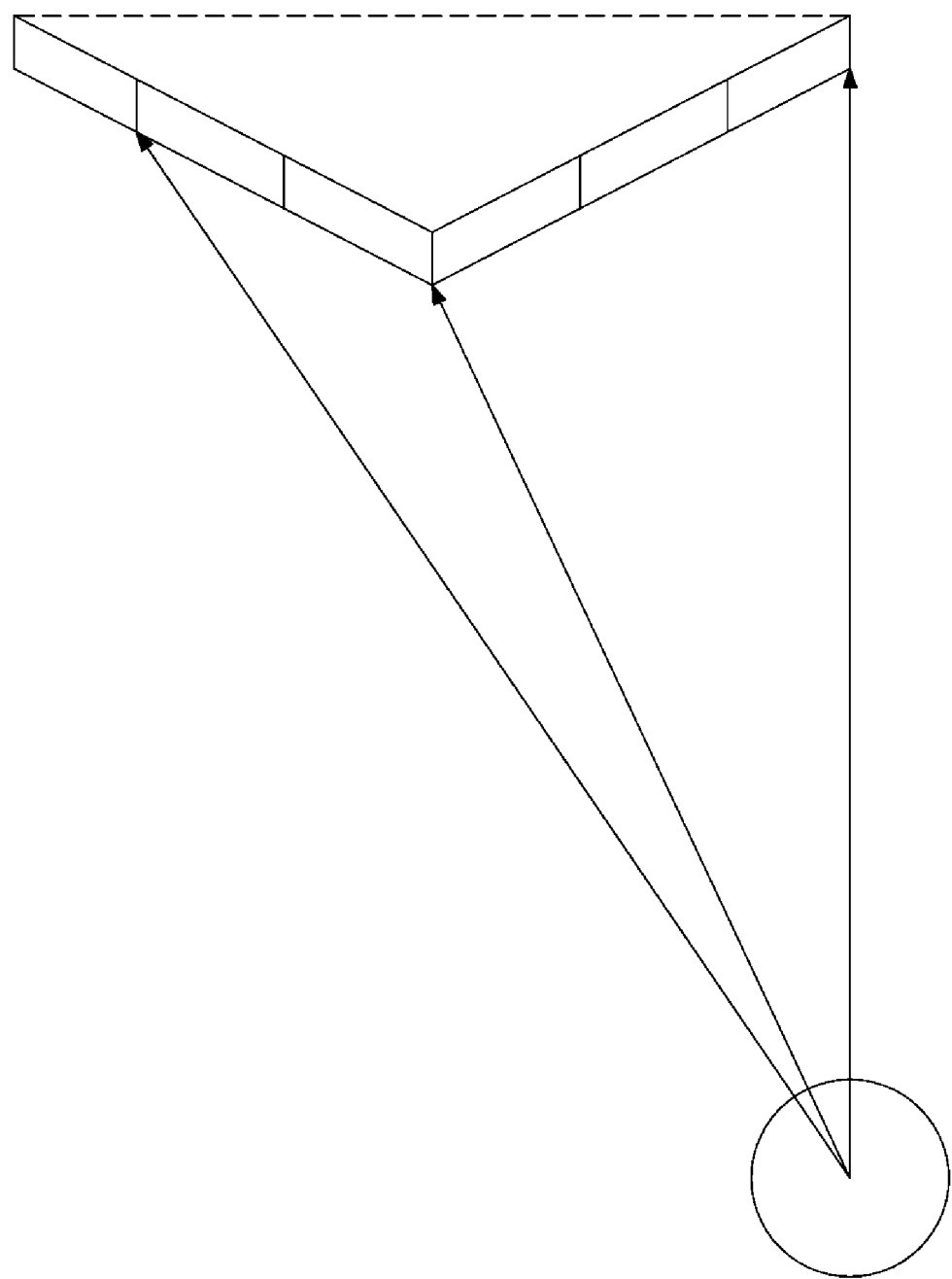
Figure 46:
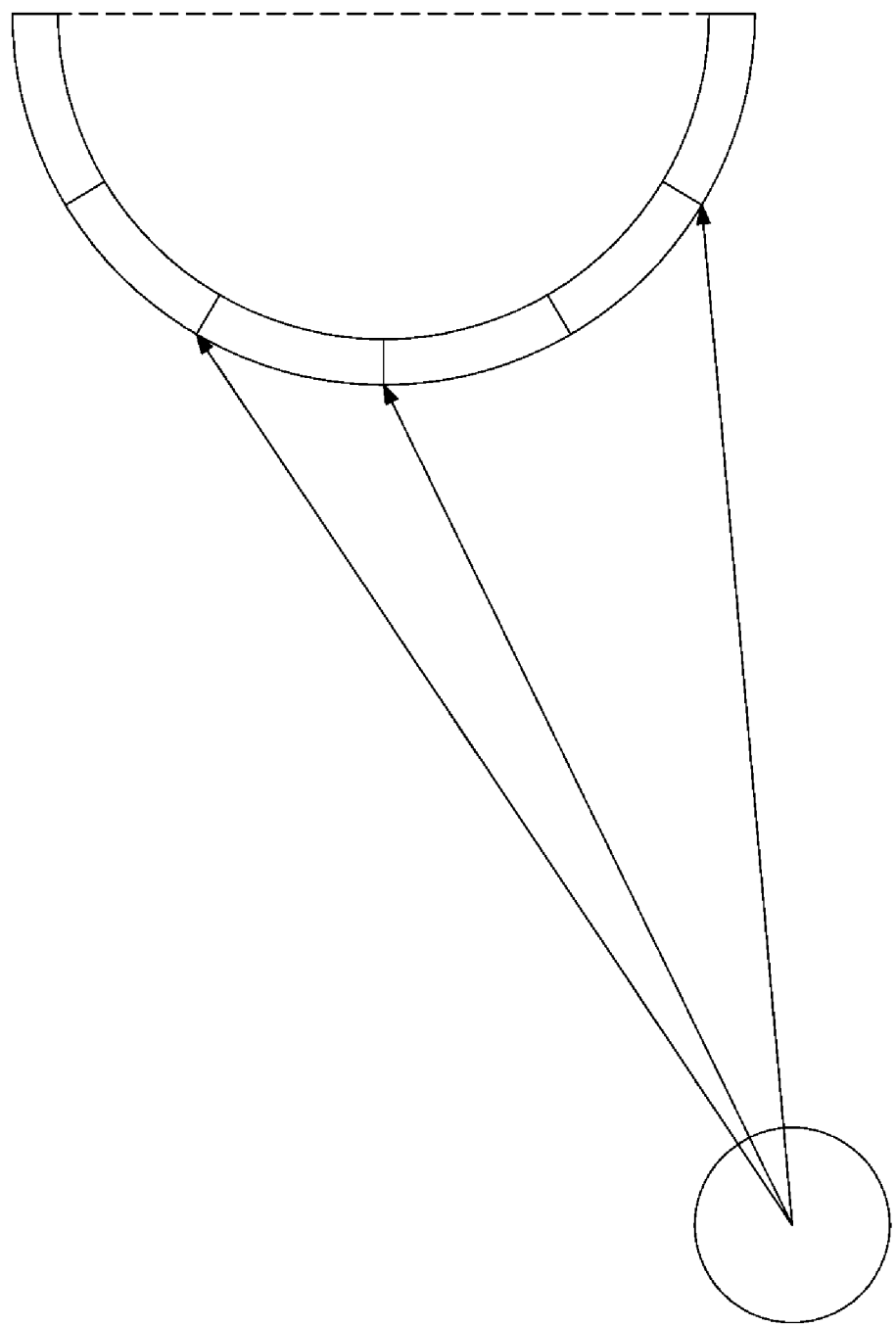

Hereinafter, the operation in which the LIDAR apparatus recognizes the artificial landmarks will be described with reference to FIGS. 44 to 46.

In step S2110, the artificial landmark detector segments a candidate region in which the light intensity of the points of the target object varies discontinuously. A discontinuous part means that the distance of the points of the target object is within a predetermined range, the deviation of the light intensity of the points is over a predetermined range, some of the light intensities of the points are smaller than a minimum value while others are larger than a maximum value, and some others are smaller than the minimum value while yet others are larger than the maximum value, repeatedly. For example, the candidate region has a region similar to the stripes of the artificial landmark 53.

In step S2120, the artificial landmark detector normalizes the light intensities relating to the distances of the points of the target object based on a preconfigured reference distance. For example, the light intensity may be normalized based on x meters, and an appropriate numerical value may be used as the reference distance according to the design to be implemented.

In step S2130, the artificial landmark detector divides the normalized light intensities into the bright region and the dark region to determine whether the bright region and the dark region of the candidate region are a code sequence. The artificial landmark detector may divide the normalized light intensities into the bright region and the dark region using a moving average that continuously calculates the averages of two or more consecutive data points. The artificial landmark detector may determine a relative magnitude with the surroundings using local data.

In step S2130, for the criterion which determines whether the bright region and the dark region are a code sequence, the artificial landmark detector adopts an appropriate determination criterion according to the design to be implemented. For example, the artificial landmark detector may determine whether both regions are similar based on (i) the distance between a first dark region and a second dark region, (ii) a last dark region and the second dark region from the last dark region, (iii) a ratio or a probability that the segmented part is present on a plane, or (iv) a combination thereof. FIG. 8A illustrates an artificial landmark attached to a bent surface to a predetermined angle, and FIG. 8B illustrates an artificial landmark attached to a curved surface. Since the distance value varies for each point, the moving object may be docked on the basis of a vertex or the like, or may accurately approach a desired location. When the artificial landmarks are attached to one or more planes, false positives and Type I errors may be minimized.

In step S2140, the artificial landmark detector converts the code sequence into a binary code to extract identification information. As the criterion for converting the code sequence to binary, the artificial landmark detector adopts an appropriate conversion criterion according to the design to be implemented. For example, the artificial landmark detector may generate the binary code by implementing a method of read the light intensity at regular intervals in each of the left and right directions from the center, and setting the binary code to 1 when the light intensity is larger than a threshold value and to 0 when the light intensity is smaller than the threshold value.

Figure 47:
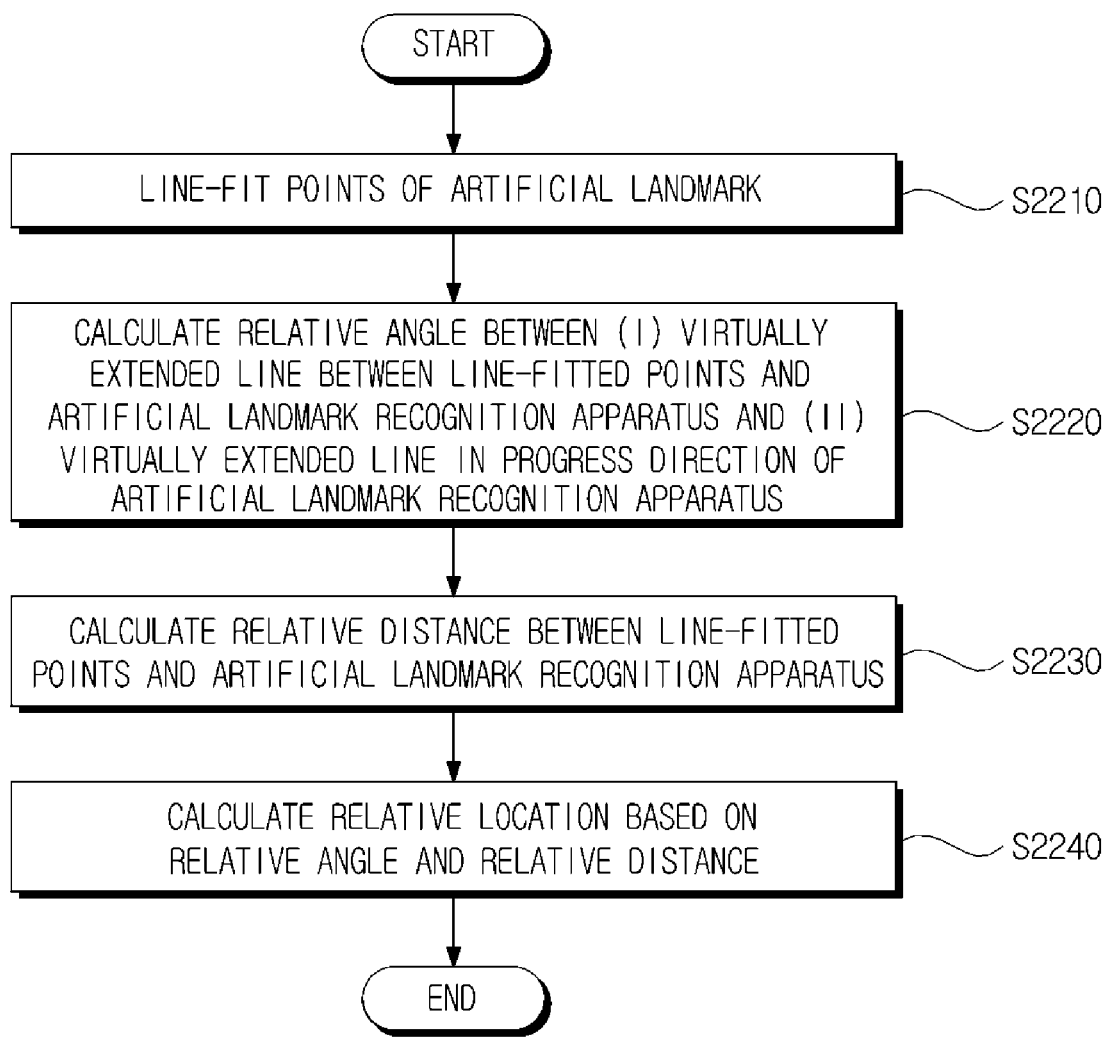
Figure 48:
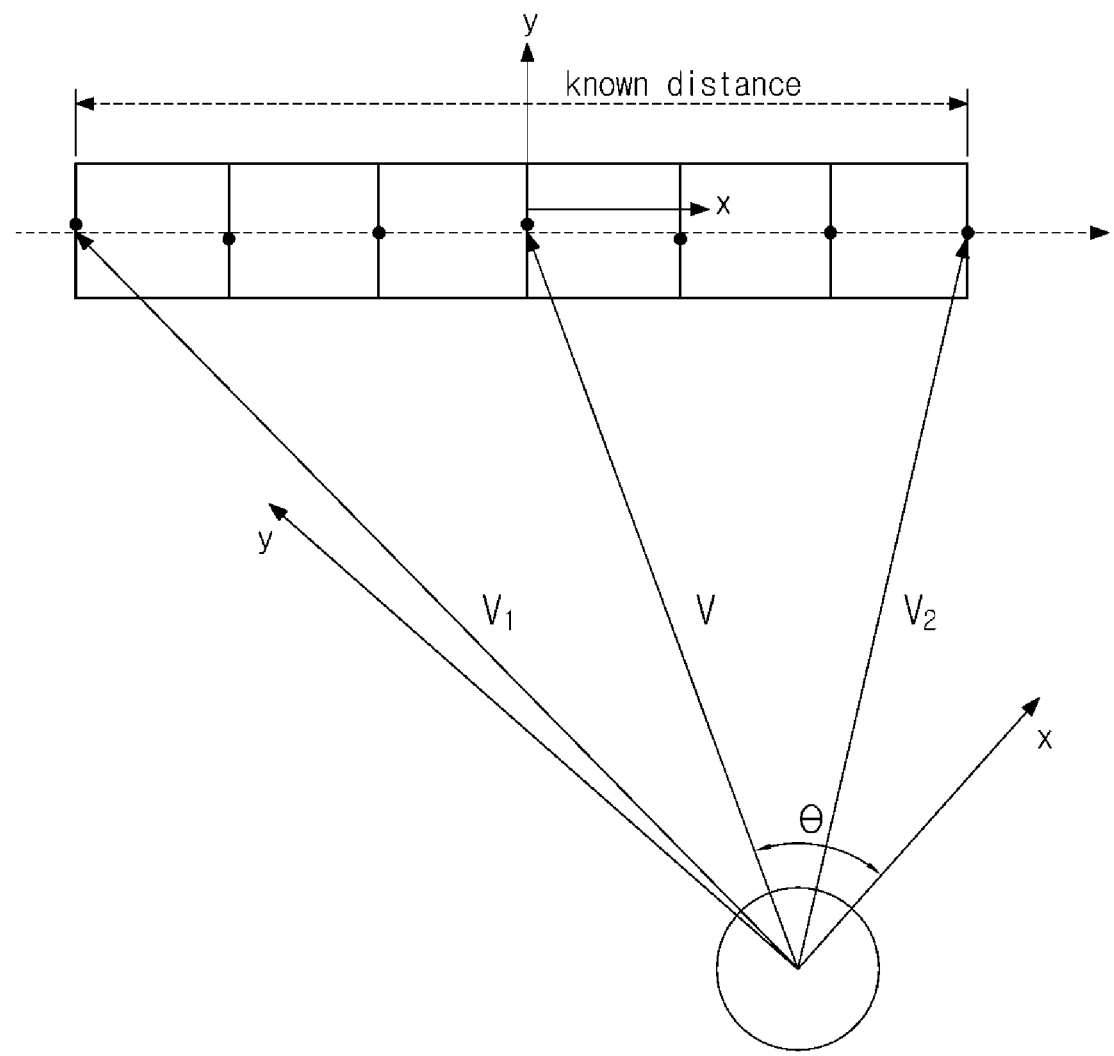
Figure 49:
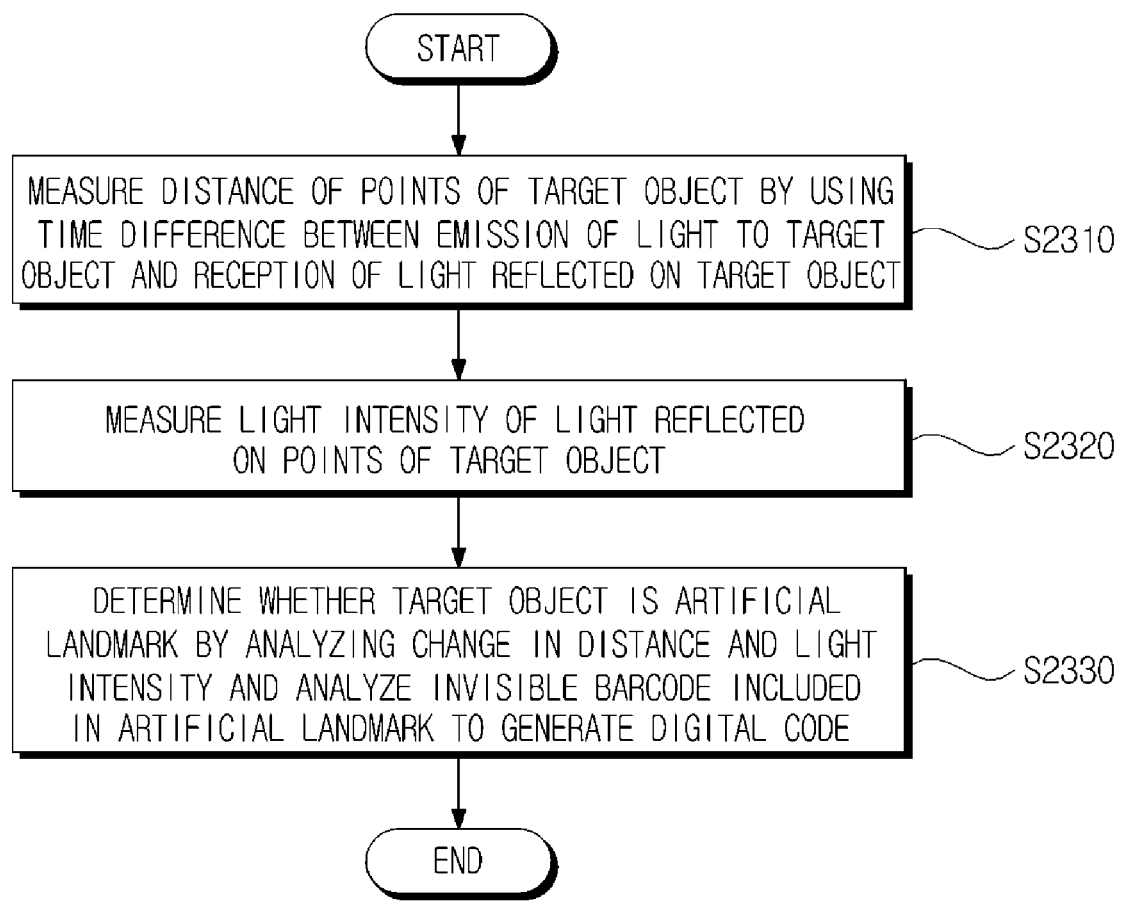

Hereinafter, the operation by which the LIDAR apparatus calculates the relative location will be described with reference to FIGS. 47 and 48. The LIDAR apparatus determines the location of artificial landmarks using posture information and distance information.

In step S2210, the location calculator performs line fitting on the recognized points of the artificial landmark in one direction. The location calculator may calculate a linear equation through line fitting. The line-fitted points may be corrected, and the angle may be corrected based on a horizontal line or a vertical line. The location calculator may correct the locations of the points of the artificial landmark through pattern matching.

In step S2220, the location calculator calculates a relative angle between (i) a virtually extended line between the line-fitted points and the LIDAR apparatus, and (ii) a virtually extended line in the direction of progression of the LIDAR apparatus. The location calculator calculates the relative angle by comparing the angles of the rotating optical transceivers. In FIG. 10, the relative angle $\theta$ is illustrated.

In step S2230, the location calculator calculates the relative distance between the line-fitted points and the LIDAR apparatus. In FIG. 10, relative vectors V, $V_1$, and $V_2$ are illustrated.

In step S2240, the location calculator calculates the relative location based on the relative angle and the relative distance. For example, the distance may be calculated using a trigonometric function, or the like.

<Docking Station>

A docking system of a moving object equipped with a TOF-based 360-degree LIDAR apparatus, according to the exemplary embodiment of the present invention, may be configured as follows. An artificial landmark made of a highly reflective material and having an invisible bar code is applied to the docking station.

Figure 50:
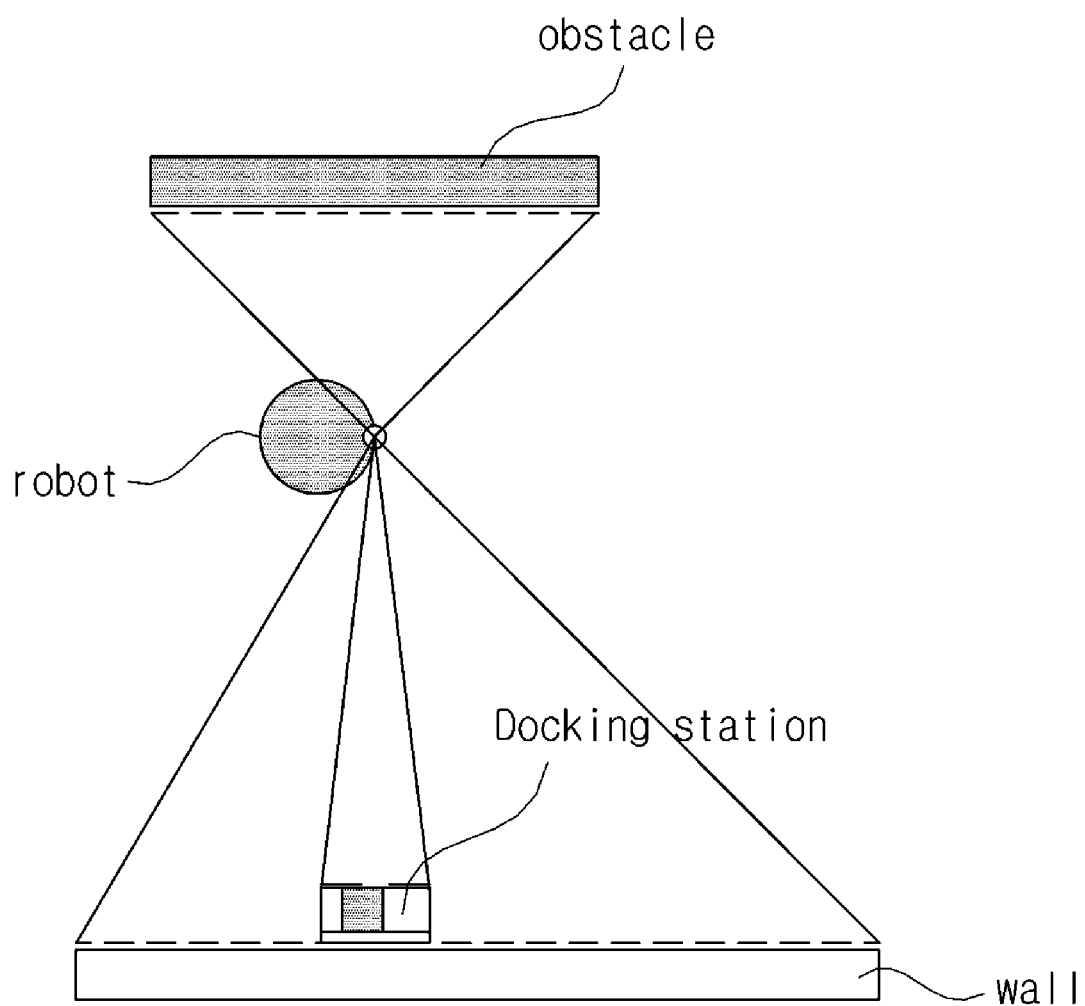

As illustrated in FIG. 50, the docking station is deployed on one side of a wall, and is made of a highly reflective material. Here, the docking station 450 may be configured by applying various patterns.

Figure 51:
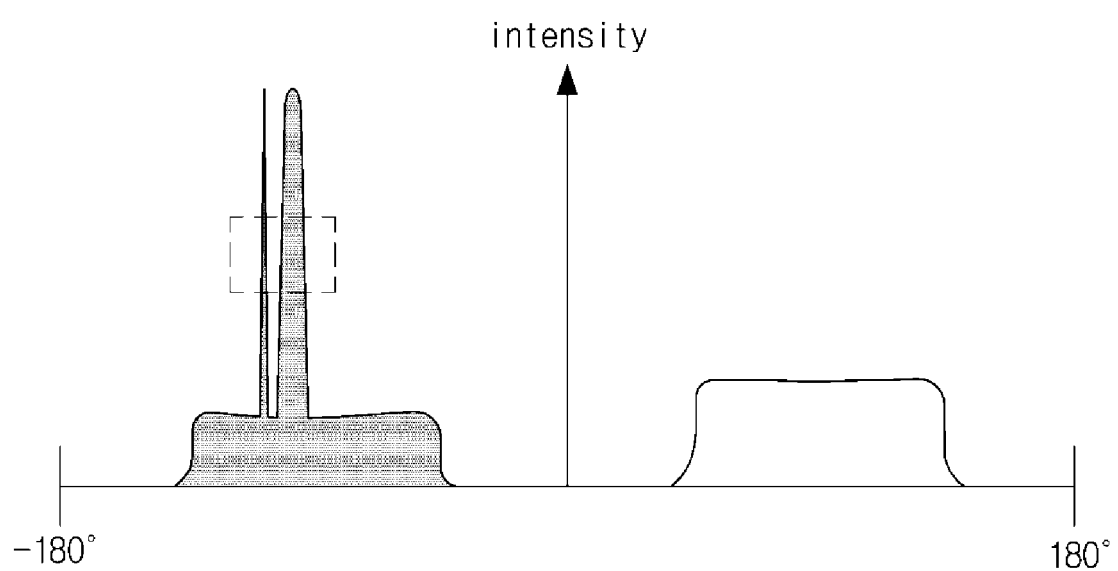

As illustrated in FIG. 51, the location of the docking station may be found since the reflectance of the docking portion is high. Since the output information of the TOF LIDAR apparatus is distance, the accurate location of the docking station may be known, thereby enhancing the docking performance.

As can be seen in a graph of the intensity measured by a laser receiver mounted on the moving object 1, as illustrated in FIG. 51, the location of the docking station may be found because of the high reflectance of the docking portion.

Since the output information of a TOF-based distance measurer indicates the distance value, the accurate location of the docking station may be known, thereby enhancing the docking performance.

<Interaction Among a Plurality of Moving Objects>

Figure 52:
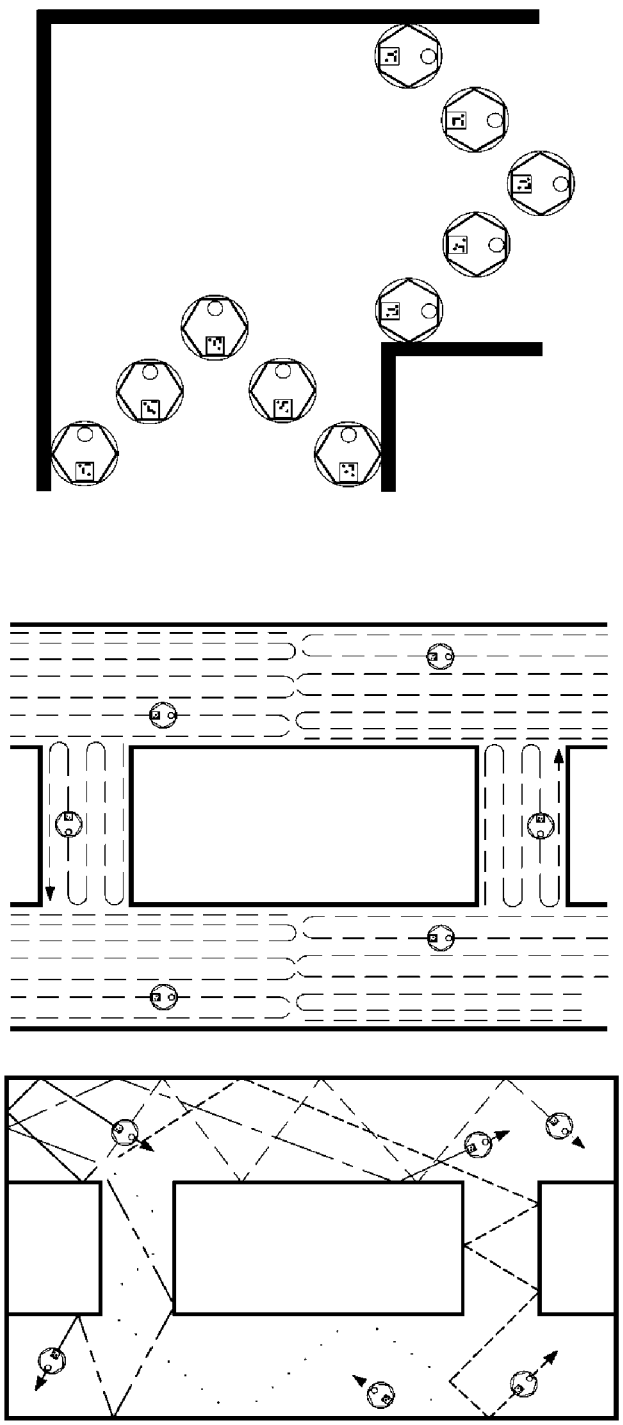
FIG. 52 is a diagram illustrating the interaction of moving objects according to the exemplary embodiments of the present invention.

FIG. 52 is a diagram illustrating how the moving objects interact, according to exemplary embodiments of the present invention.

A plurality of small moving robots may be applied, and the moving robots, which clean a wide space such as a building or the like, mutually communicate with each other in order to distinguish cleaning zones. The moving robots mutually recognize the artificial landmarks with the invisible bar codes which are attached to bodies. Existing building cleaning robots of the related art are pieces of equipment that are very large in size and expensive. On top of that, they possess a low cleaning speed and are not easy to maintain. Therefore, the moving object according to the exemplary embodiment of the present invention adopts multiple cleaning robots having the size of a home cleaning robot in the related art to clean a wide area.

According to the exemplary embodiment of the present invention, a learning technique is applied by obtaining information (current, amount of impact, posture information, etc.) on each operation performed when the moving object moves up a slope or climbs up a threshold or onto a carpet to distinguish whether the moving robot is moving on a slope or threshold.

<Location Recognition and Map Creation>

FIGS. 53 to 64 are diagrams for describing operations by which the LIDAR apparatus recognizes the location and creates a map.

Since there is no information available on a surrounding environment for enabling a moving object such as a robot or a vehicle to move when in an unknown environment, a map regarding the environment needs to be prepared using sensor information, and the current location of the moving object needs to be estimated from the prepared map. Such a method for recognizing the location and preparing a surrounding environment map is referred to as simultaneous localization and mapping (SLAM).

Figure 53:
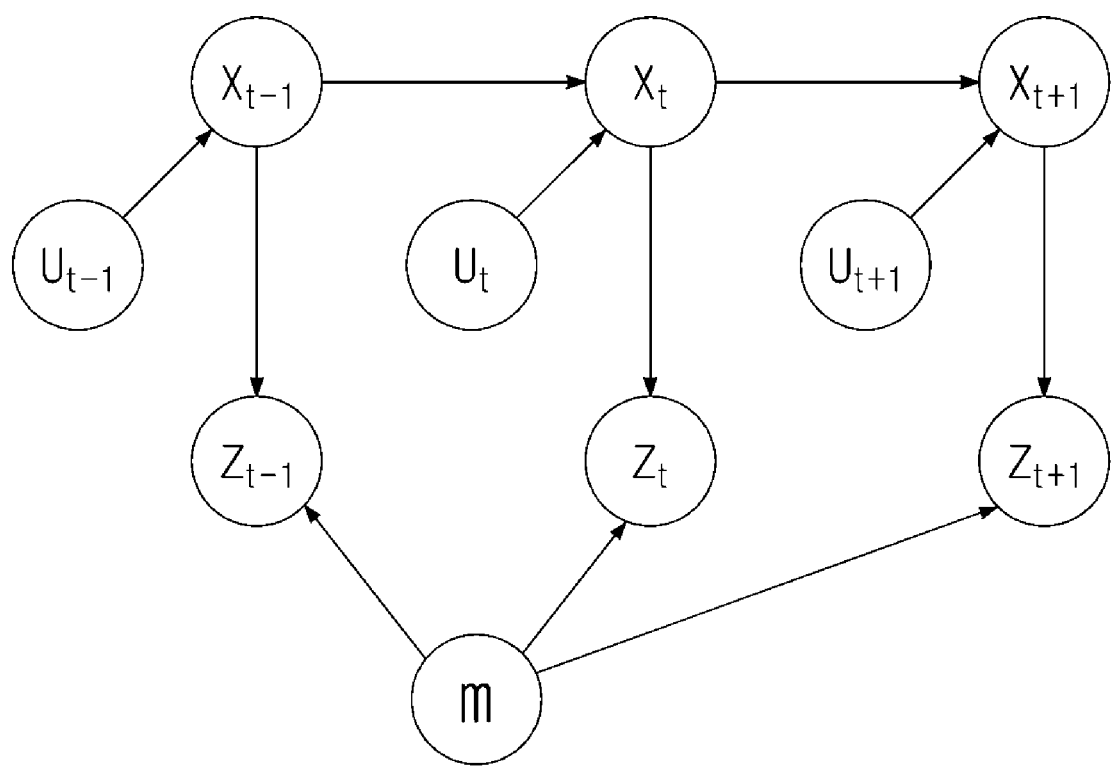
FIGS. 53 to 64 are diagrams for describing an operation by which the LIDAR apparatus recognizes a location and creates a map according to the exemplary embodiments of the present invention.

FIG. 53 illustrates information processed by a simultaneous localization and mapping (SLAM) method as a graph model. Referring to FIG. 53, x represents the location of the robot, u represents odometry information, z represents an observation value, and m represents an estimation map. There are various methods related to SLAM, including filter-based SLAM, graph-based SLAM, and the like.

Graph-based SLAM expresses the location and motion of the robot as a node and as the edge of a graph. The node is the location of the robot or the artificial landmark at a specific timing. The edge is a relationship between two nodes, and represents the spatial constraint between two nodes. The measured edge includes error. Therefore, there is a problem in that errors are accumulated in the process of location estimation as the travel distance of the robot or the number of nodes increases.

Figure 54:
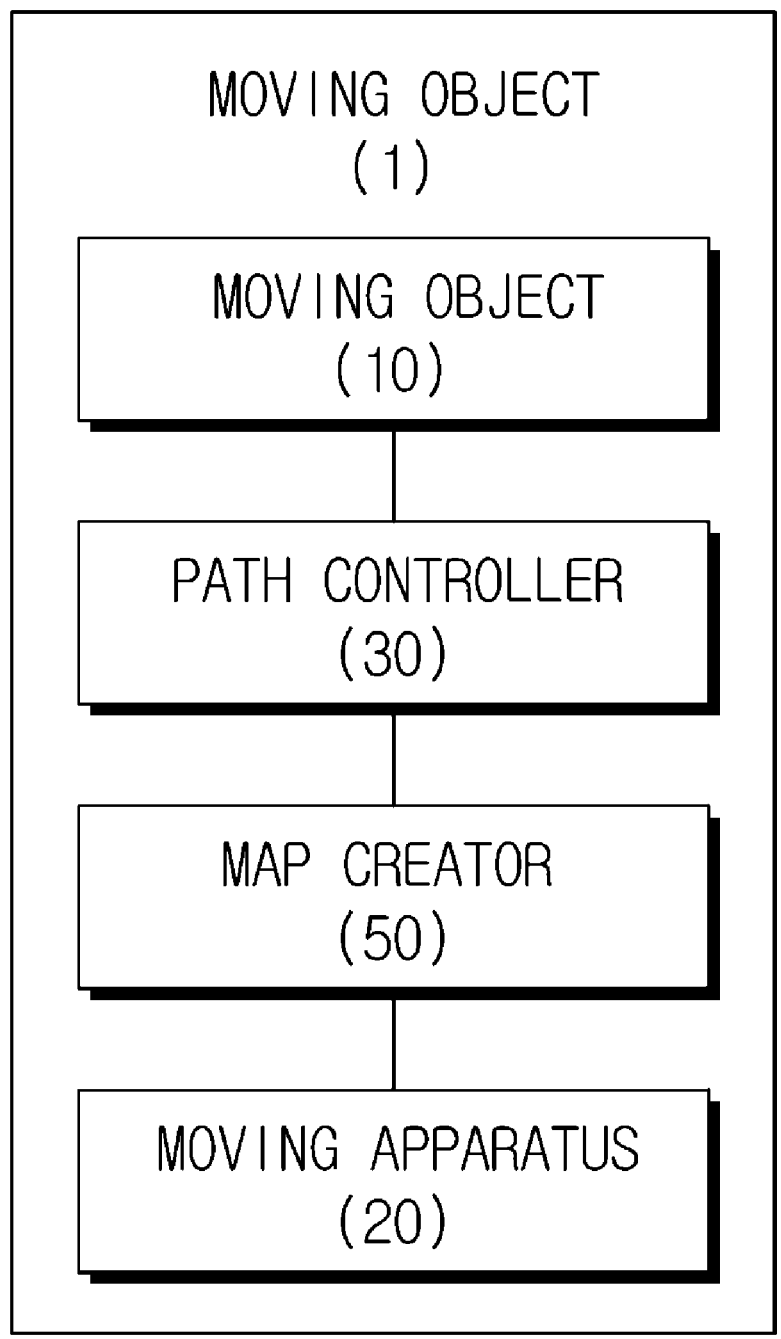
Figure 55:
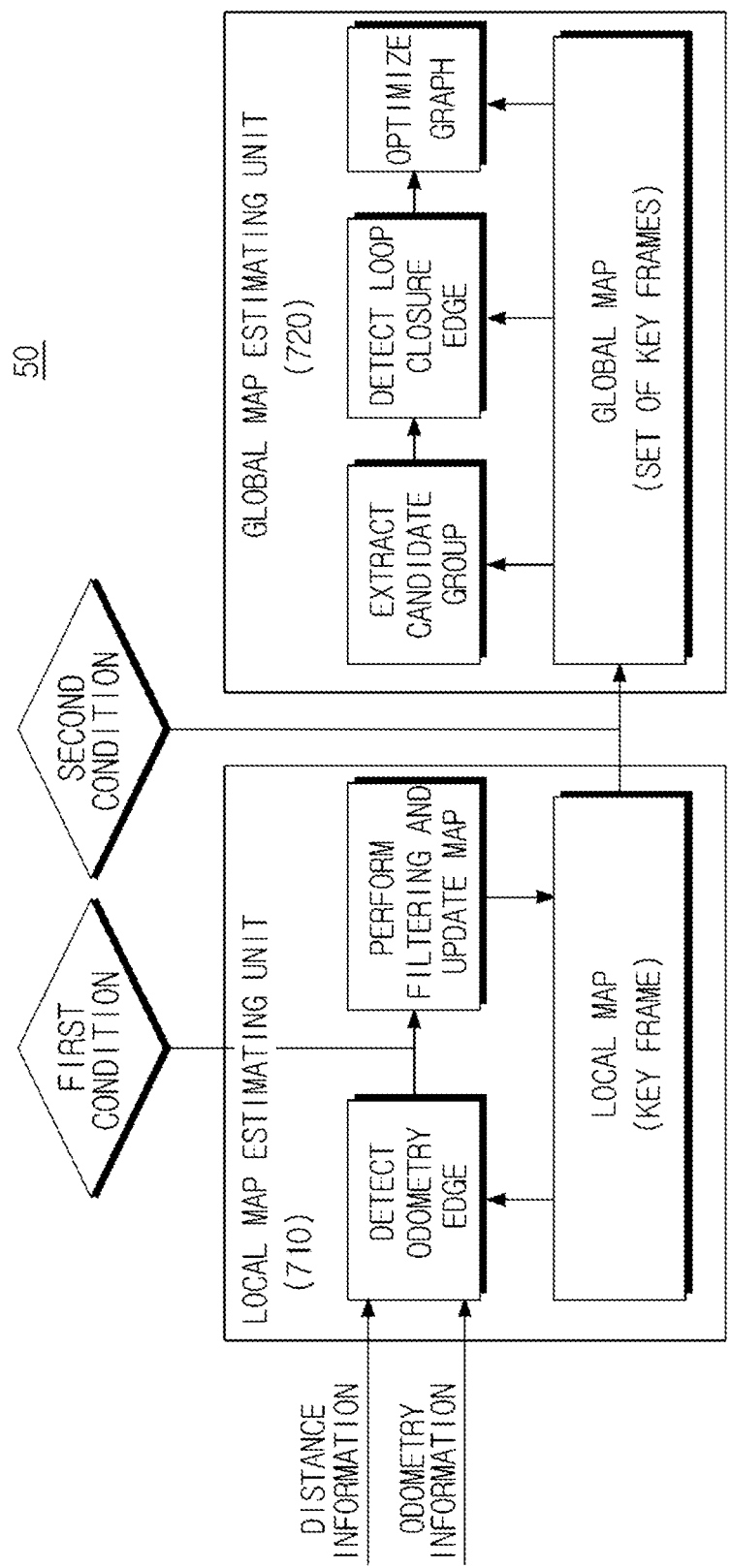

FIGS. 54 and 55 are diagrams illustrating a map creator.

As illustrated in FIGS. 54 and 55, the moving object 1 includes the LIDAR apparatus 10, a moving apparatus 20, a path controller 30, and a map creator 50. The map creator 50 includes a local map estimating unit 710 and a global map estimating unit 720.

The map creator 50 expresses a position (Pose) at which scanning is performed as a node, and calculates a relative position (Relative Pose) between nodes. The map creator 50 updates the map by optimizing the location of each node according to the relative position between the nodes. The map creator 50 performs a process of finding a node value that maximally satisfies the constraints or that minimally deviates from the constraints, and correcting the errors at the locations of the nodes in order to optimize the location of the node. That is, the nodes converge to an optimal node value based on the constraint.

When estimating the current location, the map creator 50 uses sensor data obtained in a nearby area to estimate the current location. The scanning period and key frame generation period are set to appropriate numerical values according to the design to be implemented, and may be set differently as needed.

The LIDAR apparatus 10 acquires scan information of the space where the moving robot is positioned. The LIDAR apparatus 10 may acquire omnidirectional distance information or distance information of a partial region using a LIDAR sensor. The map creator 50 may additionally obtain odometry information of the moving robot together with the distance information. The map creator may obtain various types of odometry information, such as the number of revolutions, the slope, and the amount of rotation, from an encoder or inertial measurement unit (IMU) connected to the moving apparatus of the moving robot. The IMU may be implemented as an acceleration sensor and a gyro sensor.

The location of the moving robot may be expressed by a 3D vector. The 3D vector may be represented by an X-coordinate and a Y-coordinate from the origin of a reference coordinate system, and an angle formed by an X axis of a robot coordinate system and the X axis of the reference coordinate system.

The local map estimating unit 710 uses the scan information to generate a key frame relating to a node, and calculates an odometry edge between consecutive nodes. The observation value between the nodes has uncertainty. The uncertainty of the odometry edge may be expressed as a covariance matrix.

The local map estimating unit 710 stores the key frame among a plurality of pieces of scan information acquired for each scanning period. The scan information may be represented as a point cloud. The key frame includes distance information and time information. If there are no registered key frames, the local map estimating unit 710 generates a key frame using currently inputted distance information, and then updates the key frame to estimate a local map. The local map estimating unit 710 performs scan matching based on the local map combined with the plurality of pieces of scan information to enhance accuracy.

The local map estimating unit 710 calculates the odometry edge by either performing scan matching by rotating or moving the scan information, or by measuring the odometry information of the moving robot. The local map estimating unit 710 corrects the error between a predicted odometry edge and a measured odometry edge based on the estimated value of the node through scan matching.

The global map estimating unit 720 detects a loop closure edge between nodes which are not consecutive with respect to a set of updated key frames. When the moving robot visits the previously visited area again, the error of the nodes may be corrected even more accurately. Unlike an odometry edge between temporally consecutive nodes, the loop closure edge forms a spatial relationship between nodes that are not temporally consecutive. However, since it is inefficient to generate loop closure edges between all edges, it is necessary to detect an appropriate loop closure edge in consideration of the constraints.

The global map estimating unit 720 estimates a global map by correcting the locations of nodes based on the odometry edge and the loop closure edge. The global map estimating unit 720 combines local maps to extend and update the global map.

The interface is a communication path for transmitting/receiving information to/from another apparatuses. Other apparatuses may be connected to the map creator 50 through the interface to set the parameters. The map creator 50 may transmit the measurement location and the map to other apparatuses through the interface.

Figure 56:
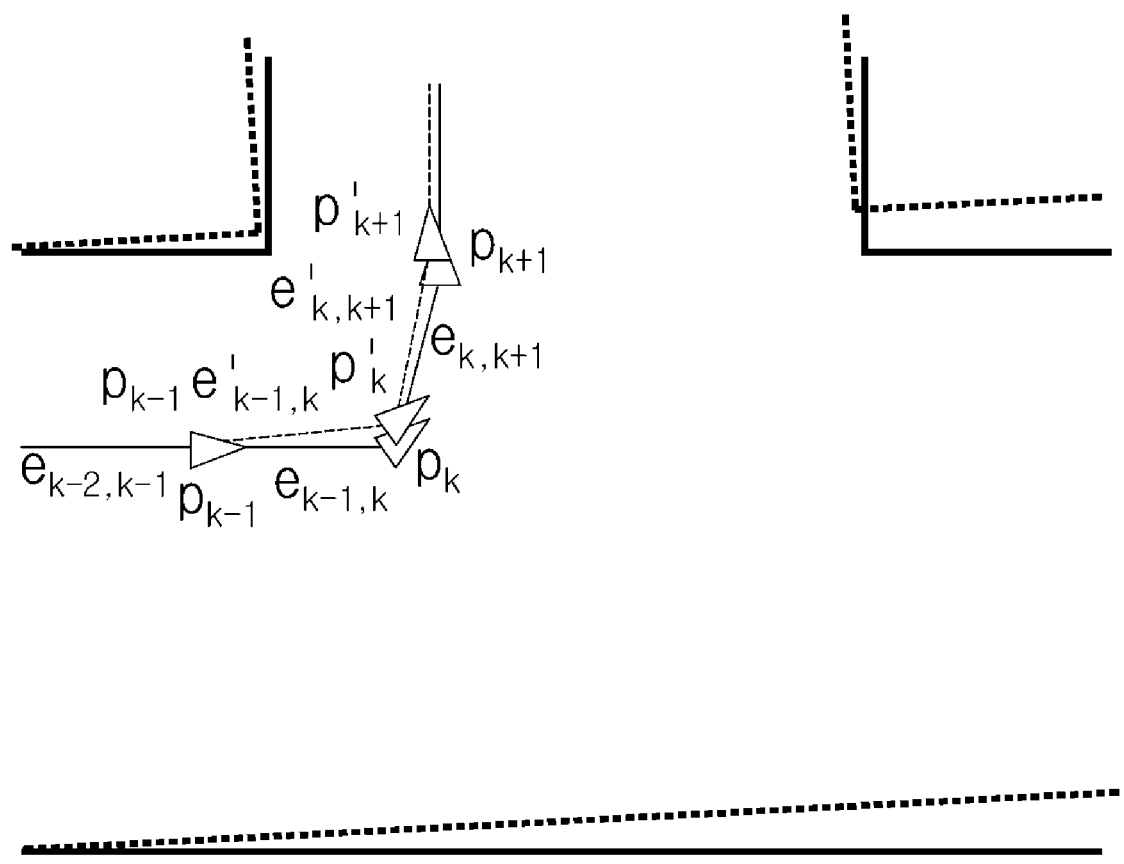

Hereinafter, an operation in which the map creator performs scan matching will be described with reference to FIG. 56. FIG. 56 is a diagram illustrating data that is scanned and matched by the map creator.

p represents the position (Pose) of the node according to the change in time and position, and e represents the spatial relationship between nodes. The scan information obtained by the map creator includes information on the distance from a fixed structure.

When the scan information from before and after movement of the robot is compared, odometry errors are accumulated causing common parts not to overlap. The accurate position of the robot may be estimated by correcting the odometry error through scan matching by rotating or moving the scan information and calculating the probability of the observed value.

Figure 57:
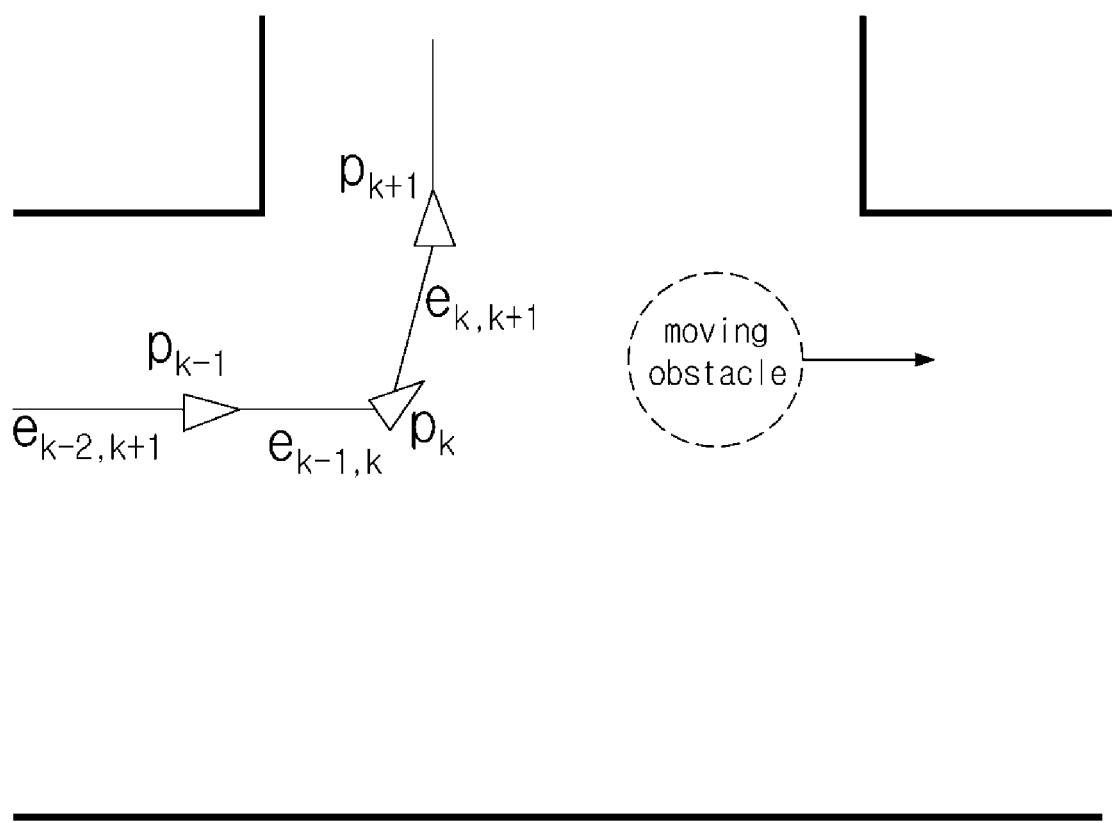

Hereinafter, an operation in which the map creator performs filtering will be described with reference to FIG. 57. FIG. 57 is a diagram illustrating data filtered by the map creator.

Unlike a fixed structure, the scan information acquired at a specific time or at a specific location may include noise such as moving obstacles, and the local map which is gradually updated during movement of the moving robot may be changed to a different structure from an actual structure. That is, when the scan information obtained at the same position but at different time intervals is scanned and matched, error may occur in the estimated map due to the moving obstacles.

The local map estimating unit discriminates moving obstacles from fixed obstacles from a plurality of pieces of scan information obtained at a preconfigured time interval by applying a probabilistic technique, and compares newly acquired scan information to remove the moving obstacles from the key frame in order to update the local map. The local map is updated by removing the noise using the most recent N pieces of scan information. The noise may be point cloud data which was modified by moving by a preconfigured movement distance or rotates at a predetermined rotational angle.

In order to reduce the calculation load and obtain more meaningful information, the local map estimating unit may filter the key frame when a first condition regarding the movement distance of the moving robot is satisfied. The first condition is set based on the movement distance. For example, the local map estimating unit performs filtering when moving more than a specific distance from a reference point.

Figure 58:
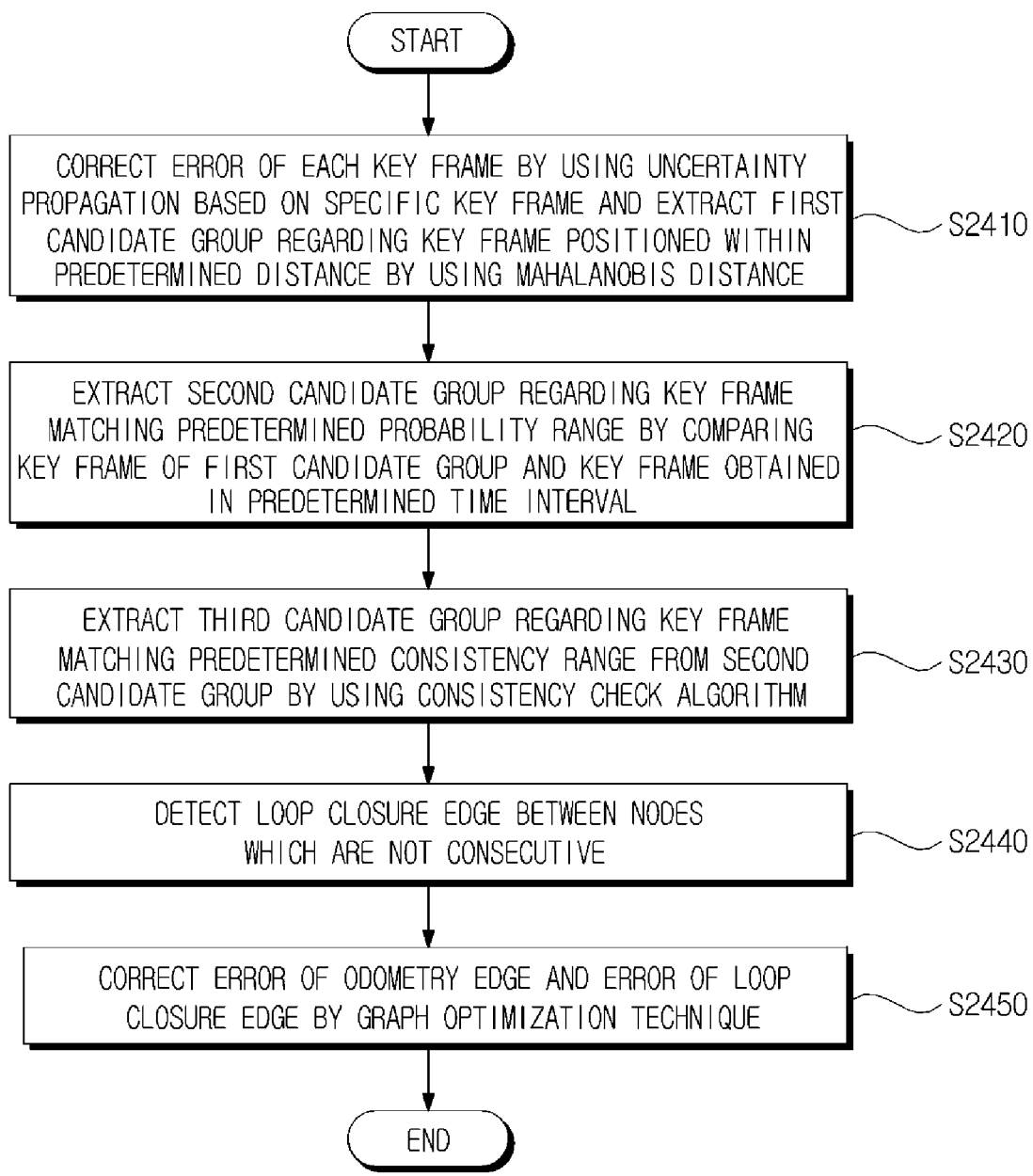
Figure 59:
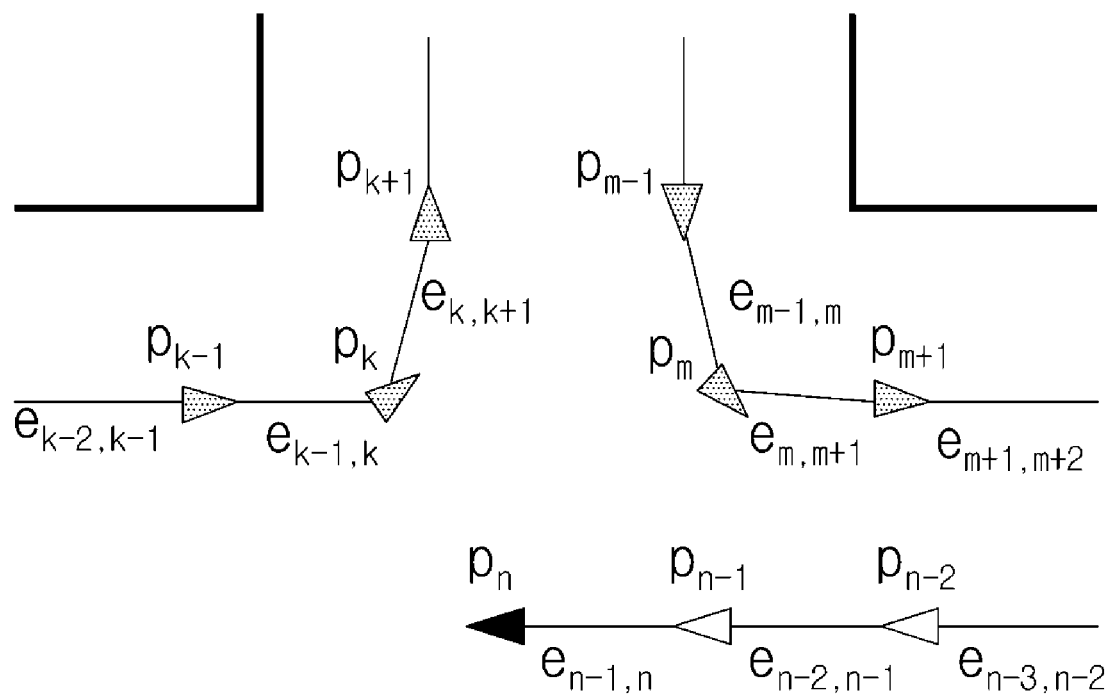
Figure 60:
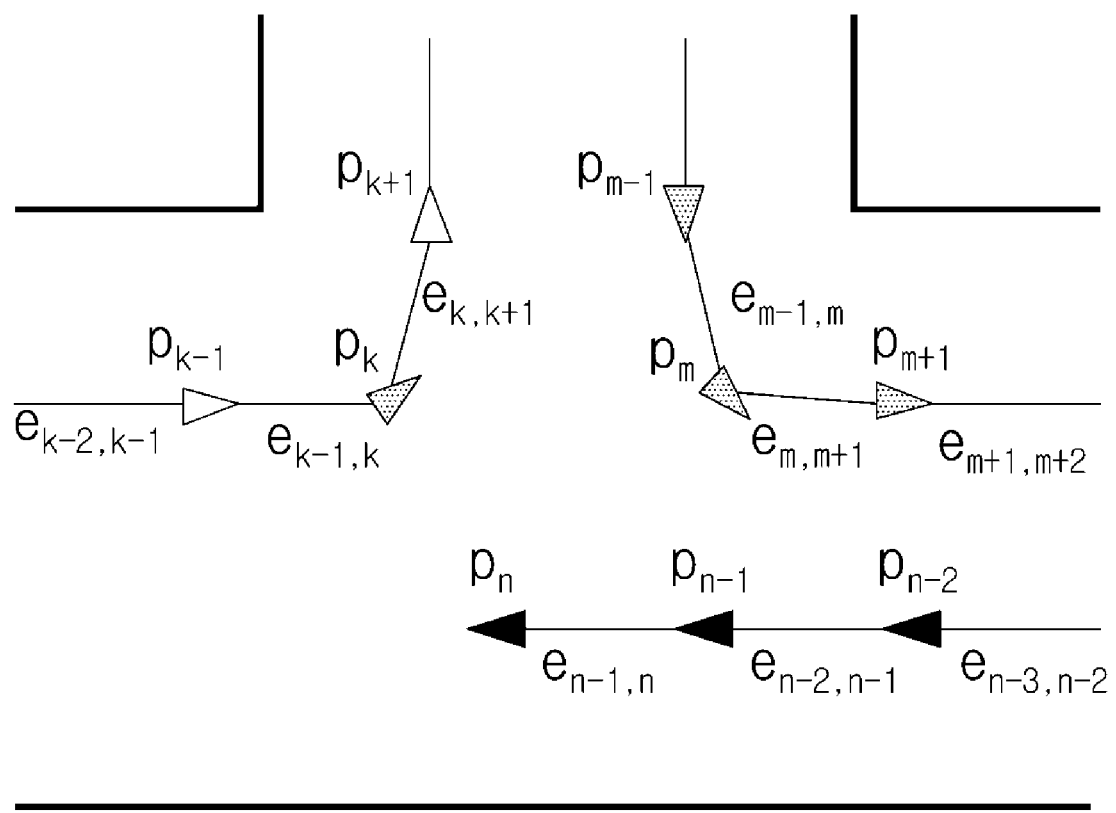

Hereinafter, an operation in which the map creator estimates the global map will be described. FIG. 58 is a flowchart illustrating an operation in which the map creator estimates the global map, and FIGS. 59 to 63 illustrate data processed by the map creator.

The global map estimating unit estimates the global map for a set of updated key frames when a second condition regarding the movement distance of the moving robot or a change of the surrounding environment is satisfied. The second condition is set based on the movement distance or the change of the surrounding environment. For example, the second condition may be set so that the condition is met when the moving robot travels by more than a specific distance or deviates from a specific distance range, or when the matching rate of the surrounding structures deviates from a predetermined range.

The most recent N pieces of scan information are all filtered data, and contain data relating to fixed structures. The global map estimating unit stores the filtered key frames.

In step S2410, the global map estimating unit corrects the error of each key frame using uncertainty propagation based on a specified key frame, and extracts a first candidate group relating to the key frames positioned within a predetermined distance by using a Mahalanobis distance. The Mahalanobis distance is a value indicating how many times the standard deviation the distance from the average is, and is a value acquired by digitizing whether a certain value is a value which is difficult to generate, or how abnormal a value a certain value is. In FIG. 9, nodes $p_{k-1}$, $p_k$, $p_{k+1}$, $p_{m-1}$, $p_m$, and $p_{m+1}$ of the first candidate group extracted based on a node $p_n$ relating to a recently inserted key frame are illustrated.

In step S2420, the global map estimating unit compares the key frame of the first candidate group and the key frame obtained at the preconfigured time interval to extract a second candidate group related to the key frame matching of a preconfigured probability range. In FIG. 10, the nodes $p_k$, $p_{m-1}$, $p_m$, and $p_{m+1}$ of the second candidate group extracted based on the nodes $p_n$, $p_{n-1}$, and $p_{n-2}$ relating to the most recent N key frames are illustrated.

Figure 61:
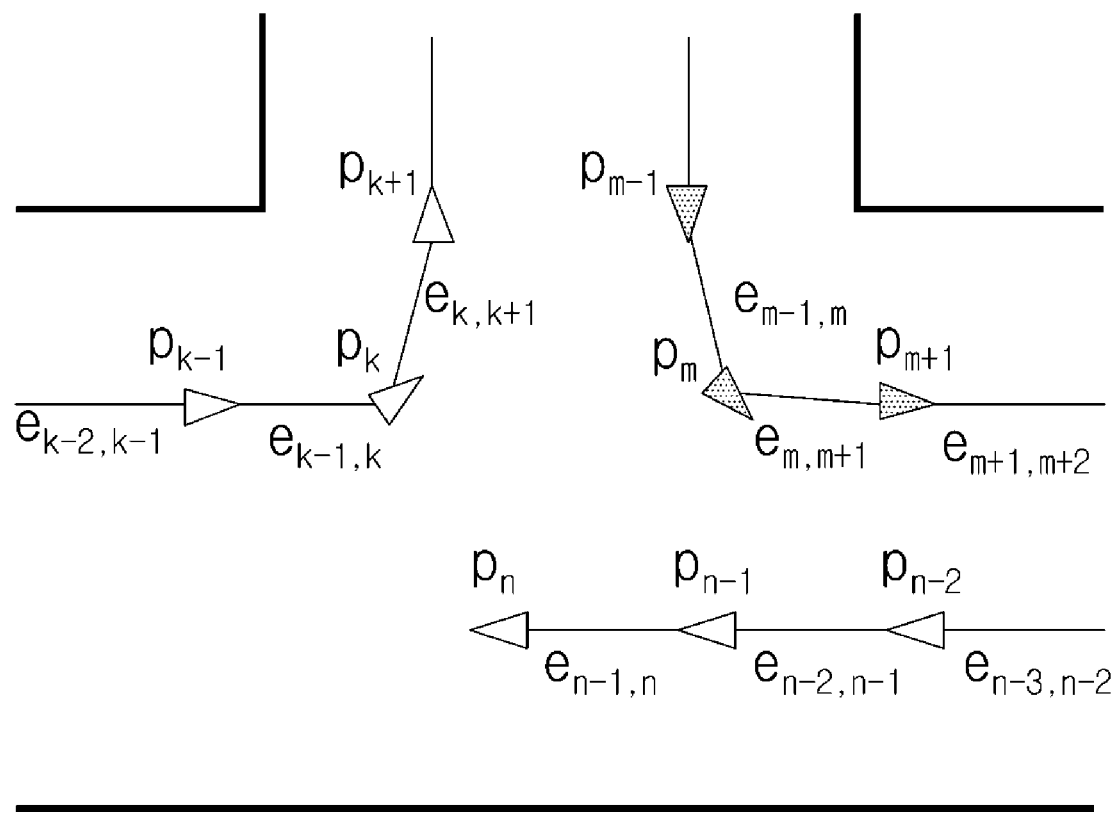
Figure 62:
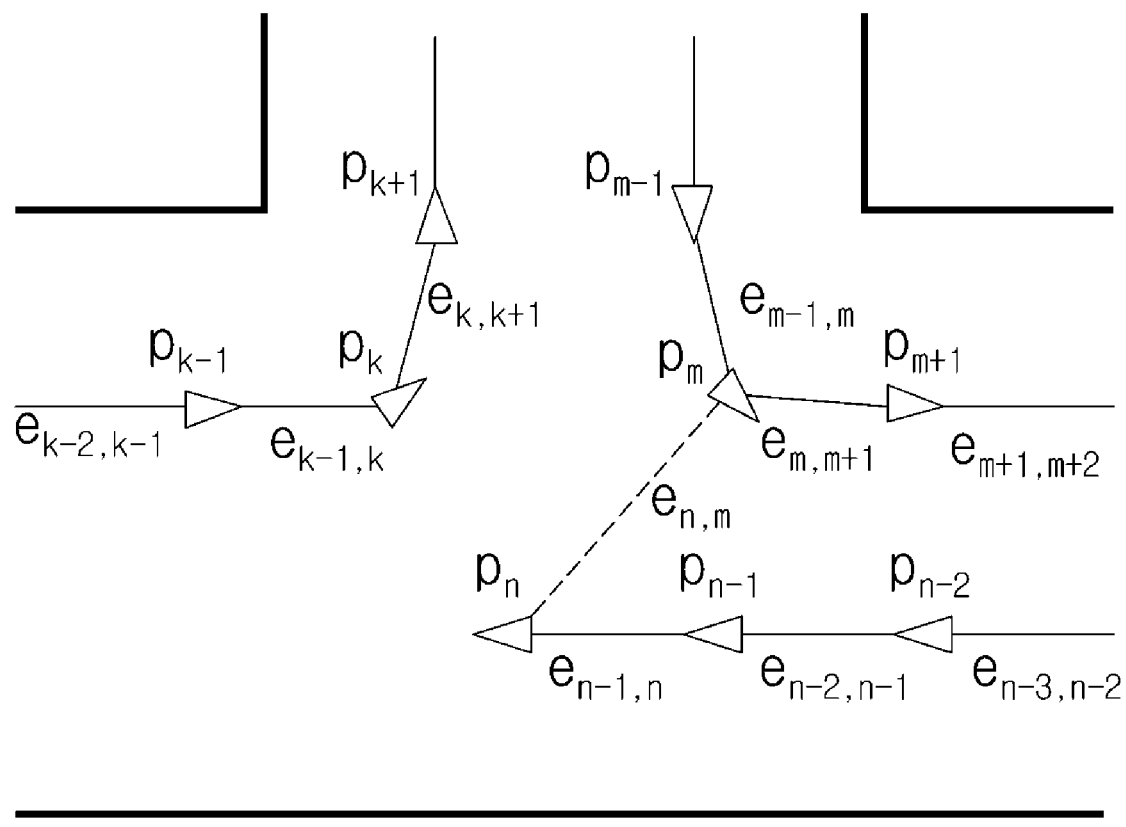
Figure 63:
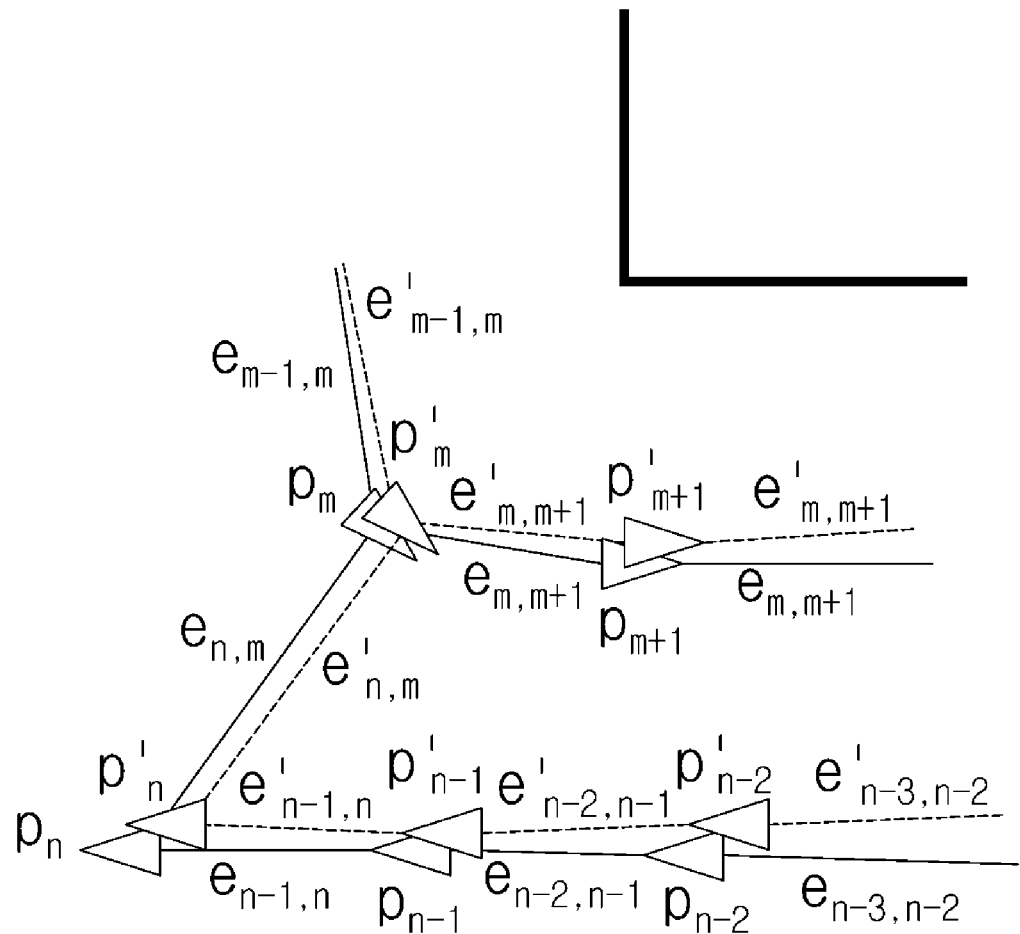

In step S2430, the global map estimating unit uses a consistency check algorithm to extract a third candidate group from the second candidate group, relating to a key frame matching a preconfigured consistency range. The global map estimating unit rechecks mis-matched candidates. For example, a maximum clique or single cluster graph partitioning technique may be applied as the consistency check algorithm. FIG. 61 illustrates extracted nodes $p_{m-1}$, $p_m$, and $p_{m+1}$ of the third candidate group.

In step S2440, the global map estimating unit detects the loop closure edge between nodes that are not consecutive with respect to the key frame belonging to the third candidate group. The global map estimating unit forms a spatial relationship between a recent node and a meaningful node. In FIG. 12, a loop closure edge $e_{n,m}$ between inconsecutive nodes $p_n$ and $p_m$ is illustrated.

In step S2450, the global map estimating unit corrects the errors of the odometry edge and the loop closure edge using a graph optimization technique. The global map estimating unit performs a process of finding the node value that maximally satisfies the constraints or that minimally deviates from the constraints, and correcting the errors at the locations of the nodes in order to optimize the location of the node. That is, the nodes converge to an optimal node value based on the constraint. For example, the error may be corrected using a method of calculating the minimum value of a weighted squared sum with respect to an error vector which is based on the plurality of odometry edges and the plurality of loop closure edges.

The global map estimating unit may output a global map in which a plurality of local maps is combined.

Figure 64:
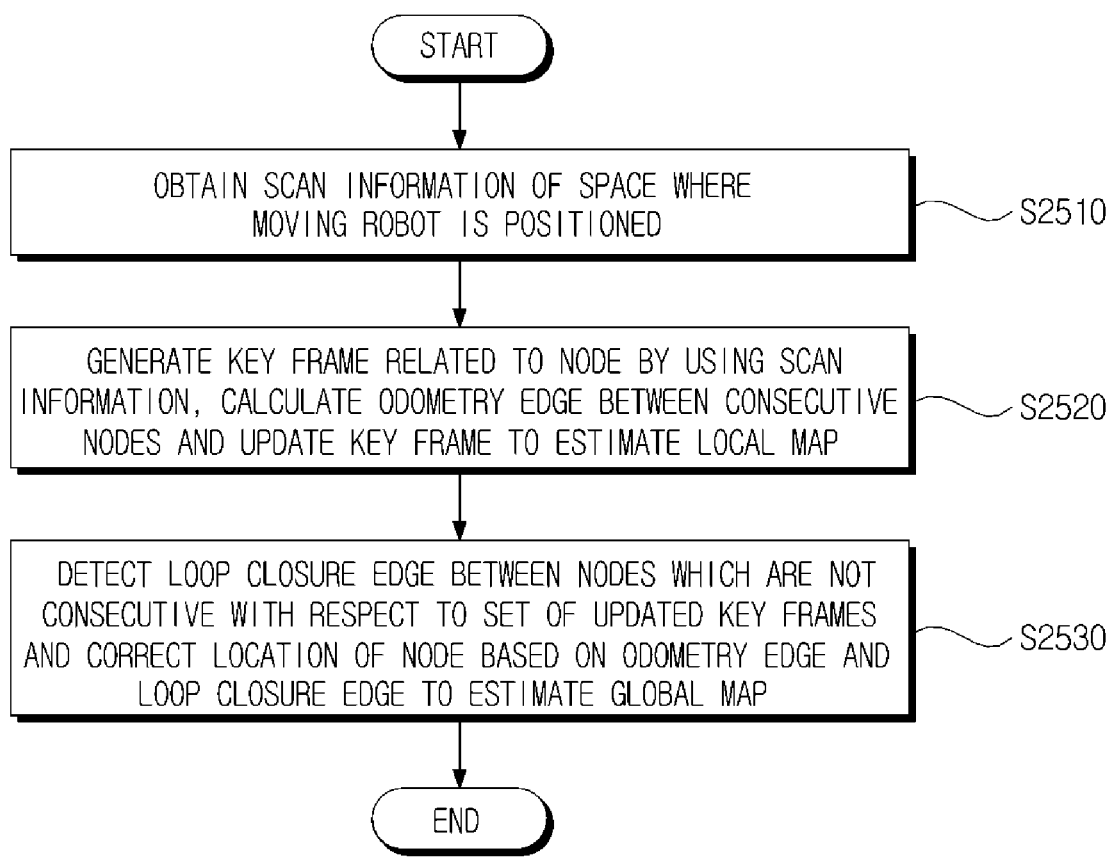
Figure 65:
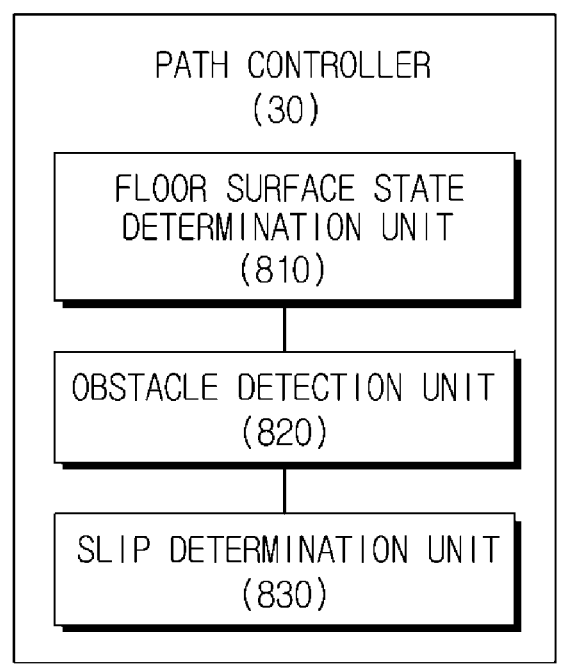
FIGS. 65 to 75 are diagrams illustrating path controllers of the LIDAR apparatus according to the exemplary embodiments of the present invention.

FIG. 64 is a flowchart illustrating a localization and mapping method according to another exemplary embodiment of the present invention. The localization and mapping method of the moving robot may be performed by the map creator of the moving robot.

In step S2510, the map creator acquires scan information about the space where the moving robot is positioned. In the step (S2510) of acquiring the scan information, omnidirectional distance information or distance information of a partial region may be obtained using a LIDAR sensor. In the step (S2510) of acquiring the scan information, odometry information of the moving robot may additionally be obtained together with the distance information.

In step S2520, the map creator generates the key frame related to a node using the scan information, calculates an odometry edge between consecutive nodes, and updates the key frame to estimate the local map.

In the step (S2520) of estimating the local map, the odometry edge is calculated through performing scan matching by rotating or moving the scan information, or by measuring the odometry information of said moving robot. In the step (S2520) of estimating the local map, the error between a predicted odometry edge and a measured odometry edge is corrected through scan matching based on the estimated value of the node.

In the step (S2520) of estimating the local map, the key frame is filtered when the first condition regarding the movement distance of the moving robot is satisfied. In the step (S2520) of estimating the local map, a probabilistic technique is employed to discriminate the moving obstacles and fixed obstacles from a plurality of pieces of scan information obtained at a preconfigured time interval, and the moving obstacles are removed from the key frame by comparing newly obtained scan information to update the local map.

In step S2530, the map creator detects a loop closure edge between nodes that are not consecutive with respect to a set of the updated key frames and estimates a global map by correcting the location of the node based on the odometry edge and the loop closure edge.

In the step (S2530) of estimating the global map, the global map of a set of updated key frames is estimated when a second condition regarding the movement distance of the moving robot or the change of the surrounding environment is satisfied.

In the step (S2530) of estimating the global map, the error of each key frame is corrected using uncertainty propagation based on a specified key frame, and a first candidate group relating to the key frames positioned within a preconfigured distance is extracted using a Mahalanobis distance.

In the step (S2530) of estimating the global map, the key frames of the first candidate group and the key frames obtained at the preconfigured time interval are compared to extract a second candidate group relating to a key frame matching a predetermined probability range.

In the step (S2530) of estimating the global map, a third candidate group relating to a key frame matching a predetermined consistency range is extracted from the second candidate group using a consistency check algorithm. The map creator generates a loop closure edge for at least one of the nodes belonging to the first through third candidate groups.

In the step (S2530) of estimating the global map, the error of the odometry edge and the error of the loop closure edge are corrected using a graph optimization technique.

<Path Control of LIDAR Apparatus>

FIGS. 65 to 75 are diagrams illustrating a path controller of the LIDAR apparatus, according to the exemplary embodiments of the present invention.

Even if a cleaning robot fuses information obtained by these sensors, there is a problem in that it is only possible to distinguish a floor material such as a carpet or to detect a wall, while it is impossible to distinguish the height of a floor such as an inclination, or detect low obstacles such as clothes, animal feces, a threshold, or the like.

Hereinafter, according to the present invention, a cleaning robot adopting an algorithm which measures the state of a floor surface, in particular, the height state of the floor surface, or which detects low obstacles based on a point cloud will be described. The path controller 30 may additionally include a floor surface state determination unit 810, an obstacle detection unit 820, a slip determination unit 830, or a combination thereof.

Figure 66:
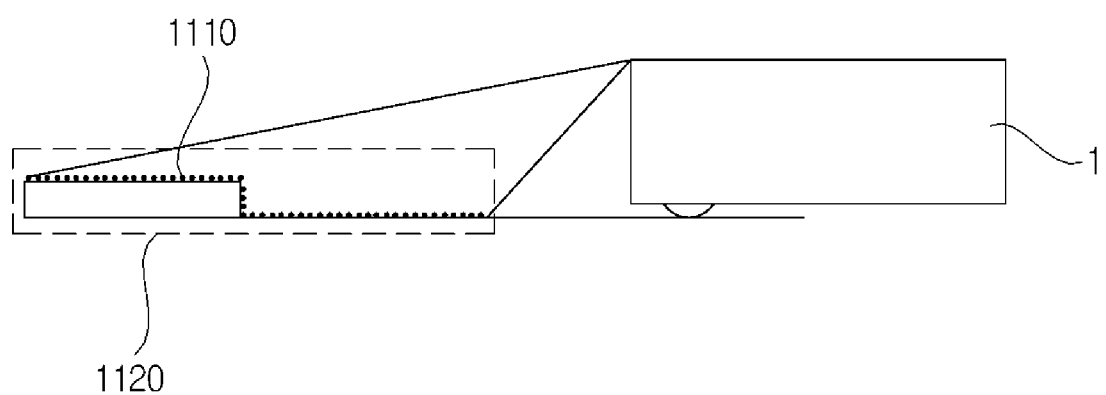
Figure 67:
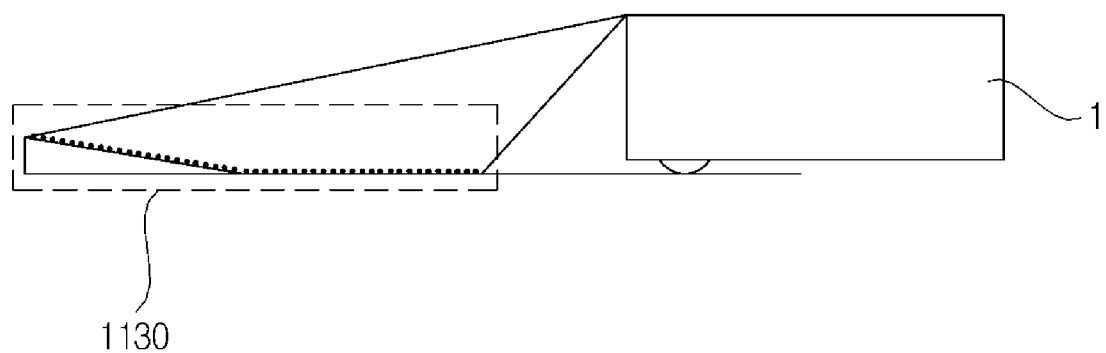
Figure 68:
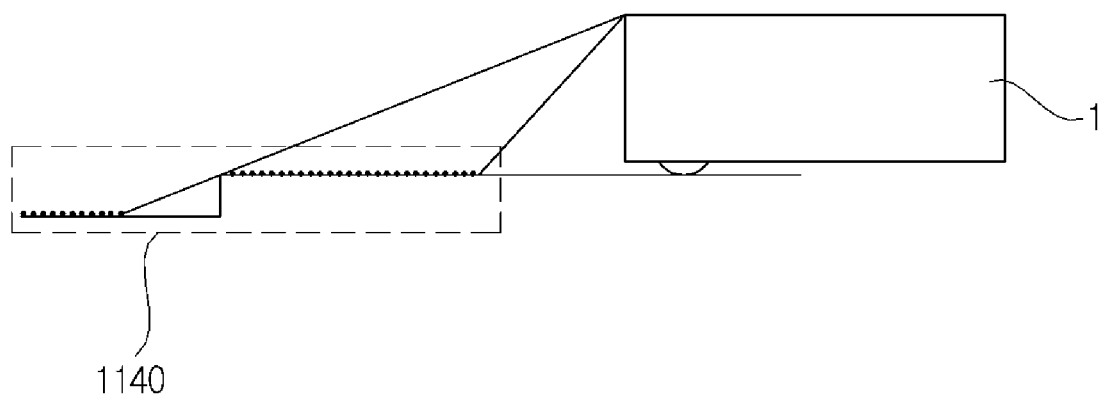

FIGS. 66 to 68 are conceptual diagrams illustrating point cloud data obtained in different forms according to the state of the floor surface.

The moving object 1 may acquire information on the surrounding environment as 3D information by using a sensor capable of acquiring 3D information on an object, such as a LIDAR sensor and a time of flight (TOF) sensor. When each point on the floor surface is defined as a point 1110, the moving object 1 may acquire 3D information on each point 1110 using the LIDAR sensor, TOF sensor, or the like.

<Determination of State of Floor Surface>

When 3D information on each point 1110 is acquired, it becomes possible to distinguish the state of a floor surface, for example, the height of the floor surface, from the information on the point cloud formed by a set of such points 1110. In the present invention, the moving object 1 measures the state of the floor surface, for example, the height state of the floor surface, based on the point cloud data for the floor surface.

Portions of the floor surface formed of high and low areas in the household environment of a general home include thresholds, ramps, cliffs and the like, as illustrated in FIGS. 66 to 68. FIG. 66 illustrates an example of a threshold, FIG. 67 is an example of a ramp, and FIG. 68 is an example of a cliff.

In order to enhance the safe travel and cleaning performance of the moving object 1, the moving object 1 needs to distinguish portions on the floor surface having different heights. However, as for current commercialized robots, since the information used for distinguishing the height of the floor surface is very limited, it is not easy to properly distinguish the height of the floor surface when such a situation is encountered.

For example, when the robot climbs up a threshold or a ramp, a pitch angle of the robot is generated as the front end of the robot is lifted. As a result, it is not easy to distinguish whether the robot is climbing up a threshold or a ramp.

Further, when the front of the robot is lifted in the case where the robot is climbing a threshold, the floor sensor mounted on the robot is exposed. As a result, the robot may misinterpret the state of the floor surface as being a cliff.

In the present invention, the moving object 1 obtains information on the floor surface positioned ahead as point cloud data using the LIDAR sensor, TOF sensor, or the like. Since point cloud data 1120, 1130, and 1140 will vary according to the state of the floor surface, as shown in FIGS. 66 to 68, the moving object 1 may detect the state of the floor surface based on the point cloud data 1120, 1130, and 1140.

Further, the moving object 1 detects changes in the height of the floor surface based on the point cloud data 120, 130, and 140 to perform an appropriate control function according to the state of the floor surface.

<Obstacle Detection>

When a TOF sensor is used as the sensor capable of acquiring 3D information on an object, the moving object 1 may acquire 3D information on the object using a TOF-based 360-degree distance measurer.

When the moving object 1 uses the TOF-based 360-degree distance measurer, not only detection of the state of the floor surface may be achieved, but also detection of carpet and obstacles, as well as position estimation and the like may be achieved.

As described above, by using the LIDAR sensor, a TOF sensor or the like, the moving object 1 is capable of reconfiguring the surrounding environment, such as the floor surface or the like, in 3D based on the point cloud data. The moving object 1 separates information on the floor surface from the information on the reconfigured surrounding environment to detect the materials (tile, floor, carpet, etc.) of the floor surface or the existence of low obstacles (clothes, animal feces, blocks, etc.) scattered on the floor surface, and the like, in addition to determining the height state (the thresholds, ramps, cliffs, etc.) of the floor surface.

As information on each point in a room, the LIDAR apparatus 10 may obtain information on a first set of points and a second set of points. The LIDAR apparatus 10 may obtain the information on the first set of points using at least one channel signal associated with a low beam. The LIDAR apparatus 10 may obtain the information on the second set of points using at least one channel signal associated with a high beam.

An obstacle detecting unit 820 serves to detect the obstacles positioned in the room based on the information on the first points and/or the information on the second points related to the space of the room. The obstacle detecting unit 820 may easily detect even low obstacles scattered on the floor surface based on the information on the floor surface acquired from the point cloud data 1150, thereby enabling obstacle avoidance travel and cleaning.

A cleaning unit provided in the moving object performs a cleaning function for the room based on the information of the state of the floor surface and the obstacles.

When the moving object 1 may perform appropriate countermeasures for low obstacles according to the present invention, the cleaning success rate and coverage performance of the moving object 1 may also be enhanced.

<Slip Detection>

Next, a slip detection method of the moving object 1 will be described. In the following description, as an example, the moving object 1 will be described as the target object to which the slip detection method is applied, but the slip detection method proposed in the present invention is not limited thereto and may be applied to all robots which are driven using wheels.

The moving object 1 may detect a slip using a gyro sensor and a passive encoder, which is a front wheel recognition sensor. In this case, the moving object 1 compares the rotational speed thereof, which is estimated from the encoders of both wheels, with gyro information to detect slip, whereby the moving object 1 detects movement thereof using a manual encoder and compares it with the movement speed acquired from the inductors of both wheels to determine whether the moving object 1 is actually moving.

However, there is a problem in that the rotation of the passive encoder varies according to the state of the floor surface, causing inaccurate information to be provided in environments in which differences in the height of a traveling surface occurs, such as in a region with many irregularities, at a threshold, a carpet, or the like.

The moving object 1 is also capable of detecting slip based on the optical flow of an infrared signal (or a laser signal). In this case, the moving object 1 detects the motion thereof based on the flow of signals between a light emitting element and a light receiving element attached to a bottom surface and compares the motion information with the encoder information of the wheels to determine whether the moving object 1 is in a slip situation or a constraint situation.

However, since the signal is very sensitive to the reflectance of the floor surface, there is a problem in that slip detection is difficult when the floor surface is uneven.

In the present invention, in order to solve such problems, a method for detecting the slip of the moving object 1 based on laser odometry will be described.

Laser odometry is a method that estimates the amount of movement of the moving object 1 by using the distance to the surrounding obstacles, which is obtained from a single-channel/multi-channel 360 degree laser distance measurer, and through this, sums up the accumulated movement amount of the moving object 1 estimated from an initial location, in order to estimate the current location. Here, the speed of the moving object 1 may be estimated by dividing the difference between the surrounding obstacle information measured at the current time point and the surrounding obstacle information obtained at a previous time point by the time difference.

Figure 71:
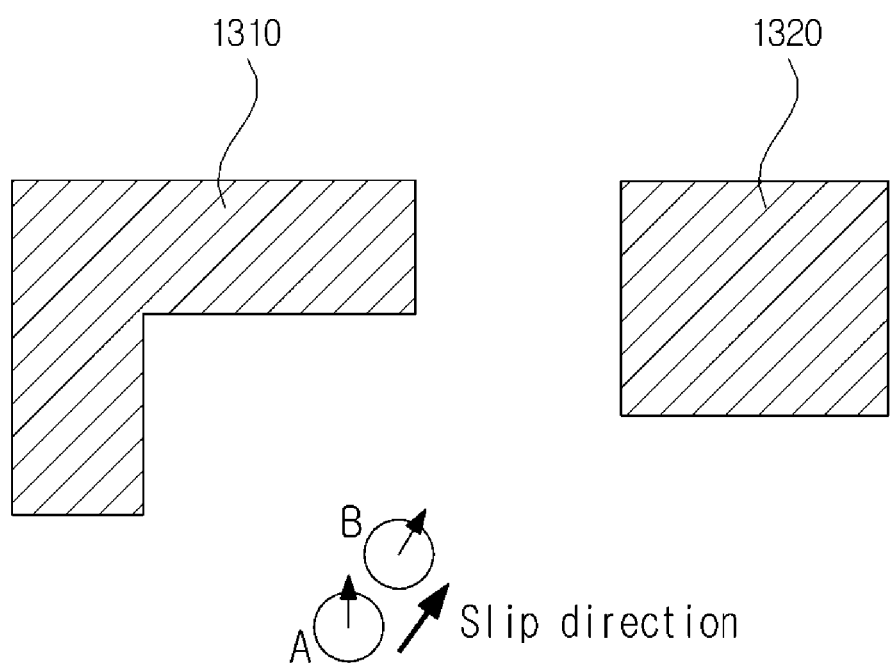

FIG. 71 is a reference diagram for describing a method for detecting the slip situation of a moving object.

When the moving object slides from point A to point B, it is necessary to use obstacles 1310 and 1320 positioned around the moving object in order to find out the slip of the moving object. In the present invention, in this case, information on the obstacles 1310 and 1320 positioned around the moving object is obtained using a multi-channel (or single-channel) laser distance measurer.

Figure 72:
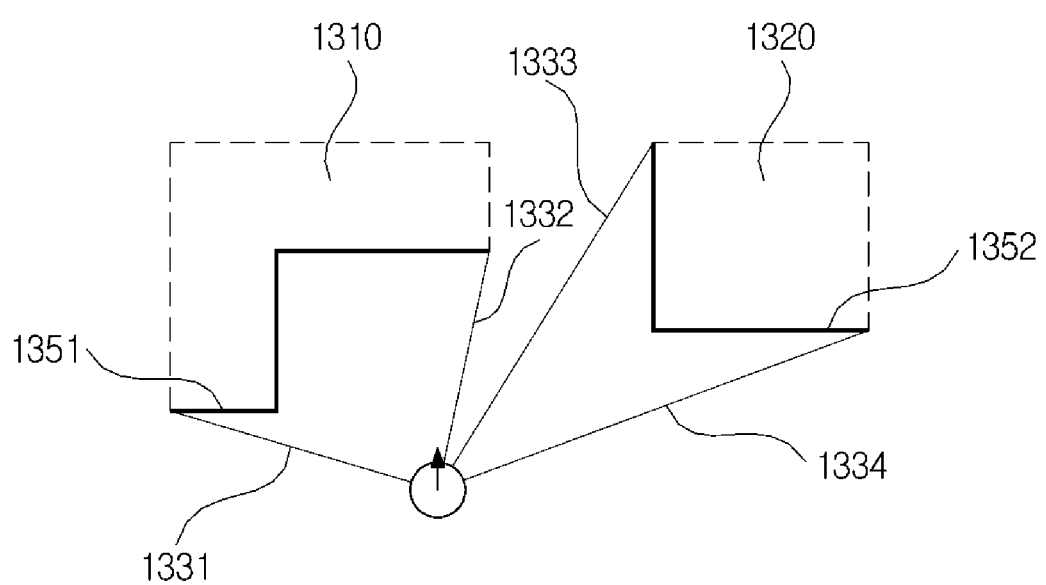
Figure 73:
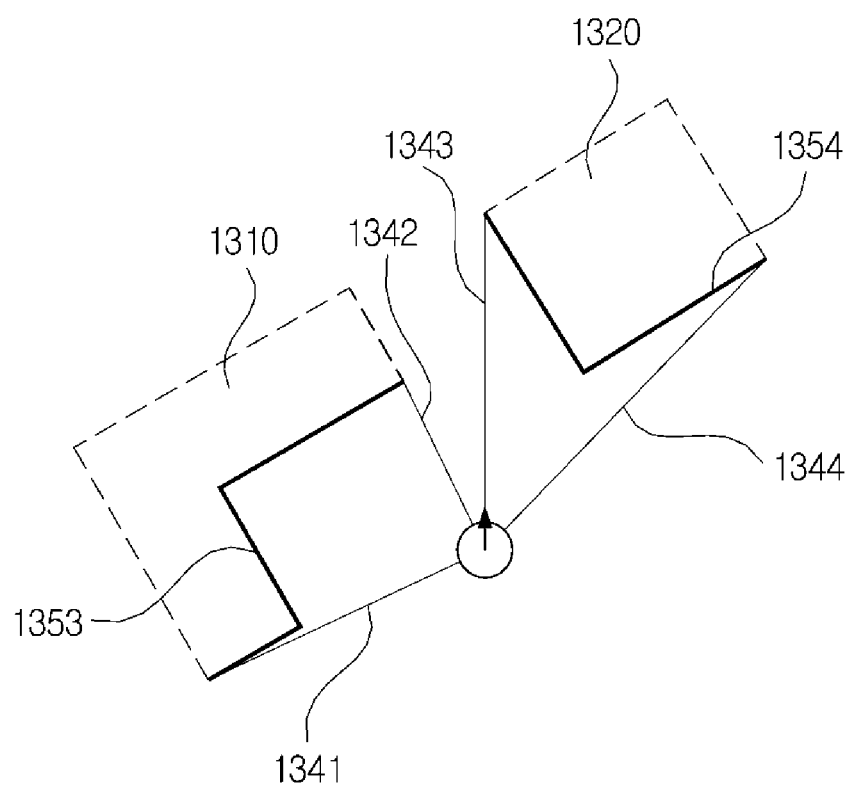

FIGS. 72 and 73 are reference diagrams illustrating the distance information from the moving object to the obstacles 1310 and 1320 obtained at two different points. FIG. 72 illustrates distance information 1331, 1332, 1333, and 1334 between the moving object and the obstacles 1310 and 1320 measured at point A in FIG. 71, and FIG. 73 illustrates the distance information 1341, 1342, 1343, and 1344 between the moving object and the obstacles 1310 and 1320 measured at point B in FIG. 71.

The moving object may calculate its own amount of movement at two points by matching the information 1351, 1352, 1353, and 1354 on the obstacles 1310 and 1320 obtained at two different points through movement or rotation.

In the exemplary embodiment, the moving object may match the information 1351, 1352, 1353, and 1354 on the obstacles 1310 and 1320 obtained at two different points by applying a particle filter.

Figure 74:
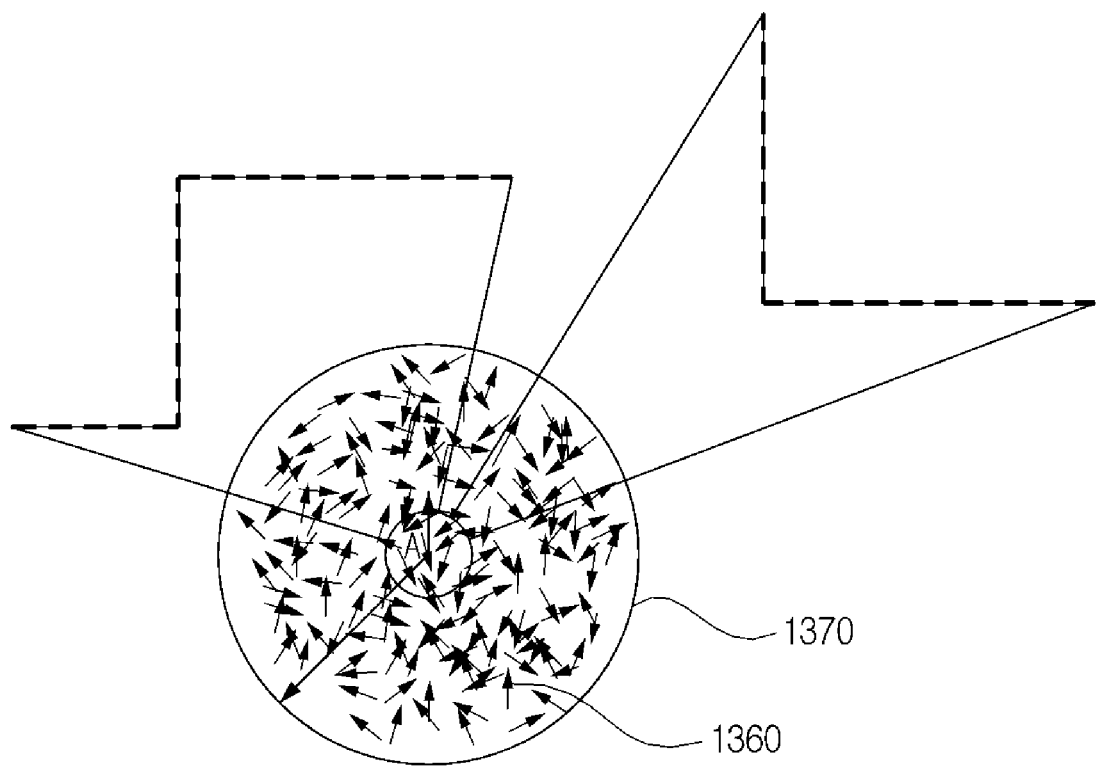
Figure 75:
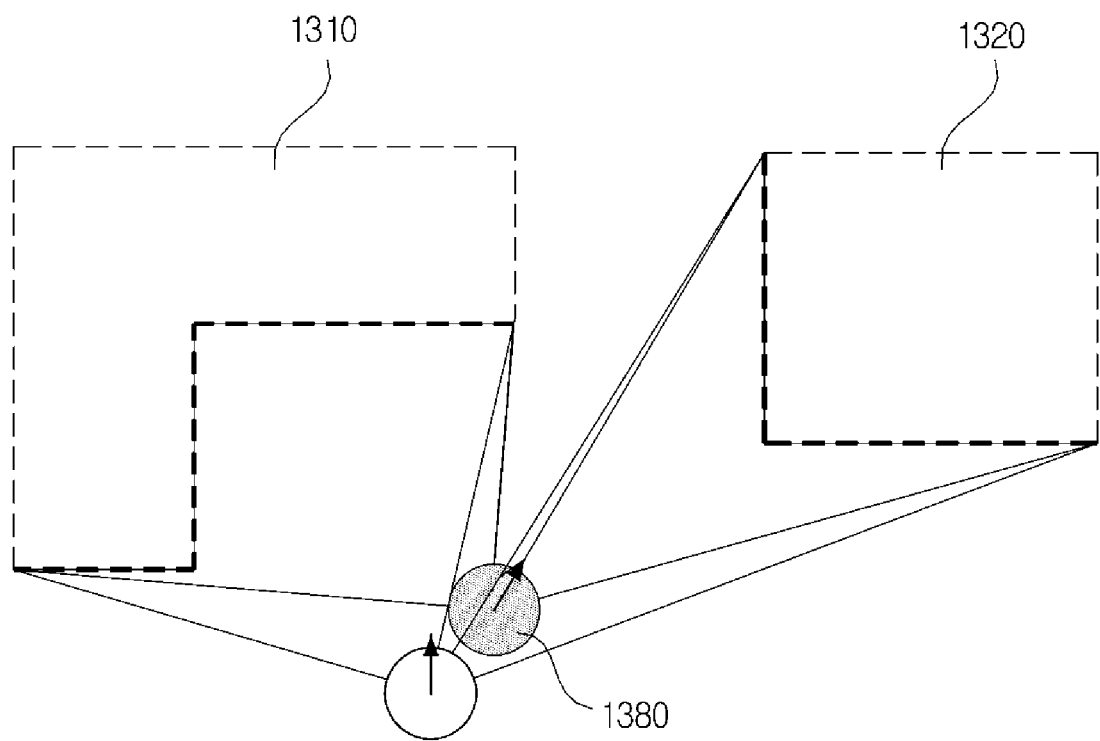

FIGS. 74 and 75 are reference diagrams for describing a method for matching obstacle information obtained at two different points.

FIG. 74 illustrates a process of matching obstacle information obtained at point B based on point A. Random particles 1360 are positioned within a particle boundary 1370 determined based on point A, and contain information on randomly generated candidates such as the location, posture angle, and the like.

Assuming that the information on the moving object at point B is information possessed by a specific random particle, when the obstacle information obtained at two points is matched based on the information of each random particle, a random particle having information most similar to the obstacle information measured at point B may be found. Then, the information of the random particle may be estimated to be the information on the moving object at point B.

FIG. 75 illustrates a result of matching the obstacle information at points A and B based on the information of a selected random particle 1380. When the obstacle information is matched and the obstacles 1310 and 1320 are thus arranged at the same position, as illustrated in FIG. 7, it is possible to find out the relative location difference of the moving object at each point, thereby enabling detection of the degree of sliding of the moving object through said relative location difference.

In addition, the current speed of the moving object may be calculated by dividing the above-detected information by the time difference (the value of the difference between the time at which the moving object is located at point A and the time at which the moving object is located at point B).

When the number of random particles 1360 is increased and the probabilistic error with respect to the location of the moving object is considered, more accurate information may be predicted.

<Creation of Projective Map>

FIGS. 76 to 83 are diagrams illustrating a projective map creator of the LIDAR apparatus, according to the exemplary embodiments of the present invention.

Figure 76:
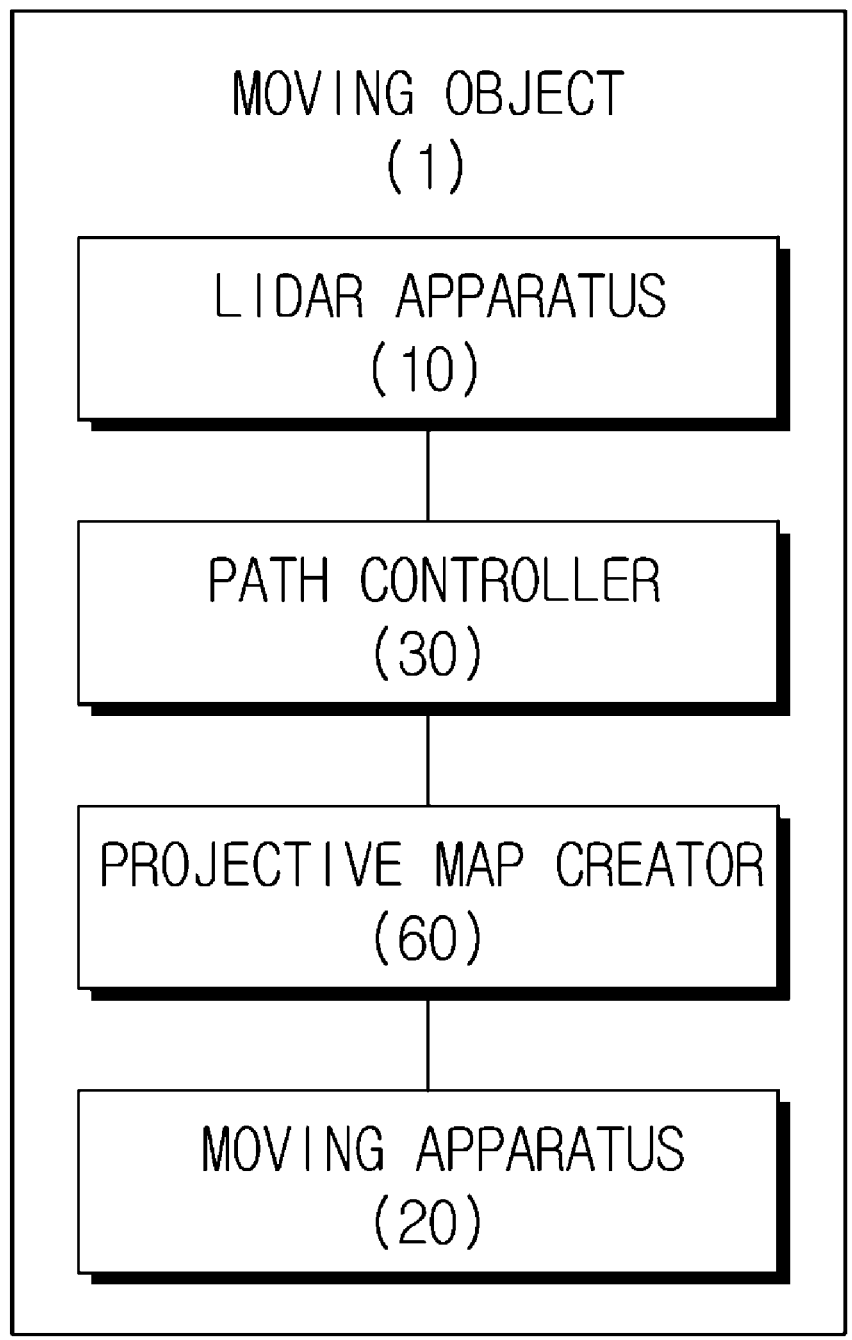
Figure 77:
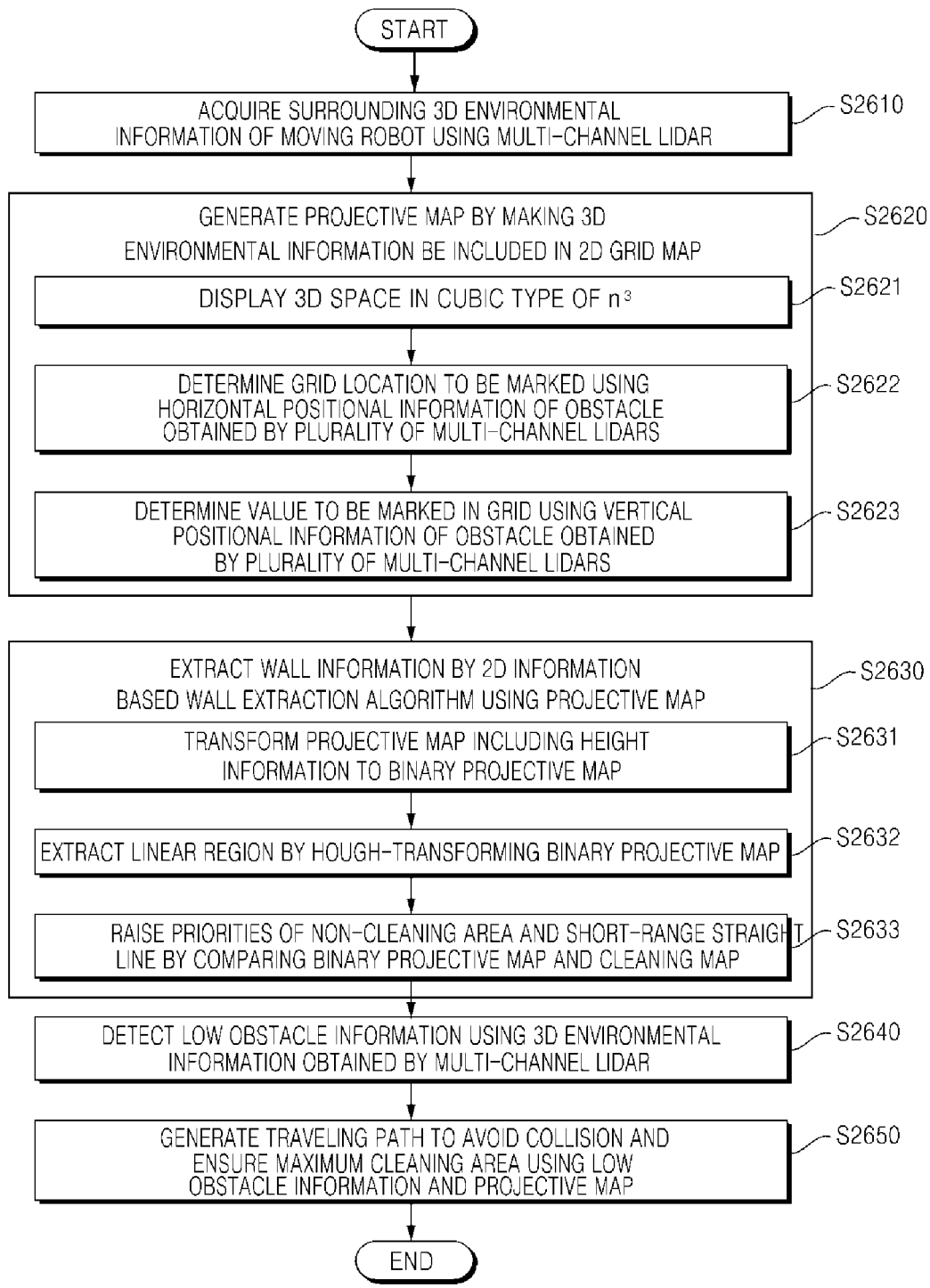

Referring to FIG. 76, the moving object includes the LIDAR apparatus 10, the moving apparatus 20, the path controller 30, and a projective map creator 60. FIG. 77 is a flowchart of a method for detecting an obstacle of a multi-channel LIDAR-based moving object, according to an exemplary embodiment of the present invention.

The LIDAR apparatus 10 is equipped with at least two optical transceivers having different angles of emission of the transmission signal in order to detect 3D environmental information, including the obstacle information of the moving object.

The projective map creator 60 generates 3D environmental information for defining the obstacles in 3D based on the reception information of at least two optical transceivers, and creates a projective map including said 3D environmental information in a 2D space map. The 3D environmental information includes the information on obstacles, and the information on the obstacles may include information on the location, size or shape of the obstacle, and the like. Further, the 2D space map may be formed as a 2D grid map in one form.

The path controller 30, which is used for generating an optimal path, determines the spatial location of an obstacle based on the projective map, and generates a traveling path for avoiding the obstacle. When determining the special location of the obstacle, the path controller 30 may also determine the size and shape of the obstacle, and may generate a traveling path for avoiding the obstacle while approaching at a minimum distance without colliding with the obstacle.

The projective map creator 60 analyzes the received signal of the LIDAR apparatus 10 to generate shape information on the obstacles, including thresholds, slopes, and cliffs, and expresses said 3D environmental information using a cube of $n^3$.

The projective map creator 60 may determine a marking grid location and a grid marking value using each of the horizontal positional information and vertical positional information of the obstacle obtained by the LIDAR apparatus 10, and in addition, may extract a linear region by Hough-transforming a binary projective map obtained by converting a projective map containing height information to binary information of 1 or 0.

The projective map creator 60 may raise the priority of a region that is found not to be cleaned compared with a cleaning map, and may increase the priority of a straight line of a nearby portion.

The path controller 30 may estimate the presence of an obstacle based on the vertical distance from the two or more optical transceivers 101 and 102 to the floor surface, and the horizontal downward emission angle of the transmission signal from the optical transceiver.

The LIDAR apparatus 10 applied to the moving object 1 rotates a plurality of (two or more) laser emission/receiving sets 101 and 102 within 360 degrees, or within a preconfigured range, to acquire the surrounding obstacle information in 3D (S2610). In the exemplary embodiment, the 3D environmental information means 3D information on the surroundings of the moving object, and, of course, the 3D environmental information also includes the information on the obstacles.

The moving object may distinguish low obstacles (small toys, clothes, etc.) as well as vertical environments (a threshold, a slope, and a cliff), and plan a collision avoidance path based on a 3D local map.

Generally, since low obstacles (e.g., toy blocks, socks, clothes, etc.) may become caught in a suction port or in the wheels of the cleaning robot to cause problems, low obstacles need to be considered with particular care for the safe travel of the cleaning robot. Nevertheless, the existing infrared and ultrasonic based obstacle-detecting cleaning robots of the related art are unable to detect obstacles lower than the locations of the sensors.

In particular, in single-channel laser scan sensor based cleaning robots, which have the most excellent performance in the areas of map creation and location estimation, since the location of the sensor is set on the top of the robot in order to enhance SLAM performance, it is impossible to detect low obstacles.

In contrast to the existing cleaning robots of the related art, since the multi-channel LIDAR based moving object 1 to which the exemplary embodiment of the present invention is applied may not only detect horizontal obstacles but also measure the bottom of the cleaning robot, low obstacles may be detected regardless of the height of the cleaning robot and the location of the sensor, as illustrated in FIG. 4, while maintaining the excellent SLAM performance as in the single-channel laser scan sensor based cleaning robots of the related art.

The vertical environment is an important environment that greatly affects the traveling and location estimation performance of the cleaning robot. Since cleaning robots (such as bumper based, infrared or ultrasonic-based, single-channel laser scanning sensor based, etc.) that measure obstacles horizontally cannot check the vertical environment in advance, such cleaning robots fail to recognize such a situation when the environment becomes vertical, or disregard and pass by the environment. When the cleaning robot climbs up a threshold or a ramp (such as a bar-chair fixture, etc.), the location estimation performance of the cleaning robot is affected, causing degradation of the cleaning performance. In addition, in the case of a cliff, since operation of the cleaning robot is no longer possible when the cleaning robot falls into the cliff, cleaning robots are prevented from falling into cliffs by the installation of a floor measuring sensor. Even in the case of installing a floor measuring sensor, since the sensor is mounted in the cleaning robot and detects only the situation directly in front of the wheel, when the cleaning robot rotates or moves quickly, it is impossible to enhance the stability of the cleaning robot by coping with the rotation or quick movement in advance.

Figure 78:
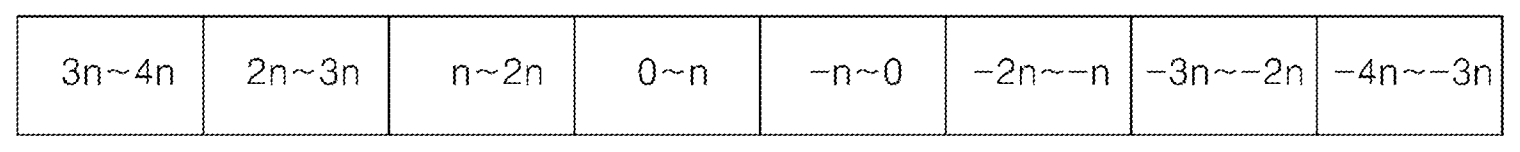
Figure 81:
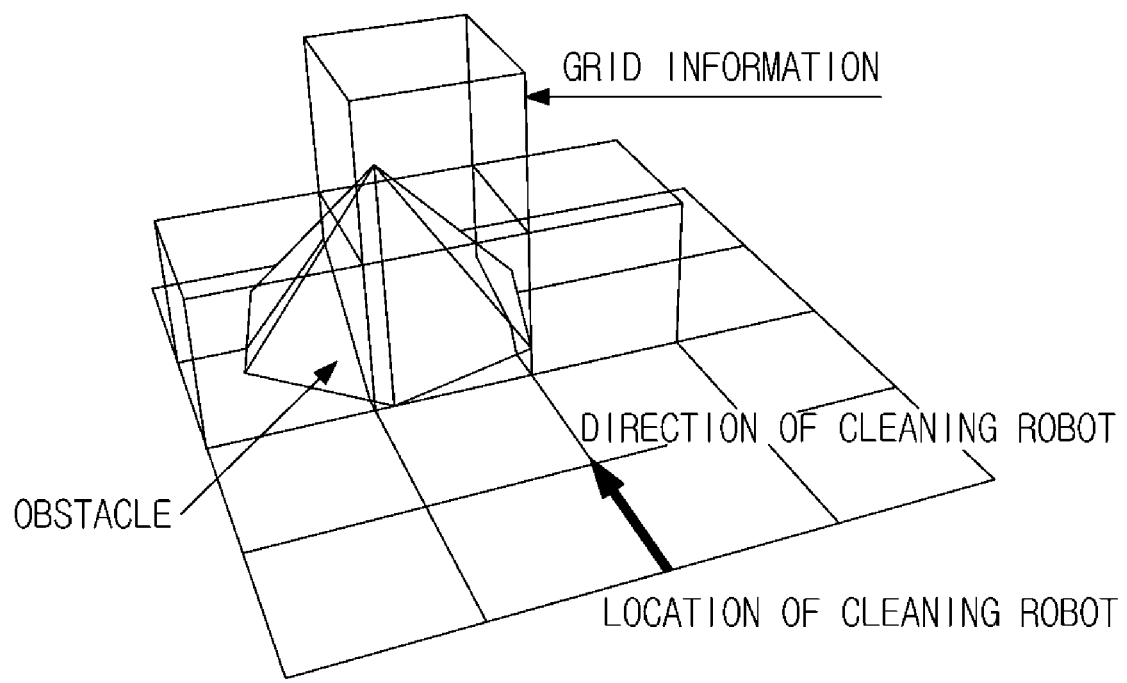
Figure 82:
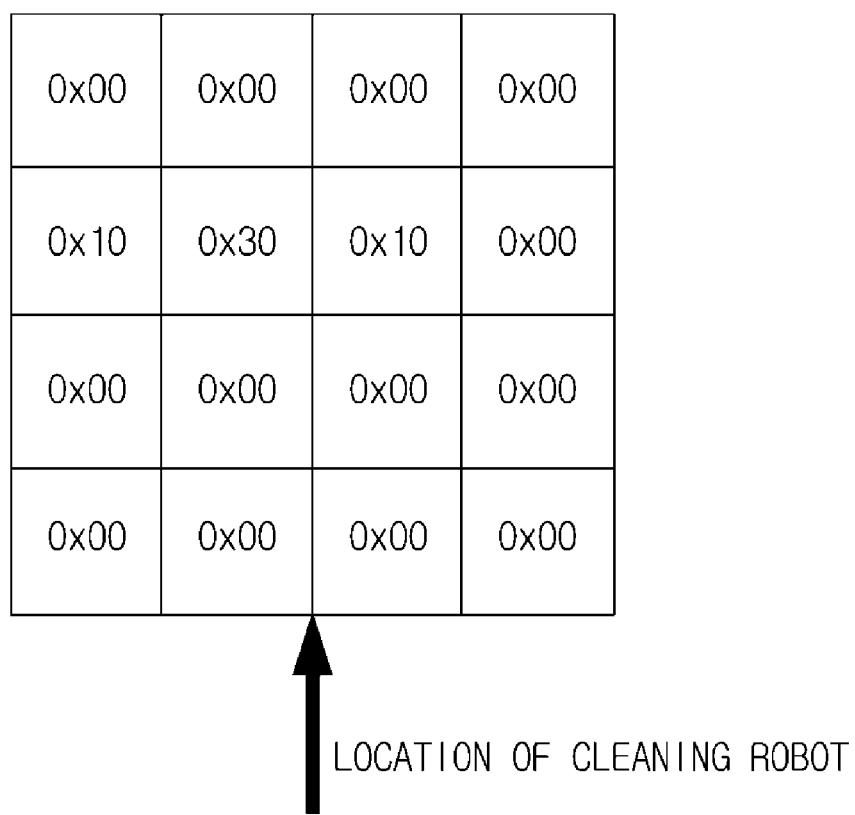

FIG. 78 illustrates grid information in a case where the 3D environmental information is represented by 1 byte (8 bits), according to the exemplary embodiment of the present invention, FIGS. 79 and 80 illustrate a height representation method of a 2-byte projective map, according to the exemplary embodiment of the present invention, and FIGS. 81 and 82 illustrate a 1-byte projective map display result of a 3D obstacle, according to the exemplary embodiment of the present invention.

When the moving object 1 uses the multi-channel LIDAR apparatus 10, it is possible to acquire the obstacle information illustrated in FIGS. 66 to 68 with respect to the vertical environment, and based on this, to plan the traveling path of the cleaning robot in advance. Therefore, the cleaning robot is capable of detecting and avoiding vertical environments before facing them.

Among the existing cleaning robots of the related art, since laser scan sensor based cleaning robots may detect the obstacles when in a state in which the surrounding obstacle is kept at a distance (when in a state of not facing the obstacle), it is possible to plan a movement path in advance to avoid collision. However, as mentioned earlier, there is still a risk of collision with obstacles, since the low obstacles may not be detected and vertical environments may not be distinguished.

Since the moving object 1 to which the multi-channel LIDAR apparatus 10 is applied provides 3D information on the surroundings, it is possible to plan a path to avoid collision with the low obstacles and other obstacles which affect safe traveling of the robot, including vertical environments, before facing such obstacles.

The present invention proposes a projective map that displays the surrounding 3D environmental information of the cleaning robot obtained through the multi-channel LIDAR apparatus 10 disclosed in the present invention in a small storage space without loss of information. Since low manufacturing cost of the cleaning robot needs to be maintained, possession of a large memory size and a high computing capability may not be guaranteed. That is, there is a limit in applying the point clouds requiring large storage capacity and good calculation performance used in the existing researching of moving objects in the related art as is. The disclosure of the present invention proposes a projective map for storing information on surrounding obstacles as well as map information of the cleaning robot in a small storage space without loss of the information.

Since the projective map may be used in general cleaning robots even with a small storage capacity and small calculation performance, a grid map is primarily used. However, since a point cloud that represents an environment in 3D requires a larger storage space because the spatial order is 1 order larger than that of a 2D grid, there is a limit in the calculation capability and storage space of the cleaning robot. Accordingly, the projective map in which the 3D information may be included in a grid map is generated by the following method (S2620).

1) A 3D space is represented using the cubic of n3 (S2621).

2) The grid locations to be marked are determined using the horizontal positional information of the obstacles obtained by the LIDAR (S2622).

3) A value to be marked in a grid is determined by using the vertical positional information of the obstacles obtained by the LIDAR (S2623).

For example, when a 3D surrounding space is represented using a cube of 33 cm$^3$, the 3D surrounding environment is represented by grids of the cube of 3 cm×3 cm×3 cm.

Here, if we examine the case where each grid is represented by 1 byte (8 bits), each grid may be determined as illustrated in FIG. 78.

As illustrated in FIG. 78, when each bit is allocated and displayed by using a height information grid size, the 3D information may be displayed using a 2D grid map without loss of the information. The projective map creating method of FIG. 78 will be described in more detail through the following example.

For example, when the size of the grid is 1.5 cm (n=1.5) and the vertical position of an obstacle is 4.5 cm from the ground, the vertical location may be expressed as follows. When the vertical location is expressed using a hexadecimal number, the value which is entered in the grid is 0x70.

0:1:1:1:0:0:0:0

As illustrated in FIGS. 79 and 80, when the grid map is represented by 2 bytes (16 bits), if the grid map has a measurement range such as a 1-byte grid, it is possible to represent the grid map more finely, and in addition, if the grid map has a grid size such as a 1-byte grid, a wider range may be represented.

As illustrated in FIGS. 78 to 80, the proposed method is a method for creating the projective map without the loss of positional information by using a 2D grid map, without the use of a 3D array or a 3D point cloud relating to the 3D surrounding environmental information. When a method for representing the 3D information in the clearing robot using the maps of FIGS. 78 to 80 is illustrated, the results may be illustrated as in FIGS. 81 and 82.

As illustrated in FIGS. 81 and 82, it can be seen that a 3D obstacle measured by the cleaning robot may be expressed in the 2D projective map without loss of the information. As illustrated in FIG. 81, since the obstacle at position (2, 1) of the local map is within the height of 1n, then M(2,1) =00010000 (where M represents the local map), and as a result, when the obstacle is expressed as a hexadecimal number, then M(2,1)=0x10, as illustrated in FIG. 8.

For cleaning robots, distinguishing walls is one of the most important capabilities. The ability to clean by sticking to the edges or corners of the walls and the floor, where a lot of dust is gathered, is an important measure of estimating the cleaning performance of the cleaning robot, which needs to collect and contain a lot of dust. Therefore, a wall following function for distinguishing the walls from the surrounding environmental information and allowing movement along the walls without collision when approaching such walls is very important.

Unlike the manner of existing cleaning robots of the related art in which one or two infrared or distance measurement sensors are used and the robot does not move in a straight line but instead moves in a zigzag along the wall according to the error of the sensors, laser scan sensor based cleaning robots capable of obtaining the surrounding information at 360 degrees may accurately distinguish the surrounding walls by using more environmental information, and thus provide more information (e.g., the direction of progression of the wall).

In general, since the 3D multi-channel LIDAR based cleaning robot uses 3D environmental information, it is difficult to use the existing 2D laser scan sensor based wall extraction algorithms of the related art.

However, in spite of the fact the multi-channel LIDAR based moving object according to the exemplary embodiment of the present invention acquires 3D environmental information, all information may be easily integrated by means of the projective map, and the existing techniques of the related art used on 2D environmental information may be applied as is through the following process.

1) The projective map containing the height information is changed to binary information represented by 1 or 0.

2) A binary projective map is Hough-transformed to extract the linear region.

3) The priority of a region that has not been cleaned is raised when compared with a cleaning map, and the priority of a straight line of a nearby portion is also raised.

More specifically, in order to extract information on the walls, the projective map containing 3D information is compressed into 2D information through a binarization process in which the information is represented by 1s and 0s. A process for binarizing the projective map may be shown as in Algorithm 1) (S2630).

Algorithm 1)

if $M(n,m) > 0$ $B(n,m) = 1$;

else $B(n,m) = 0$;

Here, B represents a map acquired by displaying the entire local map only with 1s and 0s as a binary map.

As shown in Algorithm 1), the projective map M is transformed into the binary map B through the above process, and is converted into 2D information (S2631). When the information of FIG. 82 is binarized, the information may be illustrated as in FIG. 83.

Figure 83:
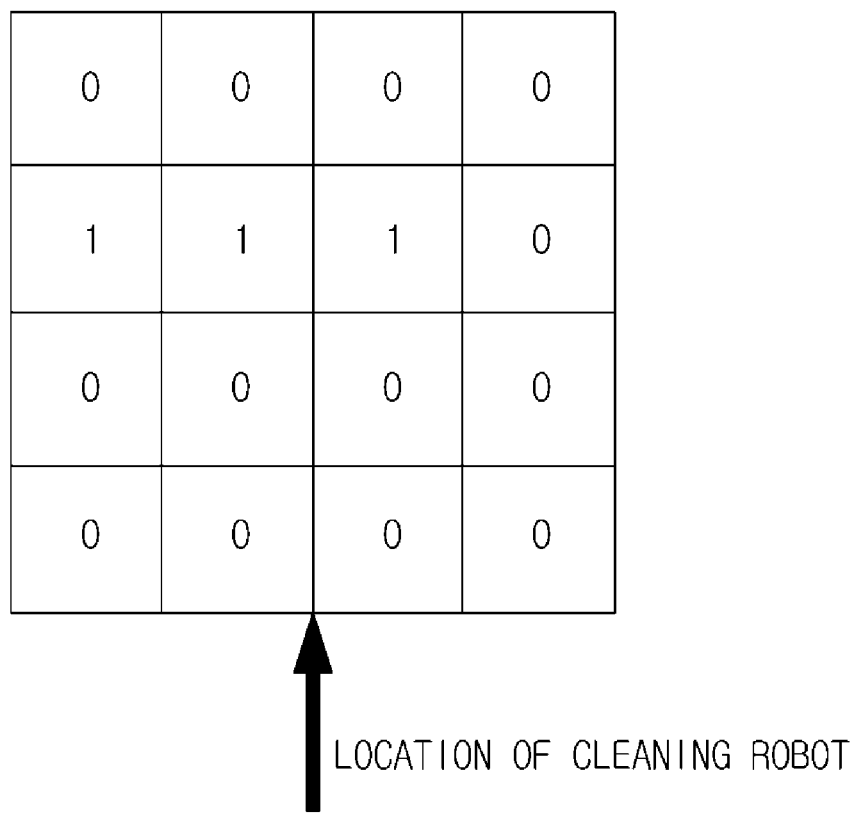
Figure 84:
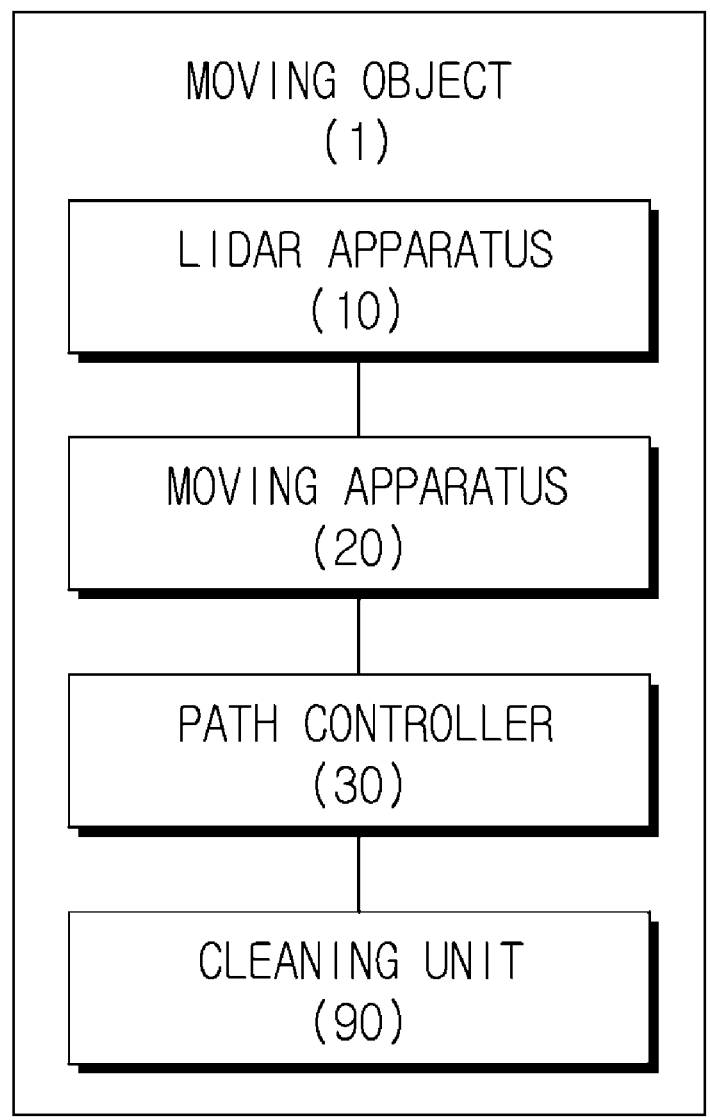
FIGS. 84 to 88 are diagrams illustrating cleaning units of the moving object according to the exemplary embodiments of the present invention.

Using the binary map illustrated in FIG. 83, we may easily apply the algorithms normally used in the related art. In a general case, since the linear component of a wall appears very strongly, in the present document the linear components were extracted through Hough transformation, which is widely used in image processing and obstacle map analysis in the related art (S2632).

After the projective map for displaying the 3D environmental information is transformed into the binary map through binarization and the linear components are extracted through the Hough transformation to estimate the wall, priority is given to each of the estimated walls (S2633). The priorities of the respective walls are distinguished based on the following matters.

1) Cleaning status—the priority of non-cleaned portions is raised.

2) Distance relationship—the priority is raised as the distance is closer.

Priority is assigned to all estimated walls based on the above two matters, and the wall of the highest priority may be made to be followed.

Since low obstacles that are not detected by existing cleaning robots of the related art and which may be caught and sucked up by the robot, such as clothes, toy blocks, or animal feces, actually exert a lot of influence on the safe traveling and cleaning performance of such robots, it is essential that such low obstacles be detected and avoided. Since the moving object 1 equipped with the multi-channel LIDAR according to the exemplary embodiment of the present invention may acquire information on obstacles lower than the location where the multi-channel LIDAR is mounted, it is possible to avoid collision with low obstacles, and thus, to avoid various problems which occur as a result of collision. To this end, it is very important to distinguish the obstacles by distinguishing between the floor and the obstacle from the 3D map information.

Figure 69:
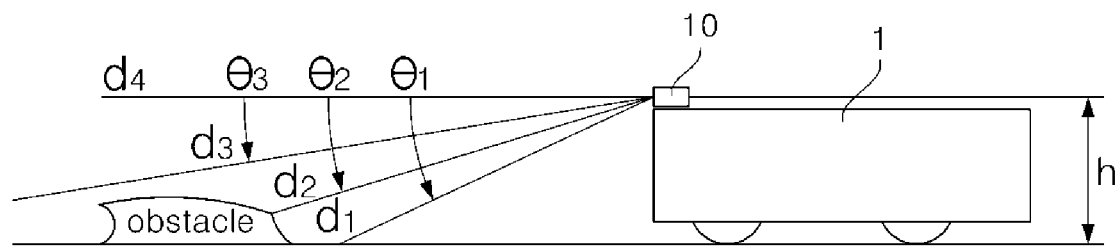
Figure 70:
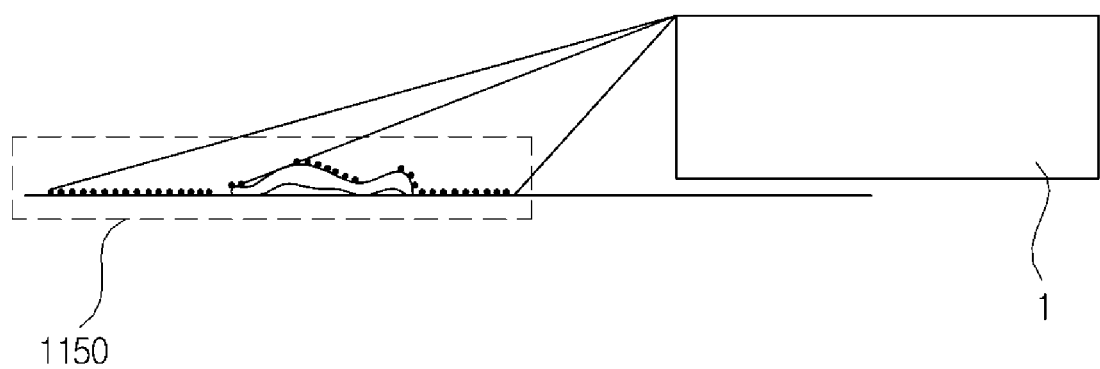

As illustrated in FIG. 69, if the distance from the sensor to the floor in the downward directional information of the cleaning robot measured by the multi-channel LIDAR mounted on the cleaning robot is $d_n = h/\cos(\theta_n)$ (where, n=1, 2, 3), the floor may be estimated. Otherwise, not the floor, but an obstacle may be estimated. When this is represented using the projective map, the obstacle may be represented as follows (S2640).

For example, referring to FIG. 81, when the location of the multi-channel LIDAR sensor is 3n, the low obstacles are displayed as a number smaller than 0x80 (10000000). Further, like for general cleaning robots, all non-low obstacles will be displayed as a value greater than or equal to 0x80 on the projective map. By combining these two pieces of information, the obstacle information may be obtained, and the cleaning robot may plan a collision avoidance path in advance before facing such obstacles, as described in the next chapter (S2650).

<Cleaning Unit of Moving Object>

FIGS. 84 to 88 are diagrams illustrating a cleaning unit of the moving object, according to the exemplary embodiments of the present invention.

Figure 85:
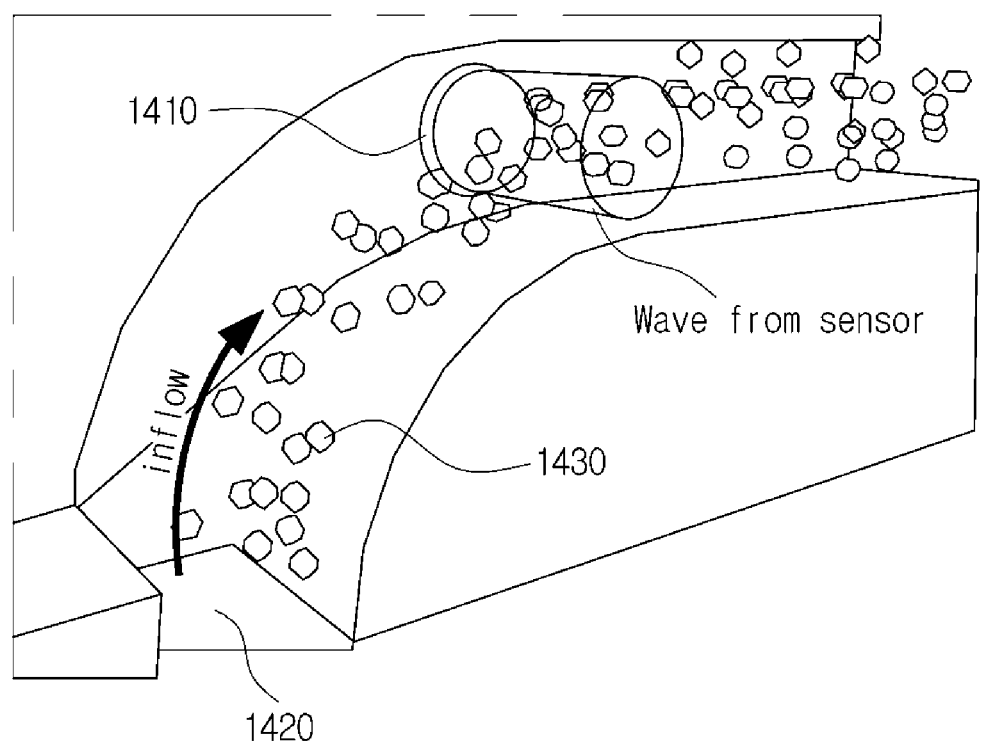

The moving object (cleaning robot) provided with the cleaning unit 90 may detect the inflow quantity of dust 1430 by using a flow sensor 1410 mounted on one side of a suction port 1420, as illustrated in FIG. 85.

To this end, the moving object 1 may use an ultrasonic flow sensor, a TOF based flow detector, or the like, as the flow sensor. When the moving object 1 detects the inflow quantity of the dust using such a flow sensor, it may operate less sensitively to the dust attached to a window than in the case where an optical element is used.

The cleaning unit 90 may further include a foreign material inflow amount detecting unit. The foreign material inflow amount detecting unit serves to detect the amount of foreign material inflow by using the flow sensor attached to the suction port of the apparatus that performs a cleaning function. The cleaning robot may control the cleaning function for a room based on the state of the floor surface and the inflow amount of the foreign material.

Figure 86:
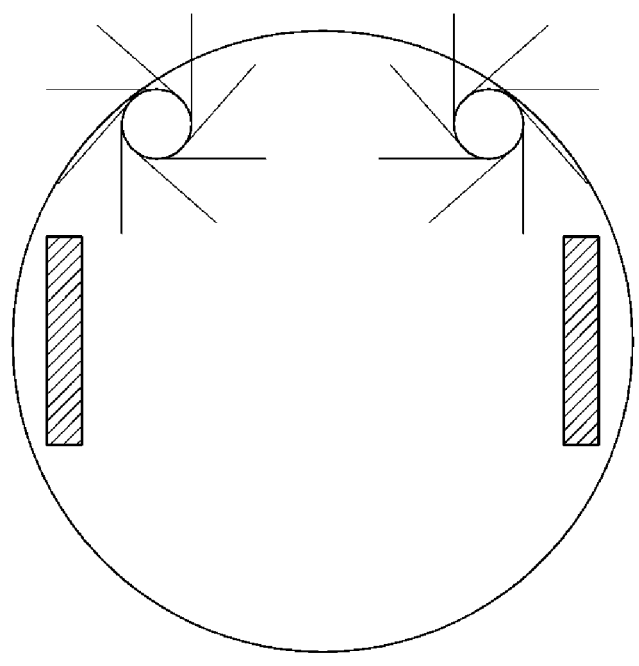
Figure 87:
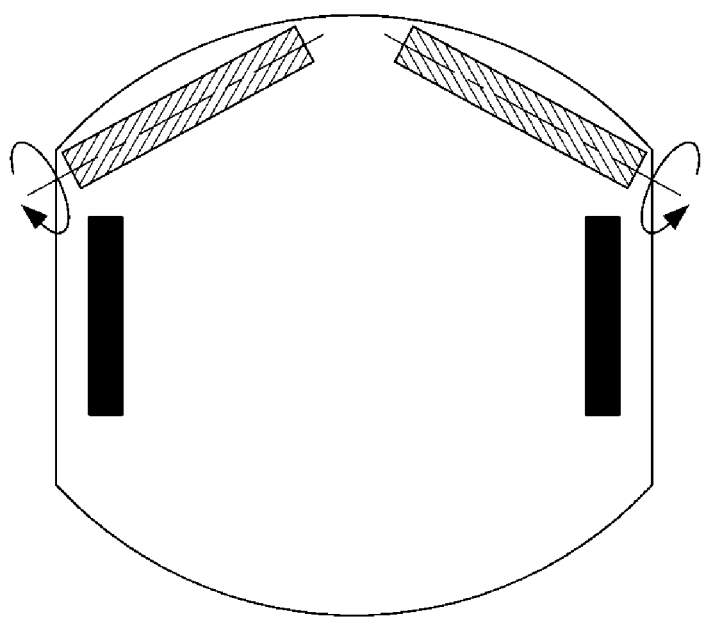
Figure 88:
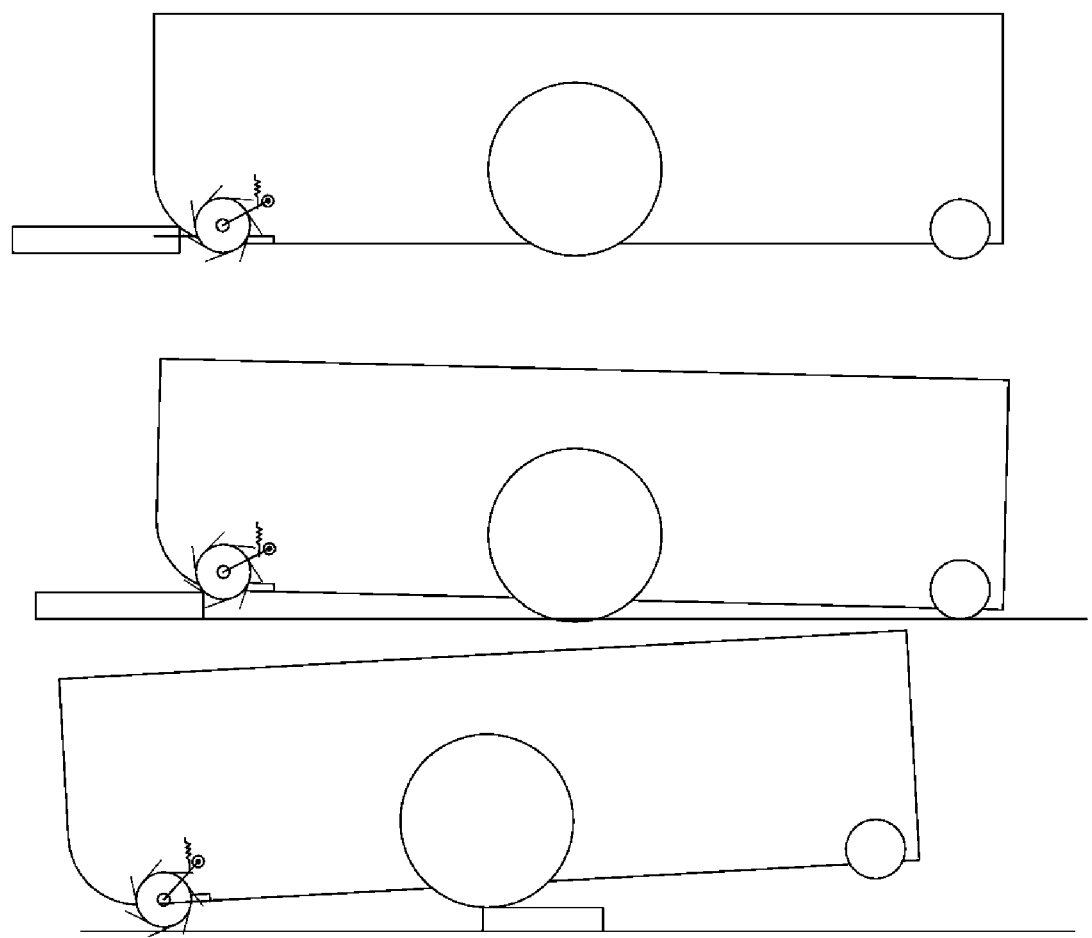
Figure 89:
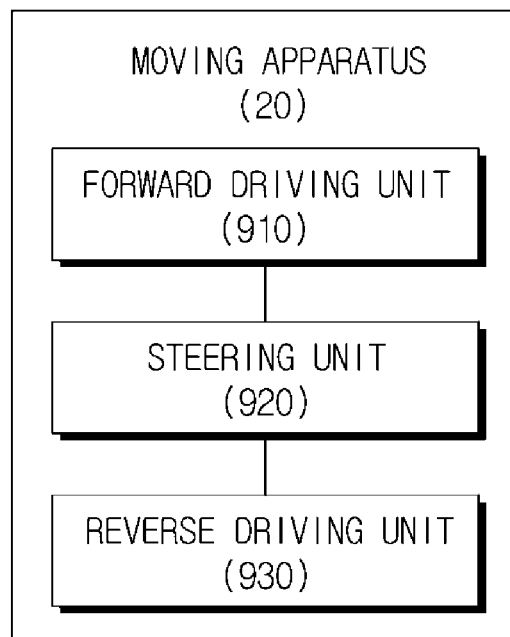
FIGS. 89 to 96 are diagrams for describing an operation by which the moving object moves according to the exemplary embodiments of the present invention.

Referring to FIGS. 86 and 87, the cleaning unit 90 includes a side brush and/or a brush wheel. Referring to FIG. 88, a cylindrical brush wheel attached to or formed at the lower end of the front end of the moving robot acts as the wheel so as to allow the moving robot to climb up thresholds or carpets relatively easily.

<Moving Apparatus of Moving Object>

FIGS. 89 to 96 are diagrams for describing an operation in which the moving object moves, according to the exemplary embodiments of the present invention.

The moving apparatus 20 includes a forward driving unit 910, a steering unit 920, and a reverse driving unit 930. The moving object 1 may perform a cleaning motion using forward movement or reverse movement. The moving object 1 determines a movement direction and a path using a TOF based 360-degree distance measurer.

The moving object 1 equipped with the TOF based 360-degree distance measurer may freely move backward regardless of the mounting position of the sensors, such as at the front or the rear, so that the following variety of motions may be applied, unlike existing robots of the related arts which only move forward.

Figure 90:
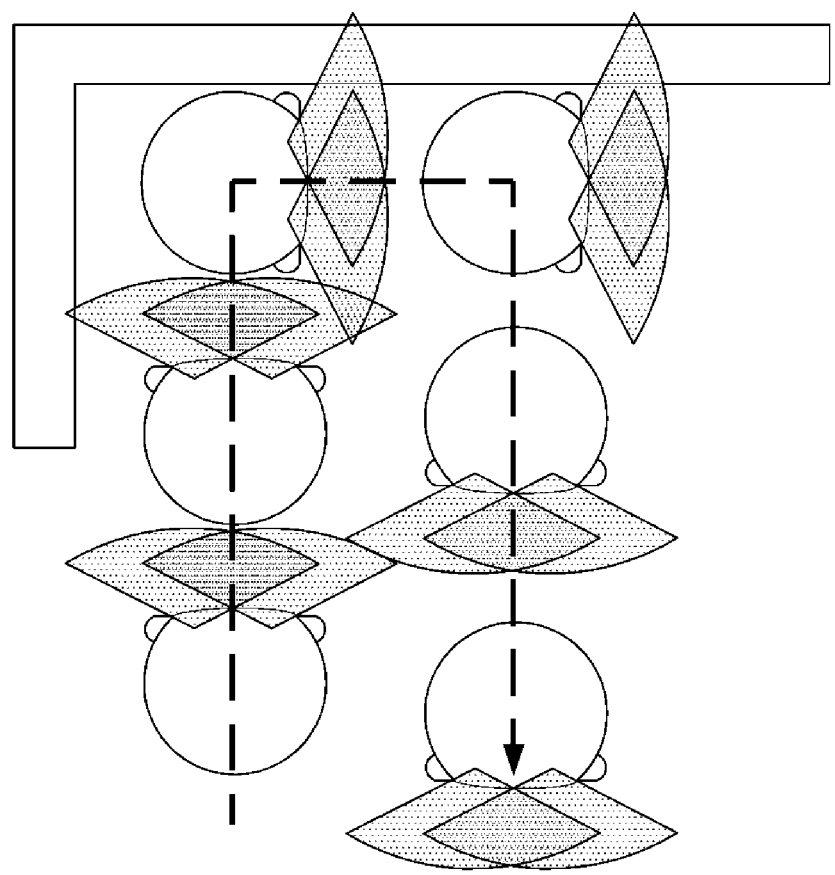
Figure 91:
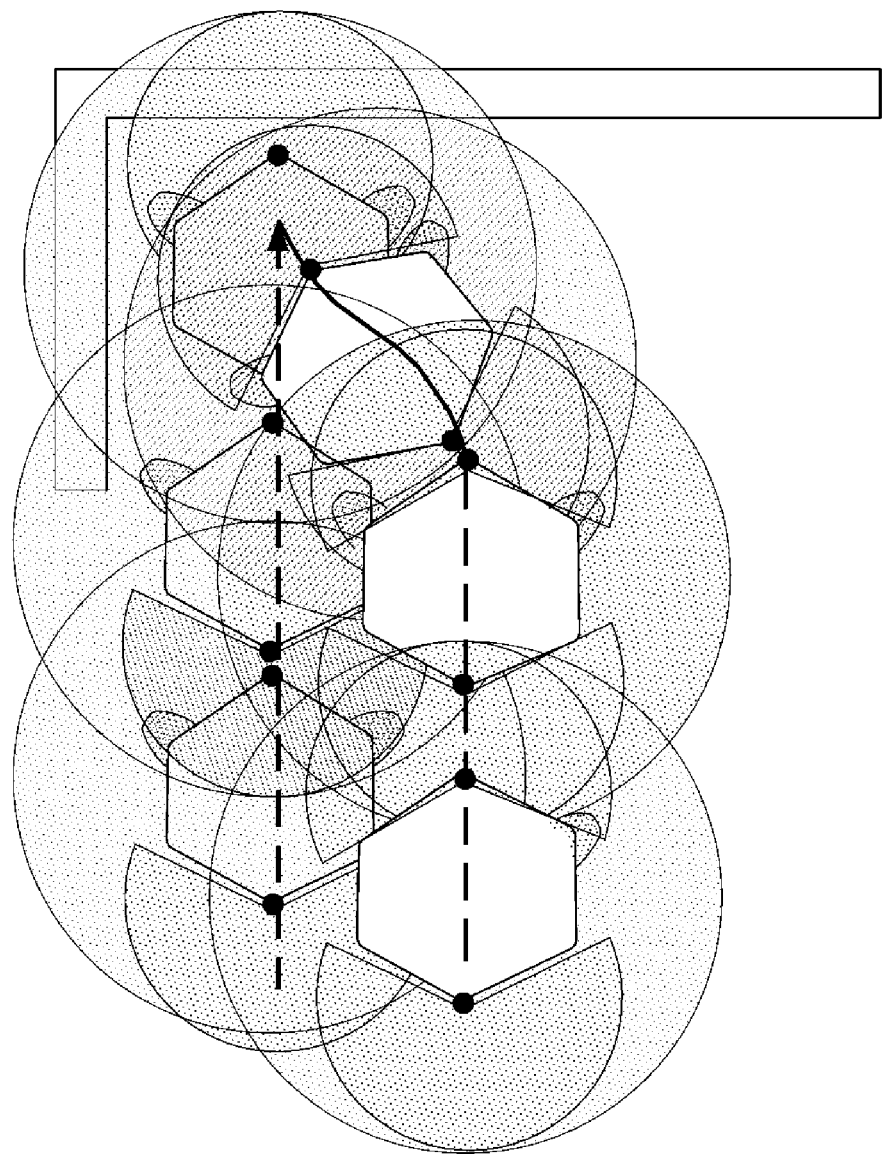

First, when the moving object 1 changes direction by 180 degrees, the moving object 1 does not rotate as illustrated in FIG. 90, but directly moves backward as illustrated in FIG. 91, thereby reducing the total cleaning time.

Figure 92:
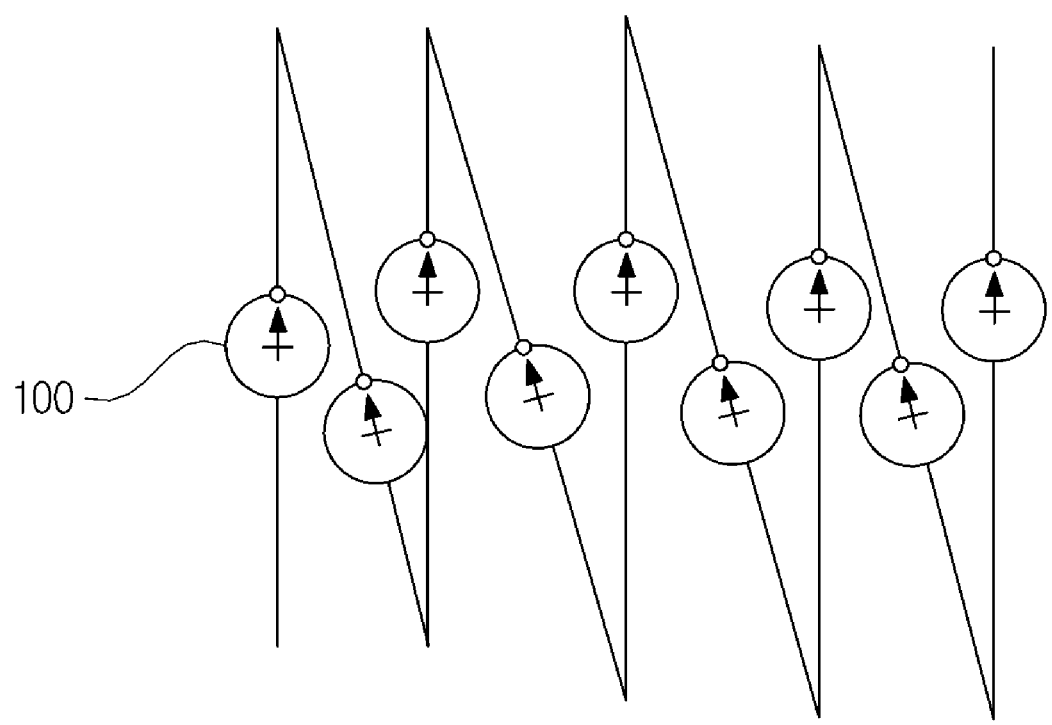

Second, when the moving object 1 performs concentrated cleaning on dusty places, the moving object 1 may sufficiently remove the dust by performing cleaning while moving back and forth, as illustrated in FIG. 92.

In this case, since the moving object 1 does not rotate while cleaning the region, it is possible to maintain the location estimation performance and to reduce the slip, which occurs frequently during rotation. In addition, since the moving object 1 uses both the brush and mop in both directions, the problem in that the brush and the mop are used only in one direction due to the sole straight movement of the existing robots, causing only one side to be dusty, may be solved, while the location estimation performance also may be maintained, and the slip, which occurs frequently during rotation, may be reduced.

<Generation of Collision Avoidance Path>

Referring to FIGS. 93 to 96, an optimal collision avoidance path generation algorithm capable of ensuring the safety and maximum cleaning area of the cleaning robot will be described.

Since the cleaning robot according to the exemplary embodiment displays all the obstacle information, including that on low obstacles, on the projective map, it is possible to use this as the basis for planning a path capable of collision avoidance before facing collision with obstacles. Unlike the existing cleaning robots of the related art which generate a path for avoiding collision by connecting the farthest points from the obstacle, the cleaning robot according to the exemplary embodiment may completely clean as many regions as possible by sticking close to the obstacle while avoiding collision.

Figure 93:
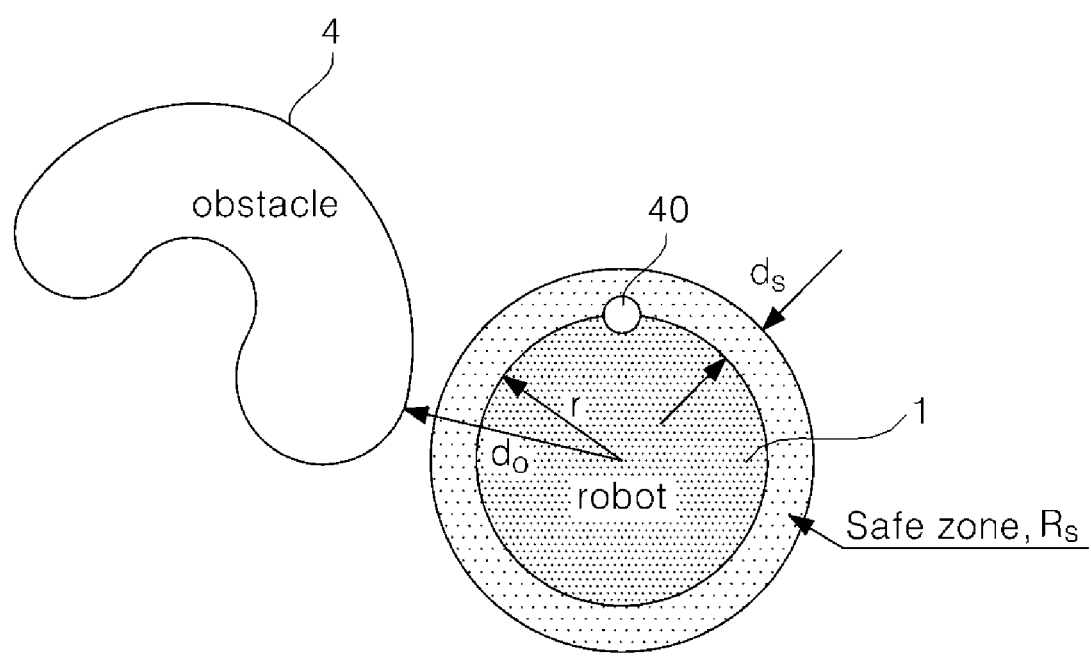

FIG. 93 illustrates the relationship between the cleaning robot and the obstacle when the cleaning robot performs cleaning.

As illustrated in FIG. 93, all obstacles need to be positioned outside a safe zone of the cleaning robot. However, it is possible to clean as large an area as possible by creating a path so that the closest distance do from the cleaning robot to the obstacle is minimized. Based on FIG. 95, the optimal path is reduced to an optimization problem of Equation (3).

minimize $do$ subject to $do > r + ds$ [Equation 3]

The movement path of the cleaning robot needs to be determined while satisfying the optimization problem of Equation (3), and to this end, the optimization problem of Equation (3) may be applied to an existing path planning algorithm of moving objects in the related art. Particularly, in the present invention, a rapid random tree (RRT) and a potential field (for reference, similar to the wavefront method) technique are considered.

First, in the case of RRT, a roadmap is created as a set of various paths through which the cleaning robot may move as follows, and the optimization problem of Equation (3) is applied to select an optimum path from among the paths.

Figure 94:
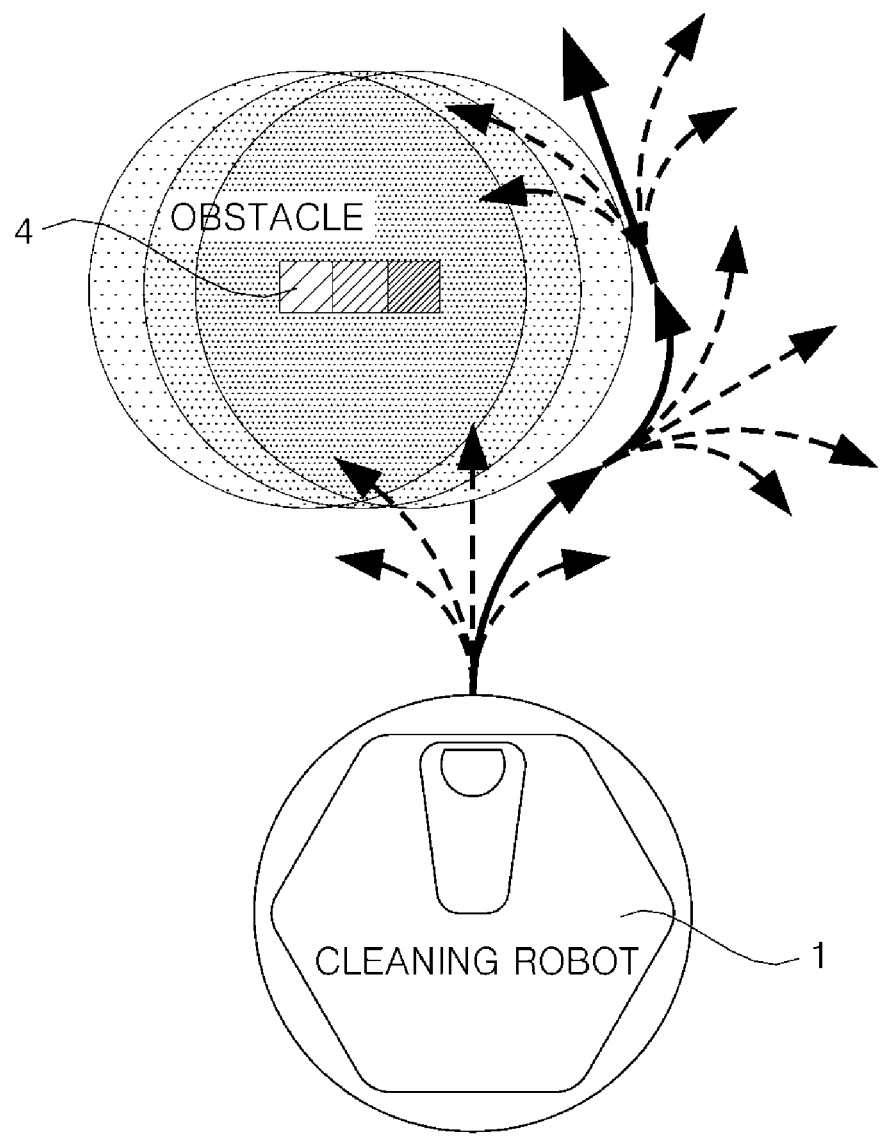

FIG. 94 illustrates a process of selecting an optimal path from the RRT to which the optimization problem of Equation (3) is applied.

In FIG. 94, the dashed line represents all the paths that the cleaning robot can move along, and the solid line represents the movement path of the cleaning robot selected through the optimization problem of Equation (3) from among all possible paths.

Figure 95:
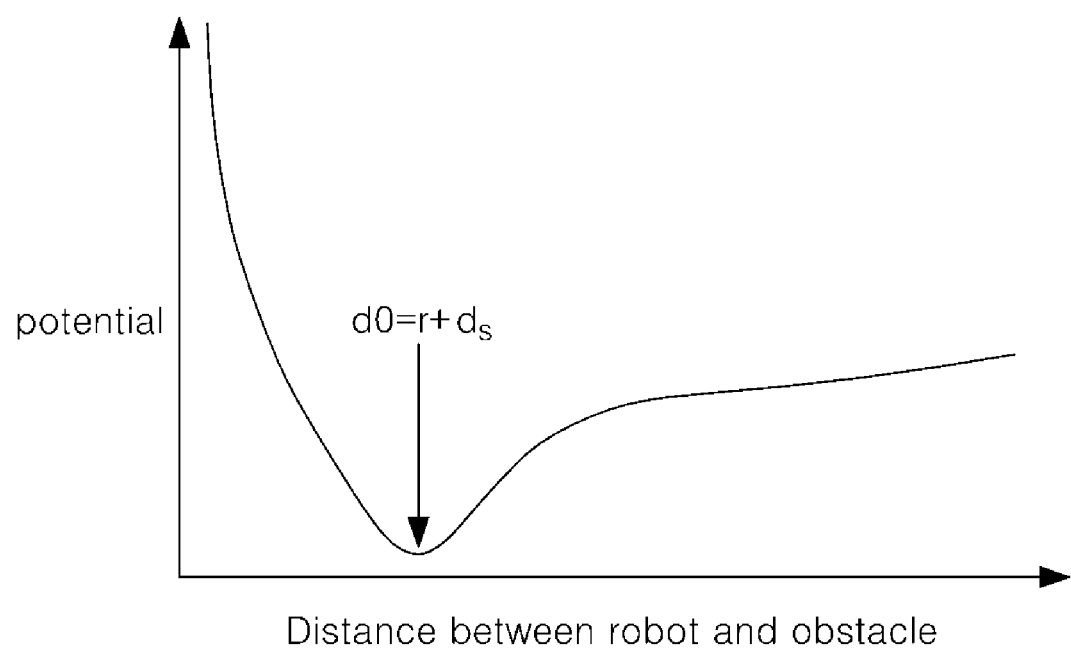
Figure 96:
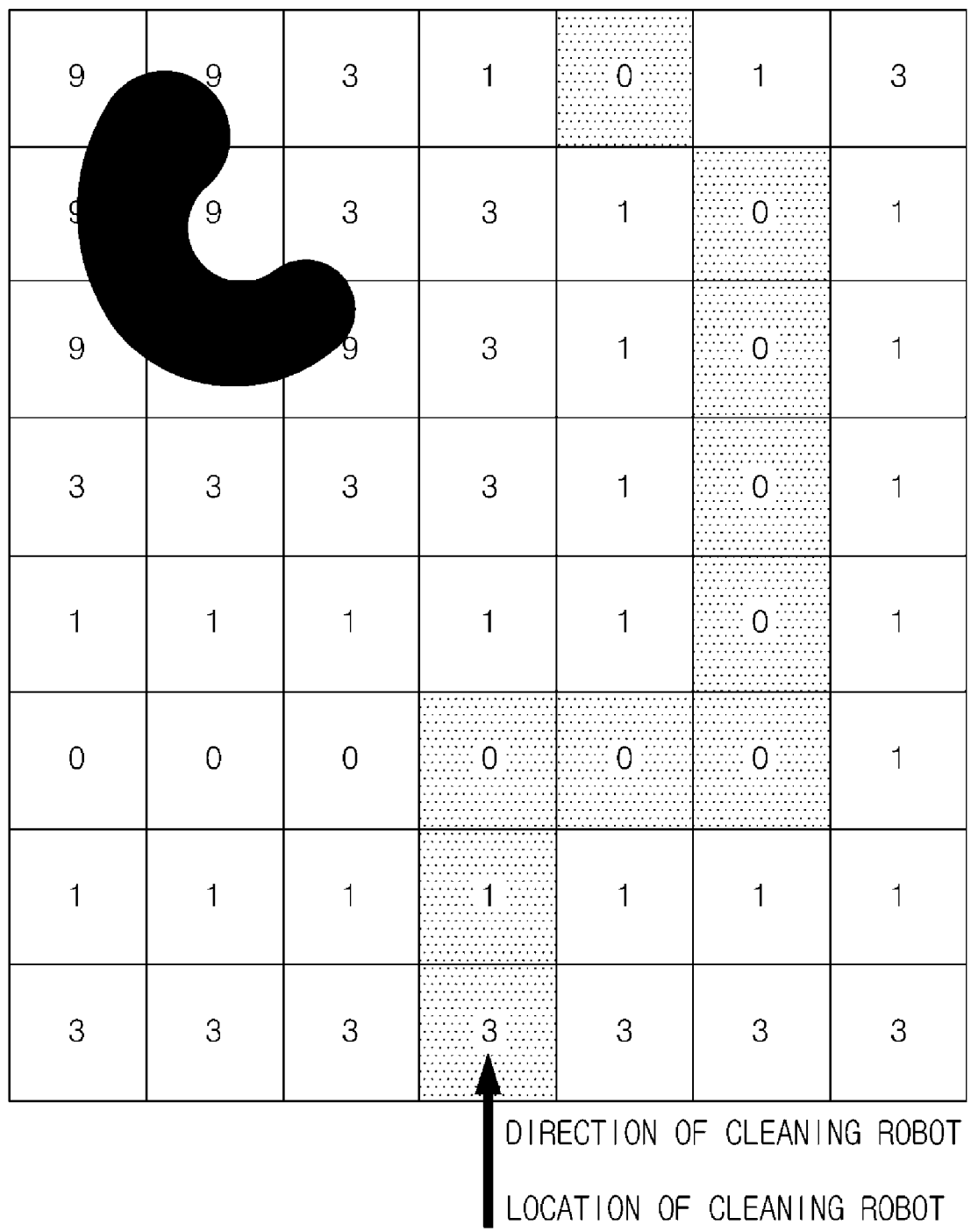

FIGS. 95 and 96 illustrate a potential field based path generation process through the optimization problem of Equation (3).

When the potential field is applied, the potential as shown in FIG. 13A is given according to the distance between the obstacle and the cleaning robot.

As illustrated in FIG. 95, when the optimization problem of Equation (3) is applied to the potential field, the potential is minimized when do is r+ds, so that the path illustrated in FIG. 96 may be obtained.

A cleaning traveling algorithm of the cleaning robot that may acquire 3D environmental information by installing multi-channel LIDAR has the following effects. First, by proposing the projective map, it is possible to apply 3D spatial information which requires a large storage space and calculation capability to the existing 2D grid map of the related art without loss of the information. In addition, wall information may be easily extracted by applying the methods of the related art to the 3D information using the projective map, and obstacles may be distinguished. Further, it is possible to plan the traveling path to maximize the cleaning area while avoiding collision with the obstacles based on such wall and obstacle information.

<Display of Movement Path>

Figure 97:
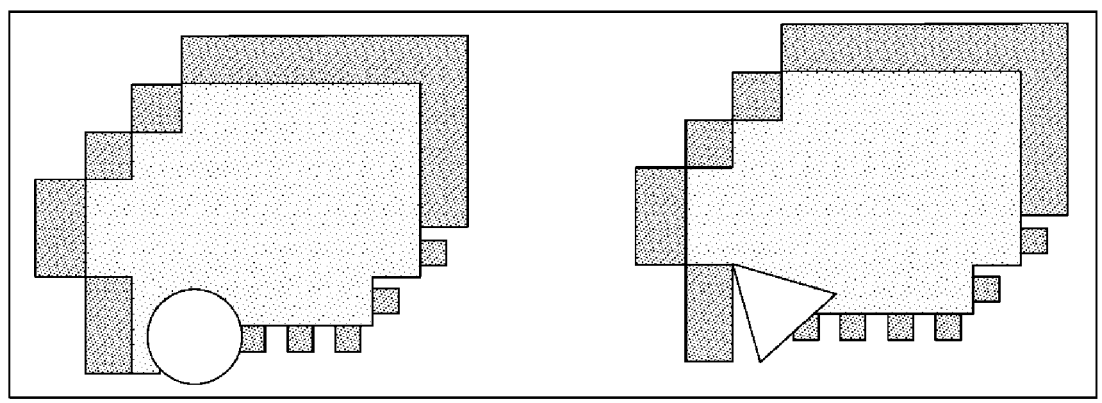
FIG. 97 is a diagram exemplarily illustrating a path through which the moving object moves according to the exemplary embodiments of the present invention.

FIG. 97 is a diagram exemplarily illustrating a path through which the moving object moves, according to the exemplary embodiments of the present invention.

The moving object of the present invention may further include a display unit. In this case, a map indicating the traveling area of the moving object is displayed so that a user may visually confirm the area wherein the moving object performs cleaning through the display unit. For example, a map including both the area where the user performs cleaning operations of the moving object and the area where the cleaning operation is to be performed may be displayed, as if a game character were moving.

Components included in the moving object and the LIDAR apparatus are illustrated separately in the respective drawings, but a plurality of components may be combined with each other and implemented as at least one module. The components are connected to a communication path connecting a software module or a hardware module inside the apparatus, and operate organically with each other. The components communicate using one or more communication buses or signal lines.

The moving object and the LIDAR apparatus may be implemented in a logic circuit by hardware, firmware, software, or a combination thereof, and may be implemented using a universal or special purpose computer. The apparatus may be implemented using a hardwired device, a field programmable gate array (FPGA), an application specific integrated circuit (ASIC), or the like. In addition, the apparatus may be implemented as a System on Chip (SoC), including one or more processors and controllers.

The moving object and the LIDAR apparatus may be implemented as software, hardware, or a combination type thereof in a computing device having hardware components. A "computing device" may mean various devices which include all or some of: a communication device such as a communication modem for performing communication with various devices or wired/wireless communication networks, a memory for storing data for executing a program, a microprocessor for performing a computation and a command by executing a program, and the like.

Meanwhile, the embodiments according to the present invention may be implemented in the form of program instructions that are executable by computers, and may be recorded in computer readable media. Such computer readable media may include program instructions, a data file, a data structure, or a combination thereof. For example, computer readable media may be comprised of, but not limited to, computer storage media and communication media. Computer storage media includes both volatile and nonvolatile, removable and non-removable media implemented in any method or technology for storage of information, such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention, which is limited only by the claims which follow.

What is claimed is:

1. A moving object comprising:
   a LIDAR apparatus measuring a distance from a target object based on a time of flight;
   a path controller generating a movement path by processing point cloud data generated based on the measured distance; and
   a moving apparatus implemented to move the moving object based on the movement path,
   wherein the moving object includes a clock generator generating a reference clock,
   the distance measurer includes a reference clock counter counting the reference clock received from the clock generator and counting an internal clock generated from an internal oscillator, and
   the distance measurer corrects the time of flight by using a ratio of the number of reference clocks and the number of internal clocks.

2. The moving object of claim 1, wherein the LIDAR apparatus includes
   an optical transceiver outputting an electrical signal by transmitting and receiving light,
   a signal discriminator generating a control signal by analyzing the electrical signal, and
   a distance measurer measuring the distance by calculating the time of flight of the light based on the control signal.

3. The moving object of claim 2, wherein the LIDAR apparatus further includes a plurality of optical transceivers and the plurality of optical transceivers positioned on the moving object at different angles to perform multi-channel scanning.

4. The moving object of claim 2, wherein the optical transceiver includes a first mirror including a hole for passing emitted light and a second mirror, wherein the second mirror moves at a predetermined period, and wherein the first mirror has a focus point on which rays reflected on a curved reflective surface are gathered.

5. The moving object of claim 2, wherein the optical transceiver outputs the electrical signal during a detection time in a sampling period of the optical transceiver.

6. The moving object of claim 2, wherein the signal discriminator converts the electrical signal and detects a timing having a predetermined reference magnitude to generate the control signal.

7. The moving object of claim 6, wherein the distance measurer corrects the time of flight by using a pulse width of the control signal.

8. The moving object of claim 2, wherein the distance measurer calculates the time of flight by using a time to digital converter having a plurality of oscillators with a controlled clock width based on a location and a signal path of a logic element which are adjusted.

9. The moving object of claim 1, wherein the LIDAR apparatus further includes an artificial landmark detector configured to determine whether the target object is an artificial landmark and to analyze an invisible barcode included in the artificial landmark.

10. The moving object of claim 1, further comprising:
    a map creator configured to generate a key frame related to a node by analyzing the point cloud data, calculate an odometry edge between consecutive nodes, update the key frame to estimate a local map and detecting a loop closure edge between nodes which are not consecutive with respect a set of the updated key frames, and correct the location of the node based on the odometry edge and the loop closure edge to estimate a global map.

11. The moving object of claim 1, wherein the path controller includes a floor surface state determining unit configured to generate information related with a height change of the floor surface by analyzing the point cloud data.

12. The moving object of claim 1, further comprising:
    a projective map creator configured to generate 3D environmental information for defining an obstacle in 3D by analyzing the point cloud data and generate a projective map including the 3D environmental information in a 2D space map.

13. A LIDAR apparatus comprising:
    an optical transceiver outputting an electrical signal by transmitting and receiving light;
    a signal discriminator generating a control signal by analyzing the electrical signal; and
    a distance measurer measuring a distance by calculating a time of flight of the light based on the control signal,
    wherein the distance measurer includes a reference clock counter counting a reference clock received from an external clock generator and counting an internal clock generated from an internal oscillator, and
    the distance measurer corrects the time of flight by using a ratio of the number of reference clocks and the number of internal clocks.

14. The LIDAR apparatus of claim 13, wherein the optical transceiver includes a first mirror including a hole for passing emitted light and a second mirror which moves at a predetermined period, and wherein the first mirror has a focus on which rays reflected on a curved reflective surface are gathered.

15. The LIDAR apparatus of claim 13, wherein the optical transceiver outputs the electrical signal during a detection time in a sampling period of the optical transceiver.

16. The LIDAR apparatus of claim 13, wherein the signal discriminator detects a timing having a predetermined reference magnitude to generate the control signal.

17. The LIDAR apparatus of claim 16, wherein the distance measurer corrects the time of flight by using a pulse width of the control signal.

18. The LIDAR apparatus of claim 13, wherein the distance measurer calculates the time of flight by using a time to digital converter having a plurality of oscillators with a controlled clock width based on a location and a signal path of a logic element which are adjusted.

\* \* \* \* \*